(12) United States Patent
Tsuruga et al.

(10) Patent No.: US 8,532,291 B2
(45) Date of Patent: Sep. 10, 2013

(54) COPY CONTROL METHOD

(75) Inventors: Sadao Tsuruga, Yokohama (JP); Hiroo Okamoto, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/161,808

(22) Filed: Jun. 16, 2011

(65) Prior Publication Data
US 2012/0066742 A1 Mar. 15, 2012

(30) Foreign Application Priority Data

Sep. 10, 2010 (JP) ................... 2010-202608
Sep. 10, 2010 (JP) ................... 2010-202609

(51) Int. Cl.
*H04N 7/167* (2011.01)

(52) U.S. Cl.
USPC ........... 380/201; 380/200; 380/202; 380/203; 705/57; 705/58; 369/84; 369/85

(58) Field of Classification Search
USPC ............... 380/201–203; 369/84, 85; 705/57, 705/58
See application file for complete search history.

(56) References Cited

U.S. PATENT DOCUMENTS
2008/0013726 A1* 1/2008 Kuriya et al. ................. 380/210

FOREIGN PATENT DOCUMENTS
JP 2002-319227 10/2002

* cited by examiner

*Primary Examiner* — Edan Orgad
*Assistant Examiner* — Roderick Tolentino
(74) *Attorney, Agent, or Firm* — Antonelli, Terry, Stout & Kraus, LLP.

(57) ABSTRACT

The usability while performing copy control can be enhanced in the case of recording a digital broadcast program for which recording of one generation is permitted ("Copy One Generation"). When an output route in the case of copying digital contents from a first recording apparatus to a second recording apparatus is via LAN, authentication is executed between the first recording apparatus and the second recording apparatus. The capability of a move process with a predetermined copy number of multiple copies being kept is confirmed, and dedicated key information is shared to be used for encryption and decryption of the digital contents moved with the predetermined copy number of multiple copies being kept. Then, the digital contents recorded and managed in the first recording apparatus is added with the information about the predetermined copy number of multiple copies, and transmitted.

5 Claims, 44 Drawing Sheets

FIG.3

CONTENT AVAILABILITY DESCRIPTOR

| DATA STRUCTURE | THE NUMBER OF BITS | NOTATION OF BIT STRING |
|---|---|---|
| content_availability_descriptor () { | | |
|     descriptor_tag | 8 | uimsbf |
|     descriptor_length | 8 | uimsbf |
|     reserved_future_use | 1 | bslbf |
|     digital_recording_control_mode | 1 | bslbf |
|     image_constraint_token | 1 | bslbf |
|     retention_mode | 1 | bslbf |
|     retention_state | 3 | bslbf |
|     encryption_mode | 1 | bslbf |
|     for(i=0;i<N;i++){ | | |
|         reserved_future_use | 8 | uimsbf |
|     } | | |
| } | | |

FIG.4

OPERATIONAL RULES FOR SENDING OUT CONTENT AVAILABILITY DESCRIPTOR

| OPERATIONAL RULES FOR SENDING OUT EACH FIELD | |
|---|---|
| descriptor_tag | DESCRIBE "0xDE" |
| descriptor_length | DESCRIBE DESCRIPTOR LENGTH OF CONTENT AVAILABILITY DESCRIPTOR |
| digital_recording_control_mode | DESCRIBE "0" WHEN DIGITAL COPY CONTROL INFORMATION INDICATES "COPY ONE GENERATION" AND CONTENTS ARE NOT RECORDABLE AS "COPY FREE WITH LIMIT OF THE NUMBER" |
| image_constraint_token | DESCRIBE "1" |
| retention_mode | DESCRIBE "0" |
| retention_state | DESCRIBE "111" |
| encryption_mode | DESCRIBE "0" WHEN DIGITAL COPY CONTROL INFORMATION INDICATES "COPY FREE WITHOUT RESTRICTION" AND HIGH-SPEED DIGITAL INTERFACE OUTPUT IS TO BE PROTECTED |

FIG.5

DIGITAL COPY CONTROL DESCRIPTOR

| DATA STRUCTURE | THE NUMBER OF BITS | NOTATION OF BIT STRING |
|---|---|---|
| digital_copy_control_descriptor () { | | |
|     descriptor_tag | 8 | uimsbf |
|     descriptor_length | 8 | uimsbf |
|     digital_recording_control_data | 2 | bslbf |
|     maximum_bit_rate_flag | 1 | bslbf |
|     component_control_flag | 1 | bslbf |
|     copy_control_type | 2 | bslbf |
|     if(copy_control_type=01)){ | | |
|         APS_control_data | 2 | bslbf |
|     } | | |
|     else{ | 2 | bslbf |
|         reserved_future_use | | |
|     } | | |
|     if(maximum_bit_rate_flag=1){ | | |
|         maximum_bit_rate | 8 | uimsbf |
|     } | | |
|     if(component_control_flag=1){ | | |
|         component_control_length | 8 | uimsbf |
|         for(j=0;j<N;j++){ | | |
|             component_tag | 8 | uimsbf |
|             digital_recording_control_data | 2 | bslbf |
|             maximum_bitrate_flag | 1 | bslbf |
|             reserved_future_use | 1 | bslbf |
|             copy_control_type | 2 | bslbf |
|             if(copy_control_type=01){ | | |
|                 APS_control_data | 2 | bslbf |
|             } | | |
|             else{ | | |
|                 reserved_future_use | 2 | bslbf |
|             } | | |
|             if(maximum_bitrate_flag=1){ | | |
|                 maximum_bitrate | 8 | uimsbf |
|             } | | |
|         } | | |
|     } | | |
| } | | |

FIG.6

DIGITAL COPY CONTROL INFORMATION

| DIGITAL COPY CONTROL INFORMATION | DESCRIPTION |
|---|---|
| 00 | "COPY FREE WITHOUT RESTRICTION" |
| 01 | TO BE DEFINED BY BROADCASTERS [*1] |
| 10 | "COPY ONE GENERATION" [*2] |
| 11 | "COPY NEVER" |

*1: BROADCASTERS CAN INDEPENDENTLY DEFINE
*2: ALTHOUGH RECEIVED BROADCAST SIGNAL CAN BE RECORDED (FIRST-GENERATION-COPIED), THE RECORDED SIGNAL CANNOT BE COPIED.

FIG.7

RECEIVING PROCESS STANDARD OF CONTENT AVAILABILITY DESCRIPTOR

| RECEIVING PROCESS STANDARD OF EACH FIELD ||
|---|---|
| descriptor_tag | ="0xDE": JUDGE DESCRIPTOR TO BE CONTENT AVAILABILITY DESCRIPTOR |
| descriptor_length | JUDGE VALUE TO BE DESCRIPTOR LENGTH OF CONTENT AVAILABILITY DESCRIPTOR |
| digital_recording_control_mode | ="1": JUDGE CONTENTS TO BE RECORDABLE AS "COPY FREE WITH LIMIT OF THE NUMBER" WHEN DIGITAL COPY CONTROL INFORMATION INDICATES "COPY ONE GENERATION"<br>="0": JUDGE CONTENTS NOT TO BE RECORDABLE AS "COPY FREE WITH LIMIT OF THE NUMBER" WHEN DIGITAL COPY CONTROL INFORMATION INDICATES "COPY ONE GENERATION" |
| image_constraint_token | JUDGE RESOLUTION OF VIDEO SIGNAL OUTPUT NOT TO BE CONSTRAINED NO MATTER WHAT VALUE IS SET |
| retention_mode | JUDGE TEMPORARY STORE TO BE POSSIBLE NO MATTER WHAT VALUE IS SET |
| retention_state | JUDGE PERMITTED TEMPORARY STORE TIME TO BE ONE HOUR AND A HALF NO MATTER WHAT VALUE IS SET |
| encryption_mode | ="1": JUDGE HIGH-SPEED DIGITAL INTERFACE OUTPUT NOT TO BE PROTECTED WHEN DIGITAL COPY CONTROL INFORMATION INDICATES "COPY FREE WITHOUT RESTRICTION"<br>="0": JUDGE HIGH-SPEED DIGITAL INTERFACE OUTPUT TO BE PROTECTED WHEN DIGITAL COPY CONTROL INFORMATION INDICATES "COPY FREE WITHOUT RESTRICTION" |

FIG.8

OPERATION OF CONTENTS PROTECTION

| SERVICE TYPE | GENERATION RESTRICTION USING DIGITAL COPY CONTROL INFORMATION | | | | |
|---|---|---|---|---|---|
| | COPY FREE | COPY FREE (OUTPUT PROTECTION) | COPY FREE WITH LIMIT OF THE NUMBER | COPY ONE GENERATION | COPY NEVER |
| PAY-PER-VIEW · PAYS VIEWING FEE FOR ONE PROGRAM OR FOR A PARTICULAR GROUP OF PROGRAMS | OPERABLE | OPERABLE | OPERABLE | OPERABLE | OPERABLE |
| MONTHLY PAY-BROADCASTING etc. · FLAT/TIER | OPERABLE | OPERABLE | OPERABLE | OPERABLE | NOT OPERABLE |
| CHARGE-FREE PROGRAM ACCOMPANIED BY CONTENTS PROTECTION (FREE CONDITIONAL ACCESS DELIVERY) | OPERABLE | OPERABLE | OPERABLE | OPERABLE | NOT OPERABLE |
| OTHER THAN THE ABOVE | OPERABLE | NOT OPERABLE | NOT OPERABLE | NOT OPERABLE | NOT OPERABLE |

FIG.9

STORING (RECORDING) CONTROL BY DIGITAL COPY CONTROL DESCRIPTOR AND CONTENT AVAILABILITY DESCRIPTOR

| DIGITAL COPY CONTROL DESCRIPTOR | | CONTENT AVAILABILITY DESCRIPTOR | | STORING (RECORDING) CONTROL |
|---|---|---|---|---|
| copy_control_type | digital_recording_control_data | encryption_mode | digital_recording_control_mode | |
| Don't care | 00 | 1 | Don't care | RECORDABLE AS "COPY FREE WITHOUT RESTRICTION" |
| | | 0 | | RECORDABLE AS "COPY FREE WITHOUT RESTRICTION" ALTHOUGH ENCRYPTION IS REQUIRED |
| | 10 | Don't care | 1 | RECORDABLE AS "COPY FREE WITH LIMIT OF THE NUMBER" * |
| | | | 0 | RECORDABLE AS "NO MORE COPIES" |
| | 01 | Don't care | Don't care | NOT RECORDABLE |
| | 11 | Don't care | Don't care | NOT RECORDABLE |
| WITHOUT DESCRIPTOR | | | Don't care | RECORDABLE AS "COPY FREE WITHOUT RESTRICTION" |

* OR RECORDABLE AS "NO MORE COPIES"

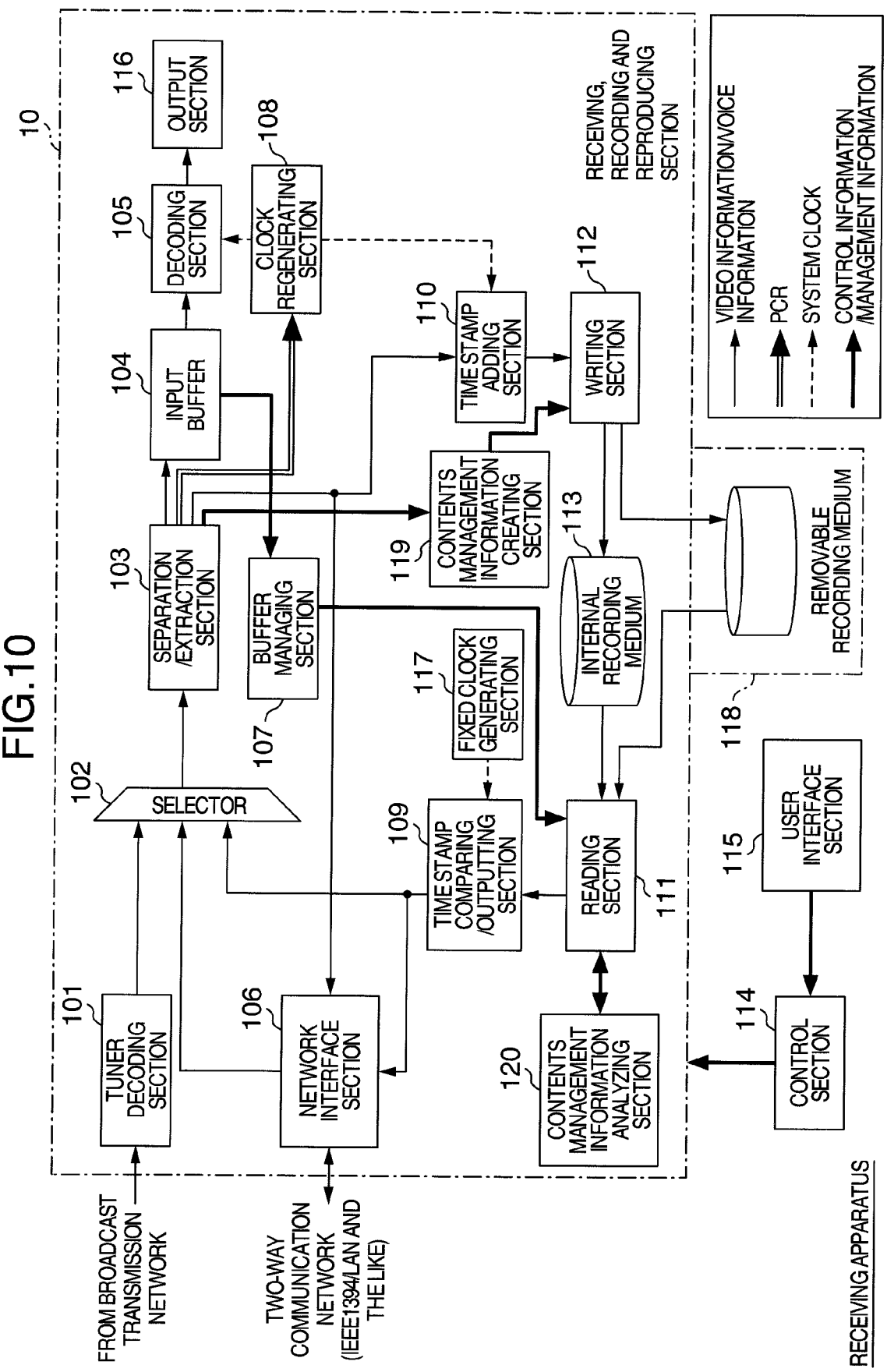

| | |
|---|---|
| Retention_Move_Mode | TEMPORARY STORE AND MOVE MODE |
| Retention_State | TEMPORARY STORE PERIOD |
| EPN | EPN ASSERTED COPY FREE |
| DTCP_CCI | COPY CONTROL INFORMATION |
| Copy_count_Mode | VALID/INVALID Count |
| Count | COPY NUMBER |
| Image_Constraint_Token | RESOLUTION CONSTRAINT INFORMATION |
| APS | ANALOG PROTECTION |

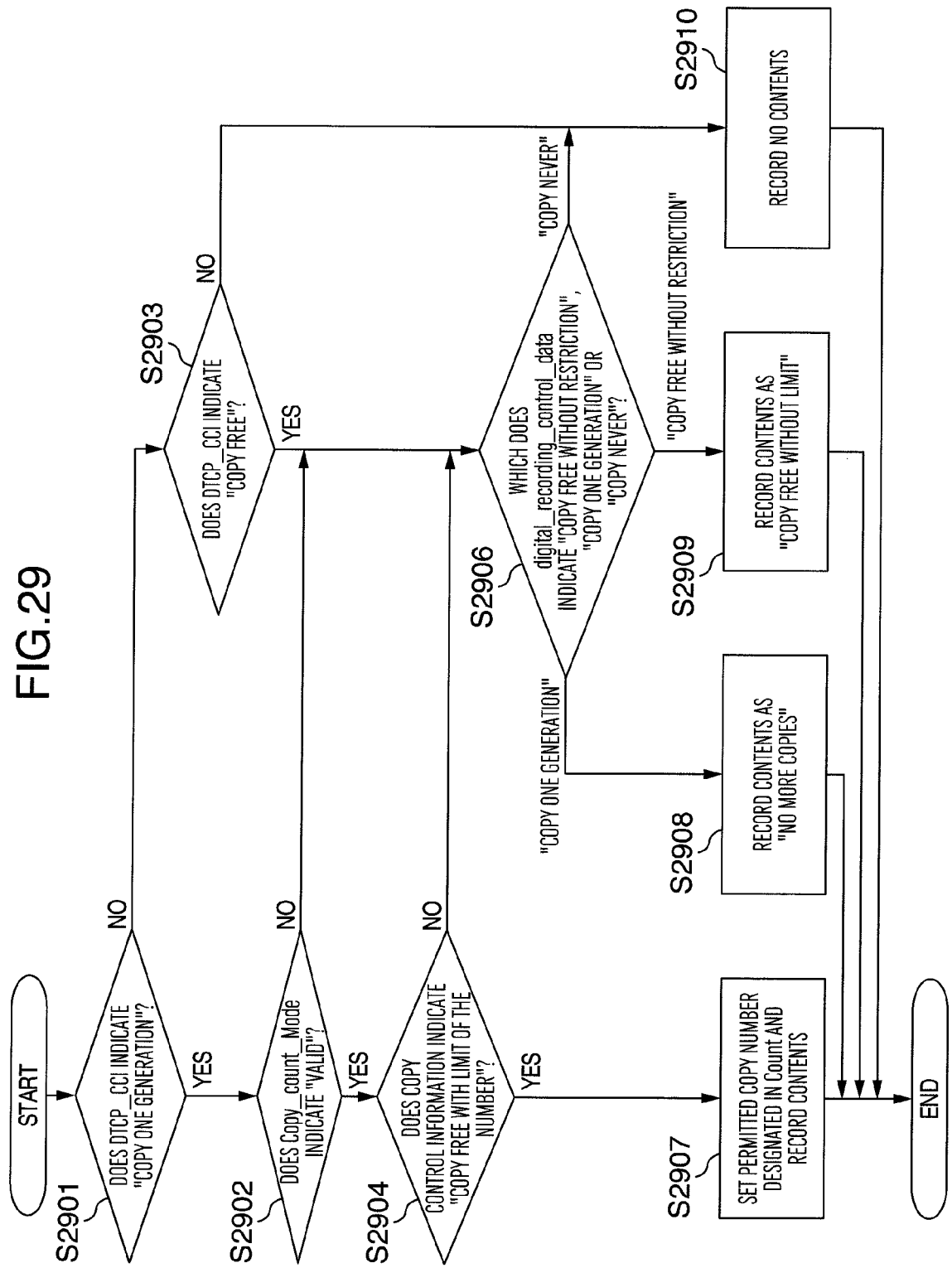

FIG.30

| Retention_Move_Mode | TEMPORARY STORE AND MOVE MODE |
|---|---|
| Retention_State | TEMPORARY STORE PERIOD |
| EPN | EPN ASSERTED COPY FREE |
| DTCP_CCI | COPY CONTROL INFORMATION |
| Count | COPY NUMBER |
| Image_Constraint_Token | RESOLUTION CONSTRATION INFORMATION |
| APS | ANALOG PROTECTION |
| License Acquisition Start | DATE AND TIME WHEN LICENSE ACQUISITION BECOMES POSSIBLE |
| License Acquisition Limit | DATE AND TIME WHEN LICENSE ACQUISITION BECOMES IMPOSSIBLE |
| Playback Not Before | REPRODUCTION IS IMPOSSIBLE BEFORE THE INDICATED TIME |
| Playback Not After | REPRODUCTION IS IMPOSSIBLE AFTER THE INDICATED TIME |

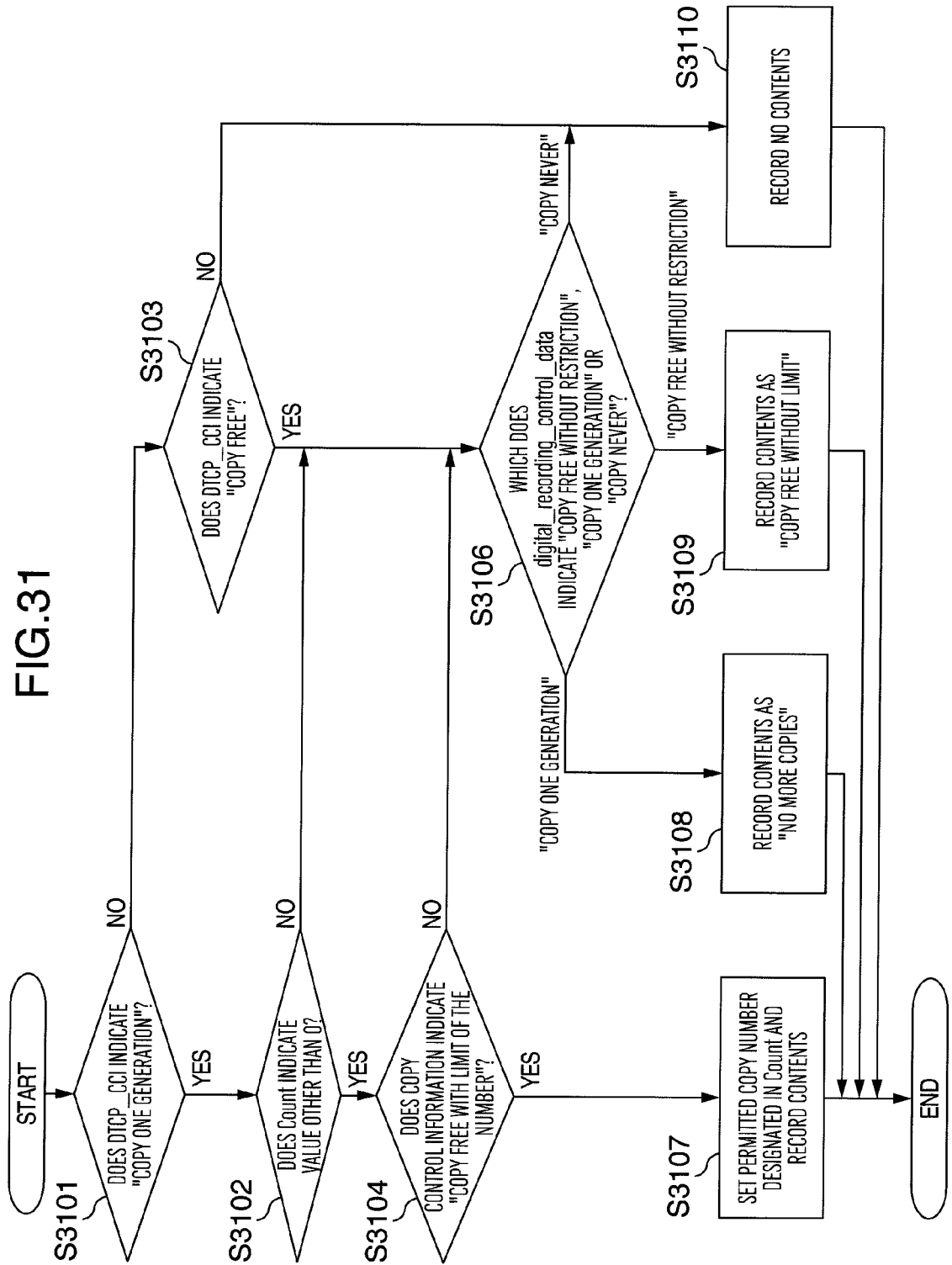

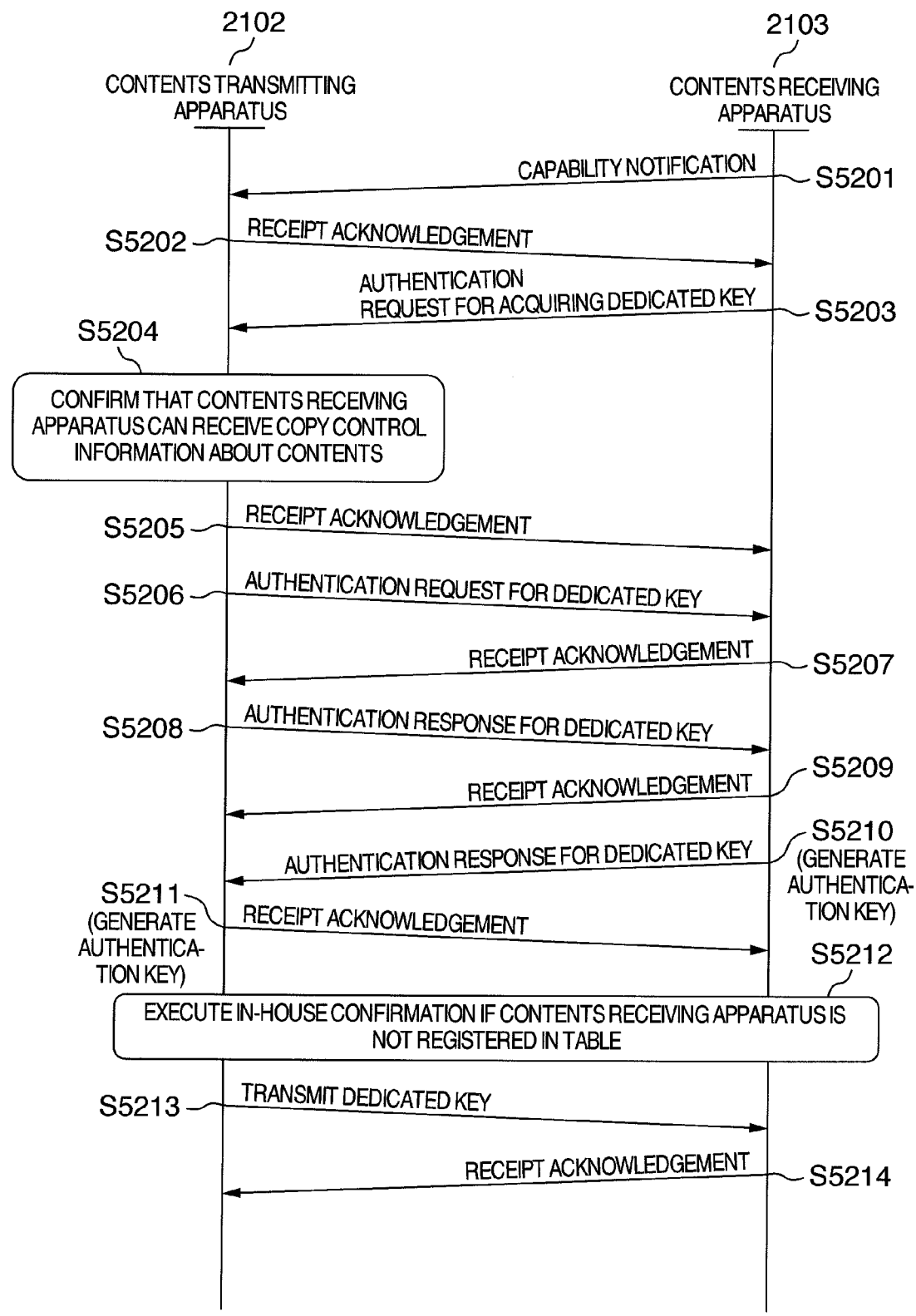

COPY CONTROL METHOD

INCORPORATION BY REFERENCE

The present application claims priorities from Japanese applications JP 2010-202608 filed on Sep. 10, 2010, JP 2010-202609 filed on Sep. 10, 2010, the contents of which are hereby incorporated by reference into this application.

BACKGROUND OF THE INVENTION

The present invention relates to the technical field of copy control of contents.

In relation to the above technical field, JP-A-2002-319227 describes as follows:

The problem to be solved is "to enhance the usability at the time of changing information whose first generation is only permitted to be copied ("Copy One Generation") to information whose further generation is inhibited to be copied ("Copy No More") to record it"; and The solution is "to permit copying only one generation ("Copy One Generation") within a predetermined time period after recording to make up for a part the recording of which has been interrupted due to troubles during the recording, and to record the two identical streams on a medium so that one can be used for normal viewing and the other can be moved to another medium and stored therein as needed".

SUMMARY OF THE INVENTION

Recently, a recording apparatus capable of recording digital broadcast has spread, accompanying expansion of digital broadcast services.

In recording digital broadcast, received digital broadcast is recorded on an HDD (hard disk drive) included in the recording apparatus, and a digital broadcast program is copied from the HDD to other recording media (for example, an optical disk, a semiconductor memory or another HDD) when the digital broadcast program can be copied ("Copy Free"), or moved thereto when recording of one generation of the digital broadcast program is permitted ("Copy One Generation": this means that copying a copy (copying two or more generations) are not permitted).

In the recording apparatus according to JP-A-2002-319227, copying is permitted within a prescribed time period even if the digital broadcast program is specified as "Copy One Generation". Therefore, in the case of occurrence of interruption of recording, the interrupted part can be made up for.

However, when the prescribed time period has passed in the recording apparatus according to JP-A-2002-319227, copying is not permitted similarly to conventional recording apparatuses. For example, it is conceivable that, when accesses are concentrated to the HDD due to a lot of programs to be recorded in a recording apparatus which is not capable of recording a program to an HDD and copying the program from the HDD to an optical disk at the same time, the prescribed time period has passed potentially before copying from the HDD to the optical disk is completed.

In order to solve the above problem, in an aspect of the present invention, if digital contents are copied from a first recording apparatus through LAN to a second recording apparatus, then authentication is executed between the first recording apparatus and the second recording apparatus, and a dedicated key information is shared to be used for confirming the capability of move processing with a predetermined copy number being kept and encrypting/decrypting the digital contents moved with the predetermined copy number being kept. Then, the digital contents recorded and managed in the first recording apparatus is added with the information about the predetermined number of multiple copies, and transmitted.

According to the above means, in the case of recording a digital broadcast program, it is possible to enhance the usability of recorded contents while performing copy control.

Other objects, features and advantages of the invention will become apparent from the following description of the embodiments of the invention taken in conjunction with the accompanying drawings.

BRIEF DESCRIPTION OF THE DRAWINGS

FIG. 3 shows a structure example of content availability descriptor, which is one of pieces of copy control information;

FIG. 4 shows a description example of respective fields in the content availability descriptor;

FIG. 5 shows a structure example of digital copy control descriptor which is one of pieces of copy control information;

FIG. 6 shows an example of information controlling copy generations;

FIG. 7 shows an example of the receiving process in a receiving apparatus 3 of each field of the content availability descriptor sent out from the transmitting apparatus 1;

FIG. 8 shows an operation example for the transmitting apparatus 1 to protect program contents by using the copy control information;

FIG. 9 shows a control example in the case where the receiving apparatus 3 uses the copy control information to store (record) program contents;

FIG. 10 is a block diagram showing a configuration example of the receiving apparatus 3;

FIG. 29 is a diagram illustrating an example of a recording process related to copy control information;

FIG. 30 is a diagram showing an example of another format of the copy control information about contents data in DTCP;

FIG. 31 is a diagram illustrating an example of the recording process related to the copy control information;

FIG. 52 is a diagram illustrating an example of an apparatus authentication procedure executed when delivering contents added with the permitted copy number information.

DETAILED DESCRIPTION OF THE EMBODIMENTS

A preferred embodiment of the present invention will be described below. However, the present invention is not limited to this embodiment. This embodiment mainly relates to handling the information specified as "Copy One Generation".

<System>

Figure 1:
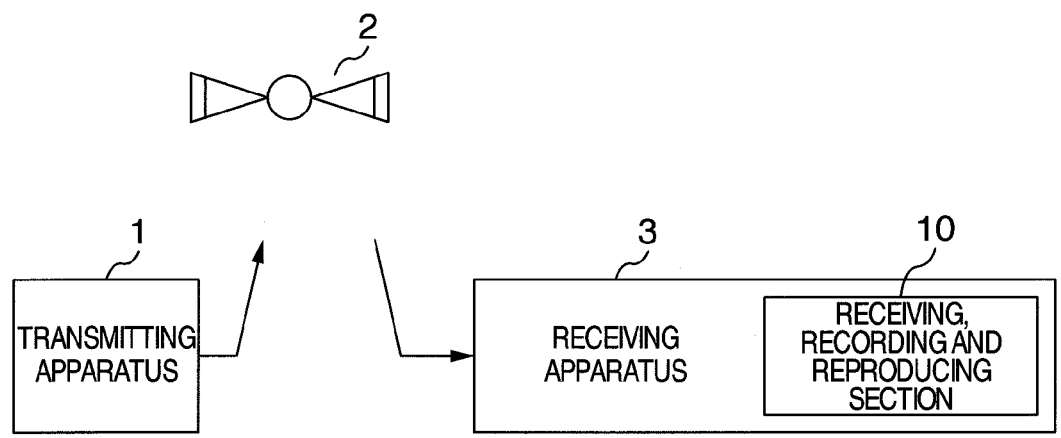
FIG. 1 is a block diagram showing a configuration example of a system.

FIG. 1 is a block diagram showing a configuration example of a system of this embodiment, which illustrates the case of transmitting/receiving information via broadcast to record and reproduce it.

Reference numeral 1 denotes a transmitting apparatus installed in an information providing station such as a broadcasting station. Reference numeral 2 denotes a relay apparatus installed in a relay station, a broadcast satellite or the like. Reference numeral 3 denotes a receiving apparatus installed in a user's house or the like. Reference numeral 10 denotes a receiving, recording and reproducing section included in the receiving apparatus 3. In the receiving, recording and reproducing section 10, broadcasted information can be recorded and reproduced.

The transmitting apparatus 1 transmits a modulated signal wave via the relay apparatus 2. In addition to transmission by a satellite as shown in FIG. 1, for example, transmission by a cable, transmission by a telephone line, transmission by terrestrial broadcast, transmission using IP (Internet Protocol) via a network such as the Internet, and the like can be also used. As described later, after signal wave received by the receiving apparatus 3 is demodulated into an information signal, it is converted into a signal suitable for recording as needed. In the case where a display is included in the receiving apparatus 3, the user can view and hear video and voice indicated by the information signal with the display. In the case where a display is not included, the user can view and hear video and voice by connecting the receiving apparatus 3 with a display not shown.

<Transmitting Apparatus>

Figure 2:
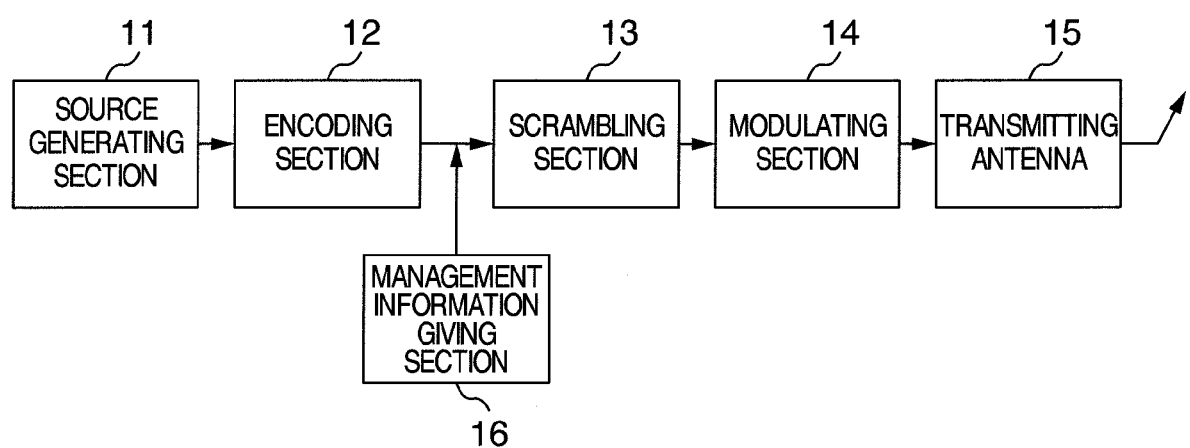
FIG. 2 is a block diagram showing a configuration example of a transmitting apparatus 1.

FIG. 2 is a block diagram showing a configuration example of the transmitting apparatus 1 in the system in FIG. 1.

Reference numeral 11 denotes a source generating section. Reference numeral 12 denotes an encoding section which performs compression by an MPEG system, an H.264 system or the like. Reference numeral 13 denotes a scrambling section. Reference numeral 14 denotes a modulating section. Reference numeral 15 denotes a transmitting antenna. Reference numeral 16 denotes a management information giving section. The information such as video and voice is generated by the source generating section 11 such as a camera and a recording and reproducing apparatus, and the data volume of the information is compressed by the encoding section 12 so that the information can be transmitted in a narrower band. The information is transmission-encrypted by the scrambling section 13 as needed so that it can be viewed and heard by particular viewers. The information is transmitted toward the relay apparatus 2 as a radio wave from the transmitting antenna 15 after being modulated by the modulating section 14 into a signal suitable for transmission such as OFDM, TC8PSK and QPSK. At this time, the management information giving section 16 adds information such as copy control information and current time.

It is often the case that multiple pieces of information is multiplexed in one radio wave in a time division method, a spectrum spread method or the like. In this case, there are provided multiple source generating sections 11 and encoding sections 12, and a multiplexing section for multiplexing multiple pieces of information is placed between the encoding sections 12 and the scrambling section 13, although they are not shown in FIG. 2 for the purpose of simplification.

<Copy Control Information>

Copy control information is the information for controlling the copy permission/inhibition, the limit of the copy number, etc., for example, the information added by the management information giving section 16. The information includes content availability descriptor, digital copy control descriptor and the like.

FIG. 8 shows an operation example in which the transmitting apparatus protects program contents by using the copy control information.

"Operable" indicates that a transmitting side can select the indicated generation restriction using the digital copy control information about contents corresponding to each service type. For example, it is indicated that any digital copy control information may be used for "pay-per-view". On the other hand, it is indicated that the transmission side cannot select "Copy Never" for "monthly-pay-broadcasting etc."

As for "flat/tier", a contract for multiple channels via pay-broadcasting or the like is called a flat contract, and a contract for each channel is called a tier contract.

"Other than the above" includes, for example, "a program which is neither pay-broadcasted nor accompanied by contents protection".

FIG. 3 shows a structure example of content availability descriptor, which is one of the pieces of copy control information. The content availability descriptor is, for example, generated and added by the management information giving section 16, and stored in PSI (Program Specific Information) (for example, PMT (Program Map Table)), or SI (Service Information) (for example, EIT (Event Information Table) or SDT (Service Description Table)) of MPEG-TS, to be sent out.

The content availability descriptor is placed (sent out) to describe the control information about storing (recording) or outputting the program. Its meaning is as follows: In the case where the 1-bit field of "digital_recording_control_mode" (digital copy mode bit) is "1", contents are recordable as "Copy Free with Limit of the Number" even if "digital_recording_control_data" of the digital copy control descriptor described in FIG. 5 indicates "Copy One Generation". In the case of "0", contents are not recordable as "Copy Free with Limit of the Number".

The content availability descriptor should be necessarily placed (sent out) when the program is subject to output protection. This output protection means protecting the high-speed digital interface output of contents specified as "Copy Free without Restriction" using an output protection bit ("encryption_mode") of the content availability descriptor. In other words, although encryption is performed at the time of outputting at a digital interface or copying to a recording medium, the copy number and the generation are not restricted. Retransmission to the Internet is substantially impossible. Such copying is also referred to as "Copy Free with Output Protection" or EPN (encryption plus non-assertion).

The content availability descriptor should be necessarily placed (sent out), if the digital copy control information about the program indicates "Copy One Generation", and contents are not recordable as "Copy Free with Limit of the Number".

FIG. 4 shows a description example of respective fields in the content availability descriptor.

"0xDE" is described in "descriptor_tag", and means the content availability descriptor. The descriptor length of the content availability descriptor is described in "descriptor_ length". In "digital_recording_control_mode", "0" is described if the digital copy control information indicates "Copy One Generation" and contents are not recordable as "Copy Free with Limit of the Number", and "1" is described if the digital copy control information indicates "Copy One Generation" and contents are recordable as "Copy Free with Limit of the Number".

"0" is described in "encryption_mode", if the digital copy control information indicates "Copy Free without Restriction" and high-speed digital interface output is to be protected.

In "retention_mode" which means a temporary store control bit, "0" is described which indicates that temporary store is possible even if "digital_recording_control_data" (digital copy control information) of the digital copy control descriptor indicates "Copy Never". In "retention_state" which means permitted temporary store time, "111" is described which indicates that it is possible to store for an hour and a half. In a default state, "1" is described in "image_constraint_token", "retention_state" and "encryption_mode".

As for the limit of the copy number of contents of "Copy Free with Limit of the Number", the total copy number including the contents of a copy source and copy destinations is limited to be ten or fewer. If there are provided a function of recording on a removable recording medium or a function of move via a high-speed digital interface output, the copy number including them is limited. Specifically, for example, it is assumed that, as for the contents of the copy source and the copy destinations, the copy number is limited or copying is inhibited ("No More Copies"), except for analog video/voice output and digital voice output. The contents of the copy source or the copy destinations may be moved within the above limit. It is assumed that what is used only for the purpose of management of contents such as a thumbnail is not included in the copies.

Respective fields will be also described later in FIG. 7 showing the receiving process.

FIG. 5 shows a structure example of digital copy control descriptor which is one of pieces of copy control information. The digital copy control descriptor is, for example, generated and added by the management information giving section 16, and stored in PSI (for example, PMT) or SI (for example, EIT or SDT) of MPEG-TS, to be sent out.

The digital copy control descriptor indicates information controlling the copy generation by the 2-bit field of "digital_recording_control_data" (digital copy control information).

FIG. 6 shows an example of the digital copy control information. The digital copy control information indicates "Copy Free without Restriction" if it is "00", indicates "depending on the definition by a broadcaster" if it is "01", indicates "Copy One Generation" if it is "10", and indicates "Copy Never" if it is "11". "Copy One Generation" means that, although recording a received broadcast signal is permitted (the first-generation copy), duplicating (copying) the recorded broadcast signal is not permitted.

The content availability descriptor in FIGS. 3 and 4 is also referred to as copy number restriction information, and the digital copy control information in FIGS. 5 and 6 is also referred to as copy generation restriction information.

<Receiving Apparatus>

FIG. 10 is a block diagram showing a configuration example of the receiving apparatus 3 in the system in FIG. 1. In FIG. 10, it is assumed that, at positions where lines indicating the flow of information, PCR or the like cross each other, the lines are not in contact with each other. However, as for positions attached with a black dot, it is indicated that lines are in contact with each other and that there is a branch therefrom.

The receiving apparatus 3 receives digital broadcast or IP (Internet Protocol) broadcast via a network to record and reproduce it. The description will explain how to handle a signal encoded by using MPEG (Moving Picture Experts Group) as an image compression technique and multiplexed by MPEG2-TS.

The receiving apparatus 3 includes the receiving, recording and reproducing section 10, a control section 114 (for example, a CPU (Central Processing Unit)), and a user interface section 115 (for example, an input device such as a keyboard, a mouse, and a remote controller).

Although the respective sections are illustrated as hardware components in this configuration example, some of them may be realized by software. The configuration example may also be applied to transmitting/receiving video contents, voice contents and the like to and from particular users of VOD (Video On Demand) and download via a network, etc. Such transmitting/receiving is also referred to generically as delivery.

The control section 114 is connected to each section (including the receiving, recording and reproducing section 10) of this receiving apparatus via a bus section to control the operation of the whole receiving apparatus. Furthermore, by receiving various kinds of instruction signals from the user via the remote controller or the like of the user interface section 115 to control each section connected via the bus section on the basis of the instruction signals, the control section 114 executes various processes.

The receiving, recording and reproducing section 10 includes a tuner decoding section 101, a selector 102, a separation/extraction section 103 (for example, a demultiplexer), an input buffer 104, a decoding section 105 (for example, an MPEG decoder), a network interface section 106, a buffer managing section 107, a clock regenerating section 108, a time stamp comparing/outputting section 109, a time stamp adding section 110, a reading section 111, a writing section 112, an internal recording medium 113, an output section 116, a fixed clock generating section 117 (for example, a crystal oscillator), a contents management information creating section 119 and a contents management information analyzing section 120.

The internal recording medium 113 (also referred to as a first recording medium) and a removable recording medium 118 (also referred to as a second recording medium) are random accessible media such as a hard disk drive (HDD), a semiconductor memory, a magnetic disk, an optical disk, and a magneto-optical disk.

The output section 116 is a composite video output terminal, an S video output terminal (S terminal) and a D video output terminal (D terminal) (these are analog video output terminals), an HDMI (High Definition Multimedia Interface) output terminal (digital video output terminal), or an optical voice output terminal (digital voice output terminal) for outputting analog or digital video data/voice data to a display section using CRT (Cathode Ray Tube); LCD (Liquid Crystal Display); PDP (Plasma Display Panel) or the like; a voice output section configured by a speaker or the like; or another display device or the like. The output section 116 reproduces decoded video/voice at a display section/voice output section which is an output device. Alternatively, it outputs video/voice contents data and the like to other display device, voice reproducing device and the like via output terminals (for example, HDMI) or the like. Since video/voice contents data from the output terminals are output in a format based on a contents protection system in accordance with the output standard for the contents data, contents are protected.

The tuner decoding section 101 receives a digital broadcast signal transmitted from the transmitting apparatus 1 via a wireless (satellite or terrestrial) or broadcast transmission network such as the cable. Tuning and detecting processes are performed at the frequency of a physical or virtual channel specified via a user operation section such as the remote controller of the user interface section 115 and the control section 114. MPEG2-TS (transport stream) which has undergone digital demodulation and error correction processing is output to the selector 102.

The selector 102 performs a three-input one-output selecting process in accordance with the control from the control section 114 to output to the separation/extraction section 103.

The separation/extraction section 103 separates/extracts a transport packet of a channel (program) specified via the user operation section such as the remote controller of the user interface section 115 and the control section 114 from the input MPEG2-TS, to output the separated/extracted transport packet to the time stamp adding section 110 and the network interface section 106. Furthermore, the separation/extraction section 103 separates/extracts PES (Packetized Elementary Stream) or ES (Elementary Stream) of video and voice from the transport packet of the channel (program) specified via the user operation section such as the remote controller of the user interface section 115 and the control section 114, to output it to the input buffer 104.

The ES refers to each of compressed/encoded image/voice data, and the PES is obtained by dividing image ES or voice ES to a suitable size of data and packetizing each of the divided data. The separation/extraction section 103 extracts PCR (Program Clock Reference) from the transport packet of the channel (program) specified via the user operation section such as the remote controller of the user interface section 115 and the control section 114, to output it to the clock regenerating section 108.

The separation/extraction section 103 detects the title, starting and ending date/time of the program, and copy generation control information and multiple copies permission/inhibition information of the channel (program) to be recorded on the internal recording medium 113 or the removable recording medium 118, from the transport packet of the channel (program) specified via the user operation section of the user interface section 115 such as the remote controller and the control section 114, and further creates a cipher key for the data, to output them to the contents management information creating section 119. The title, the starting/ending date and time of the program, the copy generation control information, and the multiple copies permission/inhibition information are stored, for example, in PSI or SI information of MPEG-TS to be sent out from the transmitting apparatus 1.

The input buffer 104 temporarily stores the video/voice PES or ES from the separation/extraction section 103. By comparing DTS (Decoding Time Stamp)/PTS (Presentation Time Stamp) corresponding to the video/voice PES or ES stored in the input buffer 104 with STC (System Time Clock) count value from the clock regenerating section 108 to get decode display timing, the decoding section 105 takes out the video/voice PES or ES stored in the input buffer 104 to output the decoded video/voice to the output section 116.

The buffer managing section 107 monitors the quantity of transports packets in the input buffer 104 which have not been processed by the decoding section 105 to control start and stop of reading by the reading section 111 according to the quantity.

The clock regenerating section 108 uses PCR to regenerate a system clock of the receiving apparatus whose frequency corresponds to the system clock of an encoding/multiplexing section on the transmitting apparatus 1 not shown. The regenerated system clock is output to an STC counter in the clock regenerating section 108, the time stamp adding section 110 and the like. An STC count value of the STC counter which operates on the basis of the regenerated system clock is output to the decoding section 105.

The time stamp adding section 110 generates a time stamp, for example, in accordance with the system clock regenerated by the clock regenerating section 108 or a counter operating on the basis of a crystal oscillator not shown and adds the time stamp to each of the transport packets separated/extracted by the separation/extraction section 103, to output the transports packets to the writing section 112.

Figure 11:
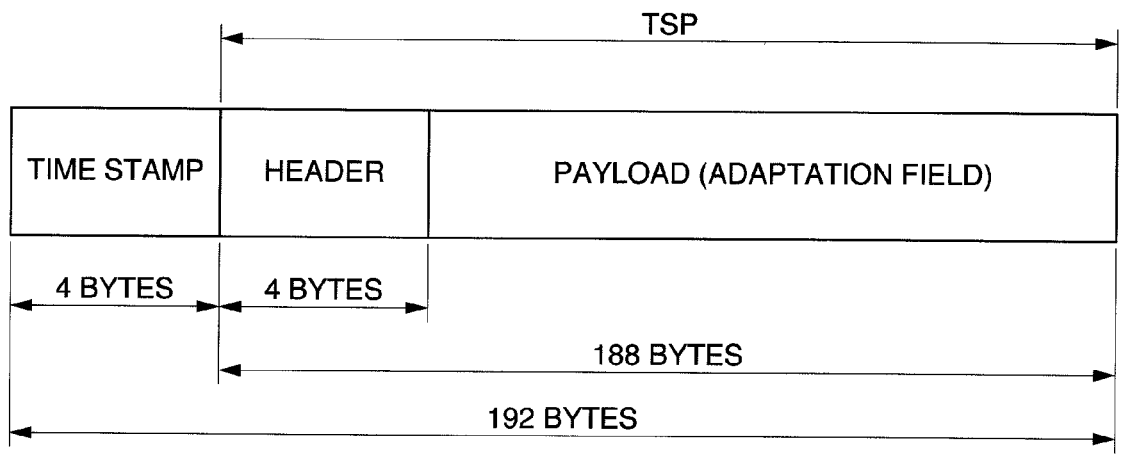
FIG. 11 is a diagram showing an example of a transport packet added with a time stamp.

FIG. 11 shows an example of a transport packet added with a time stamp. A transport packet (TSP) with the length of 188 bytes in accordance with MPEG standard becomes a packet with the length of 192 bytes added with a 4-byte time stamp (for example, indicating the time when the receiving apparatus receives the transport packet) at the top. The time stamp holds time stamp information about the time when the transport packet arrives. TS in accordance with MPEG standard is composed of a 4-byte header at the top and a subsequent 184-byte payload (or an adaptation field).

The contents management information creating section (contents information creating section) 119 creates management information on the basis of the title, the starting/ending date and time of the program, the copy generation control information, the copy number control information (indicating multiple copies permission/inhibition), and the key information from the separation/extraction section 103, to output them to the writing section 112. As for the copy generation control information and the copy number control information, the content availability descriptor and the digital copy control descriptor described with reference to FIGS. 3 to 6 received from the transmitting apparatus 1 may be used as management information as they are, or new information may be created on the basis of them.

The writing section 112 records the management information created by the contents management information creating section 119 and the encrypted data obtained by encryption processing of the transport packets added with the time stamps by the time stamp adding section 110, on the basis of the key information in the management information, on the internal recording medium 113 or the removable recording medium 118. As a result, one stream having multiple encrypted data obtained by encryption processing of transport packets which have been added with time stamps and which include video/voice data of a certain channel (in other words, certain program contents or downloaded contents) is stored on the internal recording medium 113 or the removable recording medium 118 as one data file or two or more fragmented data files obtained by dividing the one file.

The time stamp can be also referred to as time information about temporal position of a transport packet to which the stamp is attached. For example, the time stamp can be said to indicate the clock time of a time point when a transport packet from the separation/extraction section 103 is input to the time stamp adding section 110 or time difference from a reference transport packet (for example, the immediately previous or the top transport packet). As described before, this time stamp is different from a time stamp included in a transport packet in advance (for example, PCR, DTS or PTS).

Figure 12:
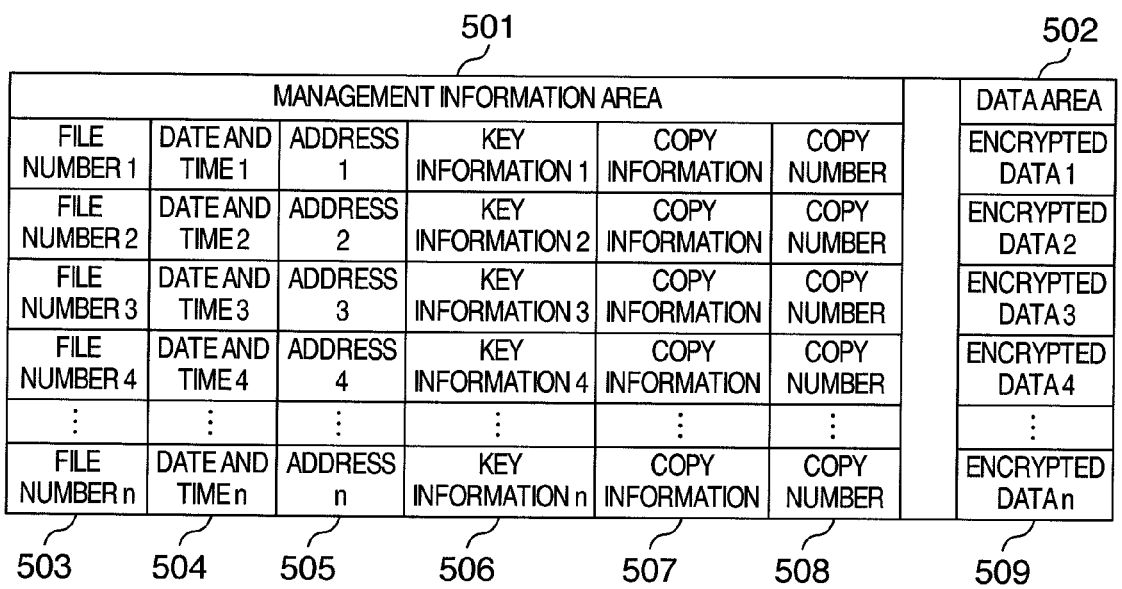
FIG. 12 is a diagram showing an example of program contents recorded on a recording medium.

FIG. 12 shows an example of program contents recorded on the internal recording medium 113 or the removable recording medium 118.

For each program, management information which indicates the subject included in the program contents and data (video, voice and the like) which is the substance of the program contents are recorded on a management information area 501 and a data area 502, respectively. In the management information, for example, the file number 503 indicating the title of the program contents, the date and time 504 indicating the starting/ending date and time of the program, the data area top address and recording size 505, the copy information 507, the copy number 508, the key information 506 and the like are recorded. Into the data area 502, program contents are written from an address corresponding to the top address 505 recorded on the management information area 501. Each time program contents are newly recorded, management information recording file number 1, file number 2, file number n, etc. and the program contents are successively recorded.

The copy information 507 is copy generation control information included in the management information created by the contents management information creating section 119 and is conceived to be, for example, the following 2-bit signals for designating the copy generation control information:

00=permits copying ("Copy Free");

10=permits recording of one generation ("Copy One Generation"); and

11=inhibits copying ("Copy Never").

In this case, it is defined that, if program contents recorded as "Copy One Generation" at the receiving apparatus 3 is copied once with "10=Copy One Generation", the recorded program contents cannot be copied any more ("No More Copies"). The way of the designation may be the same as that in the case of the digital copy control information described with reference to FIG. 6 or may be determined independently by the receiving apparatus 3.

The copy number 508 is the copy number control information included in the management information created by the contents management information creating section 119. The copy number 508 is information created on the basis of the copy generation control information and the multiple copies permission/inhibition information which the contents management information creating section 119 has received from the separation/extraction section 103. If the copy generation control information indicates "Copy One Generation" and the multiple copies permission/inhibition information indicates "permit", information indicating the permitted copy number including copies to the same or a different recording medium in the same or a different format is stored, in which, for example, "9" meaning that nine copies are permitted is input. It is desirable that this numerical value is in conformity with a standard or the like. On the other hand, if the copy generation control information indicates "Copy One Generation" and the multiple copies permission/inhibition information indicates "inhibit", the program contents are recorded as "No More Copies", and "0" (meaning that copying is not permitted) is input in the permitted copy number as the information indicating multiple copies inhibition.

The copy generation control information and the multiple copies permission/inhibition information are not changed, which are included in the substance data of program contents recorded as "No More Copies" to which program contents specified as "Copy One Generation" are changed, that is, in the PSI or SI of the MPEG-TS sent out from the transmitting apparatus 1.

The copy information 507, the copy number 508 and the key information 506 are, for example, encrypted so that they are not wrongly falsified.

Returning to the description of FIG. 10, in the case of reading the management information stored in the internal recording medium 113 or the removable recording medium 118 via the reading section 111, analyzing the management information, and reproducing, copying or moving the program contents stored in the internal recording medium 113 or the removable recording medium 118, the contents management information analyzing section 120 hands over the title, the starting/ending date and time of the program, the copy information, the copy number and the like of the program contents to the control section 114 so that the program contents can be selected via the user operation section such as the remote controller of the user interface section 115 and the control section 114. Key information for decrypting encrypted data is handed over to the reading section 111.

The reading section 111 is controlled via the buffer managing section 107 or the control section 114, and it reads the management information from the internal recording medium 113 or the removable recording medium 118 to output it to the contents management information analyzing section 120, and sequentially reads the encrypted data from the internal recording medium 113 or the removable recording medium 118 to output the transport packets added with the time stamps obtained by decryption processing of the encrypted data on the basis of the key information handed over from the contents management information analyzing section 120, to the time stamp comparing/outputting section 109.

The time stamp comparing/outputting section 109 compares the counter value of the counter operating on the basis of the fixed clock regenerating section 117 such as a crystal oscillator, with the time stamp of the time-stamped transport packet read by the reading section 111. If they correspond to each other, the time stamp comparing/outputting section 109 may delete (eliminate) the time stamp from the transport packet to output it to the selector 102 and the network interface section 106. However, in the case where the remaining quantity in the input buffer 104 is monitored by the buffer managing section 107 to control the reading section 111 according to the quantity, as described above, the time stamp comparing/outputting section 109 may also delete a time stamp from a transport packet without comparing the counter value and the time stamp to output the transport packet to the selector 102 and the network interface section 106. Especially at the time of reproduction other than normal reproduction (reproduction at normal speed), it is preferable to output a transport packet in this way.

The network interface section 106 is connected to other apparatuses (a recorder, a display, a personal computer and the like in the house or a server outside the house) which are output destinations/input sources, via a line (via an IEEE1394 cable or a LAN cable, or wirelessly). The network interface section 106 receives transport packets of video/voice or the like from which a time stamp has been deleted by the time stamp comparing/outputting section 109 or transport packets separated/extracted by the separation/extraction section 103 and converts the transport packets to the format in accordance with each transmission standard, to output via the line the video/voice data stored in the internal recording medium 113 and the removable recording medium 118 or video/voice data of the digital broadcast signal received by the tuner decoding section 101, to another apparatus which is an output destination. Data of video/voice and the like are input in the formats in accordance with each transmission standard via the line from another apparatus which is an input source, converted by the network interface section 106 to a transport packet, and output to the selector 102. There may be multiple network interface sections 106.

<Receiving and Recording Process Related to Copy Control Information>

Description will be made on a detailed example of a process by the receiving apparatus 3 related to the copy control information sent out from the transmitting apparatus 1, which has been described with reference to FIGS. 3 to 6.

FIG. 7 shows an example of processing for each field of content availability descriptor in the receiving apparatus 3.

If "descriptor_tag" indicates "0xDE", the descriptor is judged to be content availability descriptor. From "descriptor_length", the descriptor length of content availability descriptor is judged. In the case where digital copy control information indicates "Copy One Generation" if "digital_recording_control_mode" indicates "1", contents are judged to be recordable as "Copy Free with Limit of the Number", and if "digital_recording_control_mode" indicates "0", contents are judged not to be recordable as "Copy Free with Limit of the Number". As for "image_constraint_token", the resolution of video signal output is judged not to be restricted no matter what value is indicated. As for "retention_mode", temporary store is judged to be possible no matter what value is set. As for "retention_state", permitted temporary store time is judged to be one hour and a half no matter what value is set. In the case where the digital copy control information indicates "Copy Free without Restriction", if "encryption_mode" indicates "1", the high-speed digital interface output of contents is judged not to be protected, and if "encryption_mode" indicates "0", the high-speed digital interface output of contents is judged to be protected.

If the content availability descriptor is not placed (sent out) for some reason, the fields can be interpreted to indicate the following values:
"digital_recording_control_mode"="1", "image_constraint_ token"="1", "retention_mode"="0", "retention_state"="111" and "encryption_mode"="1".

FIG. 9 shows a control example in the case where the receiving apparatus 3 stores (records) program contents by using the copy control information.

The contents shown by FIG. 9 are as follows. For example, at the time of storing program contents, the program contents are stored with copy control information on a recording medium as "No More Copies", if "digital_recording_control_ data" of the digital copy control descriptor indicates "10" and "Copy One Generation" is specified. However, if "digital_recording_control_mode" indicates "1", the program contents are stored with the copy control information as "Copy Free with Limit of the Number". It is not necessary to change the value of "digital_recording_control_data" of the digital copy control descriptor even in the case of storing the program contents as "No More Copies".

If "digital_recording_control_data" of the digital copy control descriptor indicates "10" and "Copy One Generation" is specified, multiple copies must not be generated except for storing for the purpose of backup on an area which cannot be accessed by the user. The above restrictions are imposed on each broadcast receiving section. If there are multiple broadcast receiving sections, the above limit of the copy number of contents is to be imposed on each broadcast receiving section.

As for "Copy Free with Limit of the Number", N copies can be generated from program contents stored as "Copy Free with Limit of the Number". For example, the value of N can be in conformity with the standard. In the case of generating copies via the high-speed digital interface output, copying may be performed by using a moving function or the like, in the case where it can be determined how many copies to be generated, for example, where the interface is IEEE1394 based and the output destination is recognized to be an apparatus compatible with DTCP standard. The generated copies are assumed to be specified as "No More Copies" or the equivalent thereto.

Via the high-speed digital interface output, in the case of reproducing and outputting program contents stored as "Copy Free with Limit of the Number", "No More Copies" process prescribed in DTCP (Digital Transmission Content Protection) is performed to output them. Via analog video output and digital voice output, the program contents can be output as "Copy One Generation".

As for restriction of the copy number of contents specified as "Copy Free with Limit of the Number", the total copy number including a copy source and copy destinations is limited to be ten or fewer. If there is provided a recording function on a removable recording medium or a moving function via the high-speed digital interface output, the total copy number including the copy number by the functions is limited. Specifically, for example, as for contents of a copy source and copy destinations, it is assumed that the copy number is limited or copying is inhibited ("No More Copies") except for analog video/voice output and digital voice output. The contents of the copy source or the copy destinations may be moved within the above restriction.

As for digital recording (copying) on a recording medium or copying via the high-speed digital interface output of contents recorded (stored) as "Copy Free with Limit of the Number", nine or less copies can be generated in addition to the recorded (stored) original contents, except for recording (storing) for the purpose of backup during recording and after recording on an area which cannot be accessed by the user. The original contents after generating the specified number (nine) of copies can be moved similarly to contents specified as "No More Copies".

It is also possible to move contents managed as "Copy Free with Limit of the Number" to an internal or digitally connected recording medium with the managed copy number being kept. In this case, the total copy number must not change before and after the move.

Management of the copy number in copying contents specified as "Copy Free with Limit of the Number" to an internal recording medium and copying the contents via the high-speed digital interface is equivalent to the case where there are movable ten sets of contents. Analog video output and digital voice output are possible as "Copy One Generation" without limit of the copy number.

As for recording on a removable recording medium, contents can be recorded as "Copy Free with Limit of the Number" if the same management of the copy number as the above management is possible. However, in the case of recording contents on a removable recording medium and a storing medium or on multiple removable recording media at the same time, shared management of the media is performed so that the total copy number permitted for all the multiple removable recording media and storing media does not exceed the limit of the copy number of each broadcast receiving section. To move contents recorded as "Copy Free with Limit of the Number" with the copy number of the contents being kept means moving all or a part of the copy number managed by a move source. In this case, it should be noted that the total copy number must not change between before and after the move. Specifically, if the permitted copy number of contents before move is m, and n among m are to be moved, then the permitted copy number of the contents at the move source is (m−n), and the permitted copy number of the contents at a move destination is (n−1). It is assumed that copies do not include what is used only for the purpose of management of contents such as a thumbnail. In addition to the thumbnail which is created from video information, for example, what utilizes voice information or what utilizes caption information is used for the purpose of management of contents.

Figure 18:
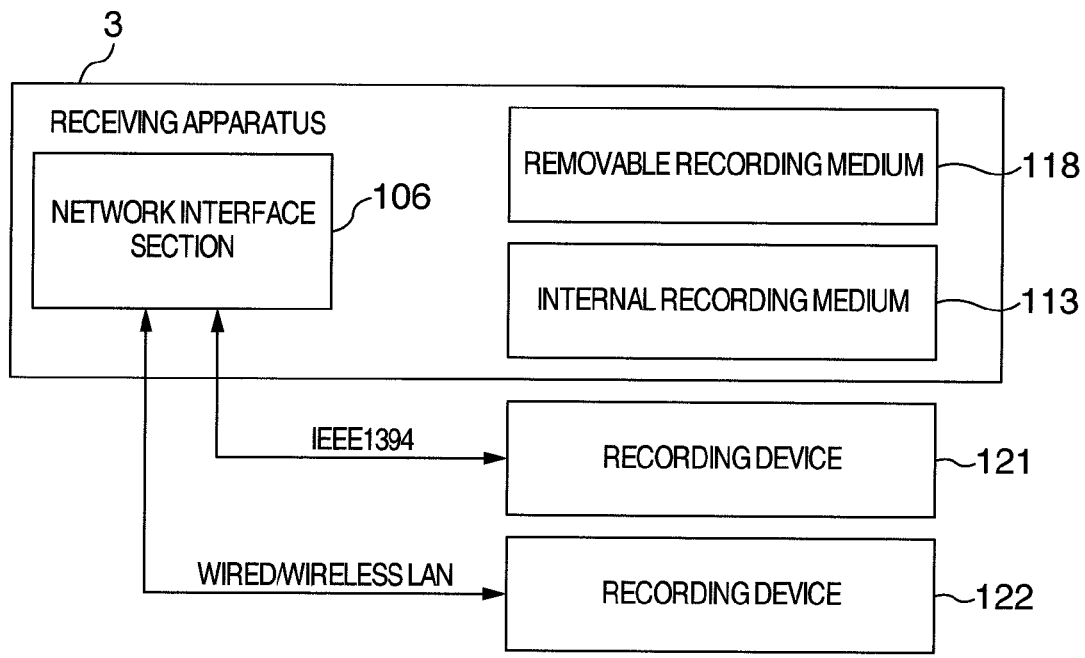
FIG. 18 is a diagram showing an example of limit of the copy number.

FIG. 18 is a diagram for understanding the restriction of the copy number described above, and shows the receiving apparatus 3, the network interface section 106, the internal recording medium 113, the removable recording medium 118, a recording device 121 and a recording device 122. The recording device 121 is, for example, connected to the network interface section 106 via IEEE1394, and DTCP is used for a copyright protection system. The recording device 122 is, for example, connected to the network interface section 106 via wired or wireless LAN, and DTCP-IP (Digital Transmission Content Protection over Internet Protocol) is used as a copyright protection system. For example, when the internal recording medium 113, the removable recording medium 118, the recording device 121 and the recording device 122 are connected as shown in FIG. 18, the total copy number of contents must be ten or fewer, the contents having been received from a broadcast wave and recorded thereon as "Copy Free with Limit of the Number".

In this case, for example, the internal recording medium 113 stores the contents whose permitted copy number is four; the removable recording medium 118 stores the contents whose permitted copy number is two; the recording device 121 store the contents whose permitted copy number is one; and the recording device 122 stores the contents whose permitted copy number is one. At the time of receiving and recording a broadcast wave, the broadcast wave may be recorded on the internal recording medium 113, the removable recording medium 118, the recording device 121 and the recording device 122 at the same time so that the above copy number are obtained, or it may be recorded only on the internal recording medium 113 first and recorded on the removable recording medium 118, the recording device 121 and the recording device 122 later.

Figure 19:
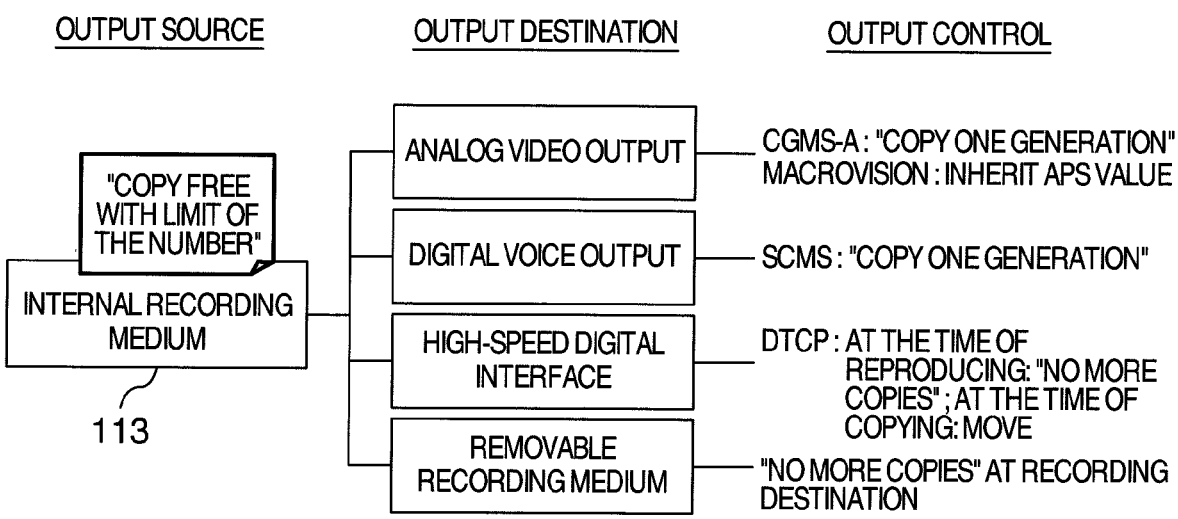
FIG. 19 is a diagram showing examples of a substitute output destination of contents stored as "Copy Free with Limit of the Number" and copy control therefor.

FIG. 19 is a diagram for understanding a substitute output destination of the contents stored as "Copy Free with Limit of the Number" described above and copy control therefor. The output destination is, for example, the internal recording medium 113 of the receiving, recording and reproducing section 10, but the analog video outputs (the composite video output terminal, the S terminal, the D terminal and the like) of the output section 116 use CGMS-A (Copy Generation Management System-Analog) and Macrovision for copy control. The CGMS-A control specifies "Copy One Generation", and the Macrovision control inherits the value of APS (Analog Protection System). The digital voice output (such as the optical voice output terminal) uses SCMS (Serial Copy Management System) for the copy control of "Copy One Generation". The high-speed digital interface (such as the IEEE1394 terminal) of the network interface section 106 uses DTCP (Digital Transmission Content Protection) for the copy control of "No More Copies" at the time of reproducing and "Move" at the time of copying. In the case of the removable recording medium 118, the copy control of "No More Copies" is performed at a recording destination.

By performing suitable copy control according to different output destinations as described above, it is possible to, when receiving and recording a broadcast wave, record multiple copies of the same program on multiple recording media or recording devices, and the advantage of protecting contents can be obtained while enhancing the user's convenience.

It has been described that the above recording devices 121 and 122 are connected via IEEE1394 and LAN, respectively. However, the connection method is not necessarily limited to IEEE1394 and LAN. The recording devices 121 and 122 may be connected by other connection methods.

Figures 20, 21:
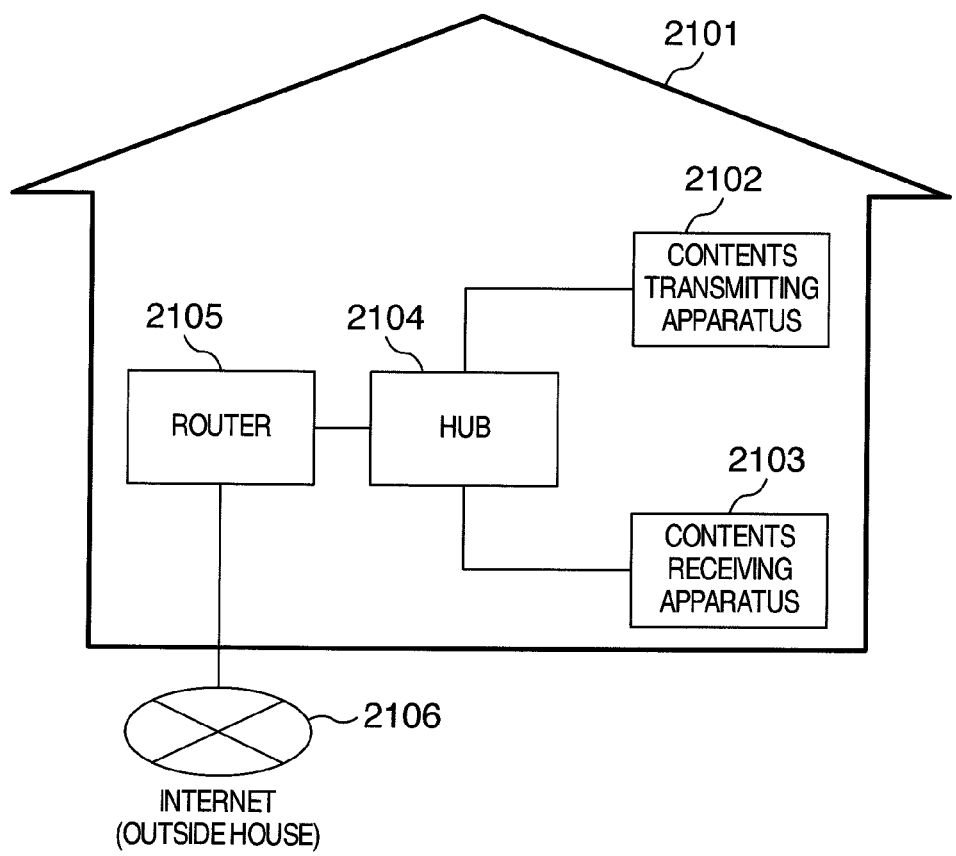
FIG. 20 is a diagram showing an example of the copy control information about contents data in DTCP.
FIG. 21 is a diagram showing a system configuration example in which a recording apparatus is digitally connected via LAN.

In the case of moving contents managed as "Copy Free with Limit of the Number" to a digitally connected recording medium with the managed copy number being kept, as described above, it is necessary that the total copy number does not change between before and after the move. An example of the method will be described. In the case where a TS packet is transmitted by DTCP-IP, copy control information about the contents is set. FIG. 20 is a diagram showing an example of the copy control information about the contents. The copy control information about the contents includes: "Retention_Move_Mode" indicating whether temporary store or a move mode of a digital stream is specified or not; "Retention_State" indicating the temporary store period; "DTCP_CCI (DTCP_Copy Control Information)" indicating whether copying of a MPEG2-TS digital stream is permitted or not (specifically, indicating "Copy One Generation", "No More Copies", "Copy Free" or "Copy Never"); EPN which, in the case where "DTCP_CCI" indicates "Copy Free", indicates whether the "Copy Free" is "EPN Asserted Copy Free" or not; "Count" indicating the permitted copy number; "Copy_count_Mode" indicating whether Count information is valid or not; "Image_Constraint_Token" indicating that resolution constrain is imposed on reproduction output of an MPEG2-TS digital stream; and APS (Analogue Protection System) indicating whether analog output protection should be applied or not when an MPEG digital stream is analog-converted to be output. In the case of transmitting contents other than MPEG2-TS, for example, MPEG2-PS, the above copy control information about contents data may be stored in a packet added as a packet different from packets for transmitted contents, which is defined in DTCP-IP standard. Of course, in the case of transmitting MPEG2-TS, the copy control information about contents data may be stored in a packet different from transmitted contents.

By using such "Copy_count_Mode" and Count information on the contents transmitting and receiving sides to perform suitable copy control, it is possible to, when recording contents managed as "Copy Free with Limit of the Number" on a recording medium digitally connected via wired/wireless LAN or the like, move the contents with the managed copy number being kept. Thus, the advantage of protecting contents can be obtained while enhancing the user's convenience. That is, by using the information of "Copy_count_Mode" and "Count" obtained by extending DTCP-IP standard, it is possible to, when recording contents managed as "Copy Free with Limit of the Number" on a recording medium digitally connected via wired/wireless LAN or the like, move the contents with the managed copy number being kept.

Furthermore, in the case of using the information of "Copy_count_Mode" and "Count" obtained by extending DTCP-IP standard to immediately output (broadcast-live-output) received contents via wired/wireless LAN or the like without storing the contents as "Copy Free with Limit of the Number", it is possible to output the contents as "Copy One Generation" to multiple LAN-connected apparatuses (within the range not exceeding the limited copy number for the contents of "Copy Free with Limit of the Number"). However, if there is a limit to the number of connected apparatuses under DTCP-IP standard, the limit must be observed.

Alternatively, it is possible to limit the (number of) destinations of LAN-connected apparatuses to one and to output contents as "Copy Free with Limit of the Number". Which output should be selected can be, for example, in accordance with a standard if it is prescribed in the standard.

As describe above, by using the information of "Copy_count_Mode" and "Count" on the contents transmitting and receiving sides, it is possible to, when broadcast-live-outputting contents to record the contents as "Copy Free with Limit of the Number" on a recording medium digitally connected via wired/wireless LAN or the like, output the contents specified as "Copy One Generation" to multiple LAN-connected apparatuses (within the range not exceeding the limited copy number for the contents of "Copy Free with Limit of the Number") or output the contents as "Copy Free with Limit of the Number" by limiting the (number of) LAN-connected destination apparatuses to one. Thus, the advantage of protecting contents can be obtained while enhancing the user's convenience.

Furthermore, in the case of using the information of "Copy_count_Mode" and "Count" obtained by extending DTCP-IP standard to broadcast-live-output the contents to a LAN-connected apparatus while recording as "Copy Free with Limit of the Number" the contents specified as "Copy Free with Limit of the Number" on a recording medium in the receiving apparatus, the contents can be output as "Copy One Generation". In the case of broadcast-live-outputting contents as "Copy Free with Limit of the Number" to a LAN-connected apparatus without recording the contents on a recording medium in the receiving apparatus, the contents can be output as "Copy Free with Limit of the Number".

In the case of recording as "Copy Free with Limit of the Number" the contents specified as "Copy One Generation" on a recording medium in the receiving apparatus to broadcast-live-output to a LAN-connected apparatus, the contents can be output as "Copy Free with Limit of the Number". Which output should be selected can be, for example, in accordance with a standard if it is prescribed in the standard.

As described above, by using the information of "Copy_count_Mode" and "Count" on the contents transmitting and receiving sides, it is possible to broadcast-live-output contents and to record the contents on a recording medium digitally connected by wired/wireless LAN or the like as "Copy Free with Limit of the Number" according to the recording state of the recording medium in the receiving apparatus. Thus, the advantage of protecting contents can be obtained while enhancing the user's convenience.

In the case of using the information of "Copy_count_Mode" and "Count" obtained by extending DTCP-IP standard to immediately broadcast-live-output received contents as "Copy Free with Limit of the Number", via wired/wireless LAN or the like without storing the contents, it is possible to connect multiple destinations of LAN-connected apparatuses and output the contents by dividing the copy number. However, the sum (total) of copy numbers is limited to the number prescribed in the standard (for example, 10).

As described above, by using the information of "Copy_count_Mode" and "Count" on the contents transmitting and receiving sides, it is possible to, at the time of broadcast-live-outputting received contents and recording the contents on a recording medium digitally connected via wired/wireless LAN or the like as "Copy Free with Limit of the Number", connect the multiple destinations of LAN-connected apparatuses and output the contents to the respective apparatuses by dividing the copy number. Thus, the advantage of protecting contents can be obtained while enhancing the user's convenience.

Contents stored as "Copy Free with Limit of the Number" on a recording medium in the receiving apparatus can be also output (moved) as "Copy Free with Limit of the Number" by using the information of "Copy_count_Mode" and "Count" obtained by extending DTCP-IP standard and limiting the (number of) destinations of LAN-connected apparatuses to one.

As described above, by using the information of "Copy_count_Mode" and "Count" on the contents transmitting and receiving sides, it is possible to limit the (number of) destinations of LAN-connected apparatuses to one and to output (move) as "Copy Free with Limit of the Number" the contents stored as "Copy Free with Limit of the Number". Thus, the advantage of protecting contents can be obtained while enhancing the user's convenience.

In the above description, "Count" indicating the permitted copy number and "Copy-count-Mode" indicating whether Count information is valid or not are used. However, it is also possible to use only "Count" indicating the permitted copy number without using "Copy_count_Mode".

When the recording medium is a removable recording medium, there are other restrictions in addition to the restrictions in FIG. 9. As for digital recording on a removable recording medium of program contents such as digital recording of TV or a data service or digital recording of a voice service, when receiving and recording program contents for which "digital_recording_control_data" of the digital copy control descriptor indicates "10" and which are specified as "Copy One Generation", it is not permitted to make three or more copies of the received contents even if they are the first-generation copies. (For example, at the time of receiving and recording broadcast, recording to three or more recording media at the same time is not permitted.) For example, this value ("three or more" is shown as an example) may be in conformity with the standard. Multiple first-generation copies in the same recording format is not permitted, except for digital recording for the purpose of backup on an area which cannot be accessed by the user. The restriction of recording on a digital recording medium is imposed on each broadcast receiving section. If there are multiple broadcast receiving sections, the above restrictions are imposed on each broadcast receiving section. The receiving apparatus including a recording system which is not compatible with "digital_recording_control_mode", digitally records as "Copy One Generation" the program contents for which "copy_control type" and "digital_recording_control_data" of the digital copy control descriptor indicate "01" and "10", respectively, irrespective of the value of "digital_recording_control_mode" of the content availability descriptor.

Figure 13:
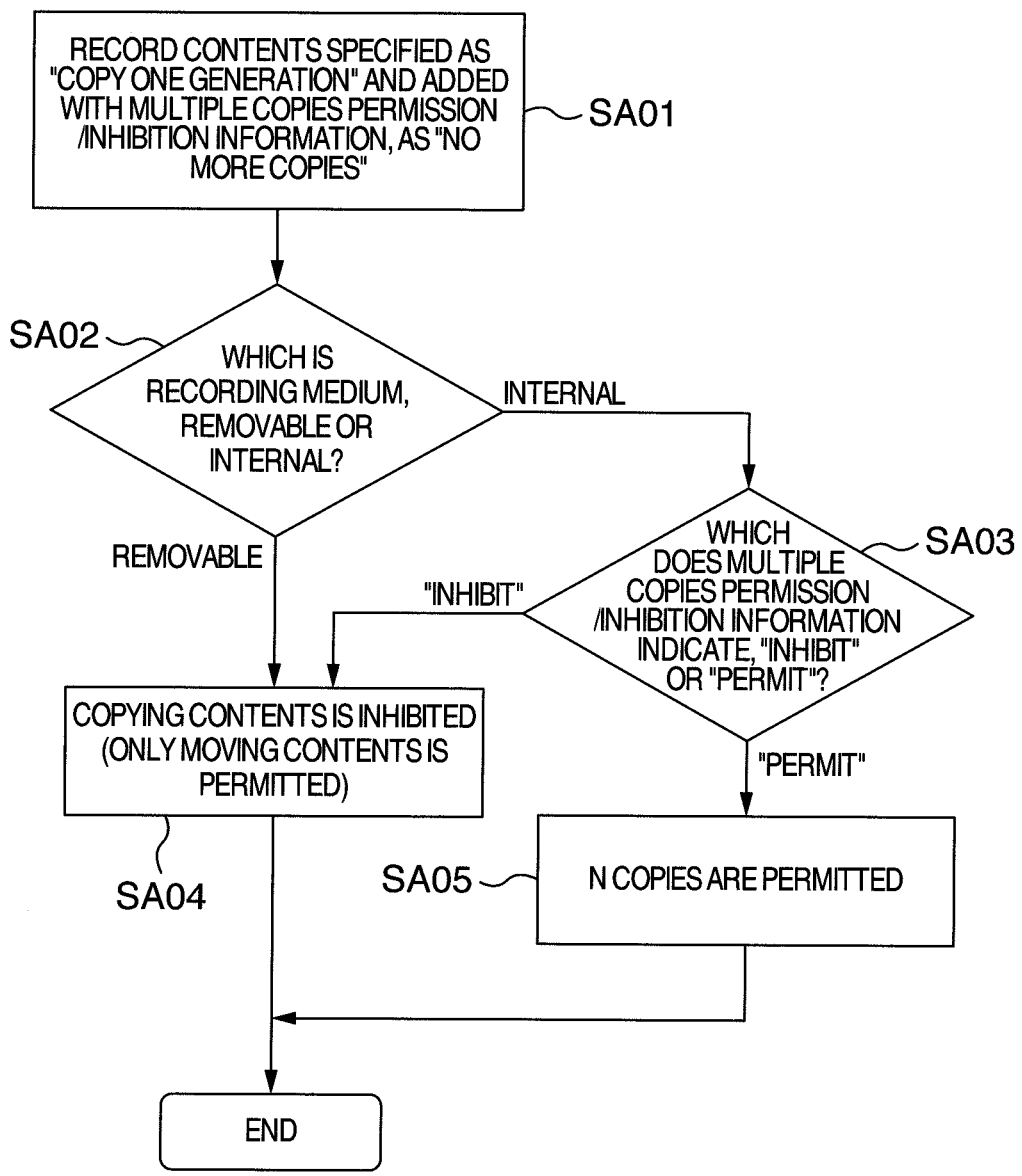
FIG. 13 is a flowchart showing an example of a procedure for creating the copy information and the copy number in management information in the case of recording program contents specified as "Copy One Generation"

FIG. 13 is a flowchart showing an example of a procedure for creating copy information and the copy number in management information in the case of recording program contents specified as "Copy One Generation" in the receiving apparatus 3.

When recognizing, from copy generation control information and multiple copies permission/inhibition information from the separation/extraction section 103, that the program contents are specified as "Copy One Generation" and added with the multiple copies permission/inhibition information, the contents management information creating section 119 inputs "01" indicating that copying is not permitted any more, that is, indicating "No More Copies" as copy information in management information (SA01).

For example, the control section 114 notifies to the contents management information creating section 119 whether the recording medium is internal or removable on which the program contents is to be recorded (SA02).

If the recording medium is removable, for example, "0" is input as the copy number in the management information so that copying of the program contents can be inhibited but moving thereof can be permitted (SA04). The above operation in which three or more copies are inhibited differs from the operation described in FIG. 13 as follows: the above operation relates to, for example, the copy control at the time of receiving and recording broadcast (at the time of generating the first-generation copy), while the operation described in FIG. 13 relates to the copy control after recording on a recording medium (after the first-generation copy is generated).

If the recording medium is internal, the contents management information creating section 119 judges whether the multiple copies permission/inhibition information indicates "permit" or "inhibit" (SA03).

In the case of "inhibit", for example, "0" is input as the copy number in the management information so that copying of the program contents can be inhibited but moving thereof can be permitted (SA04). Of course, deletion and the like are possible.

In the case of "permit", "N" is input as the copy number in the management information so that N copies of the program contents are permitted (SA05).

By doing this, it becomes possible to make multiple copies of recorded program contents specified as "Copy One Generation", irrespective of time, and the advantage of enhancing the usability can be obtained. Furthermore, multiple copies permission/inhibition is judged depending on whether the recording medium is internal or removal. If the recording medium is internal, the program contents are locally encrypted, and furthermore, key information, copy information and copy number of management information are also encrypted and managed so that wrong falsification can be prevented, as described above. On the other hand, if the recording medium is removal, various management methods are conceivable. Some removable media cannot be managed as well as the internal recording medium described above. Therefore, it is conceivable that wrong falsification cannot be avoided, and the advantage of protecting contents can be obtained while enhancing the user's convenience.

<Copy Process Related to Copy Control Information>

Figure 14:
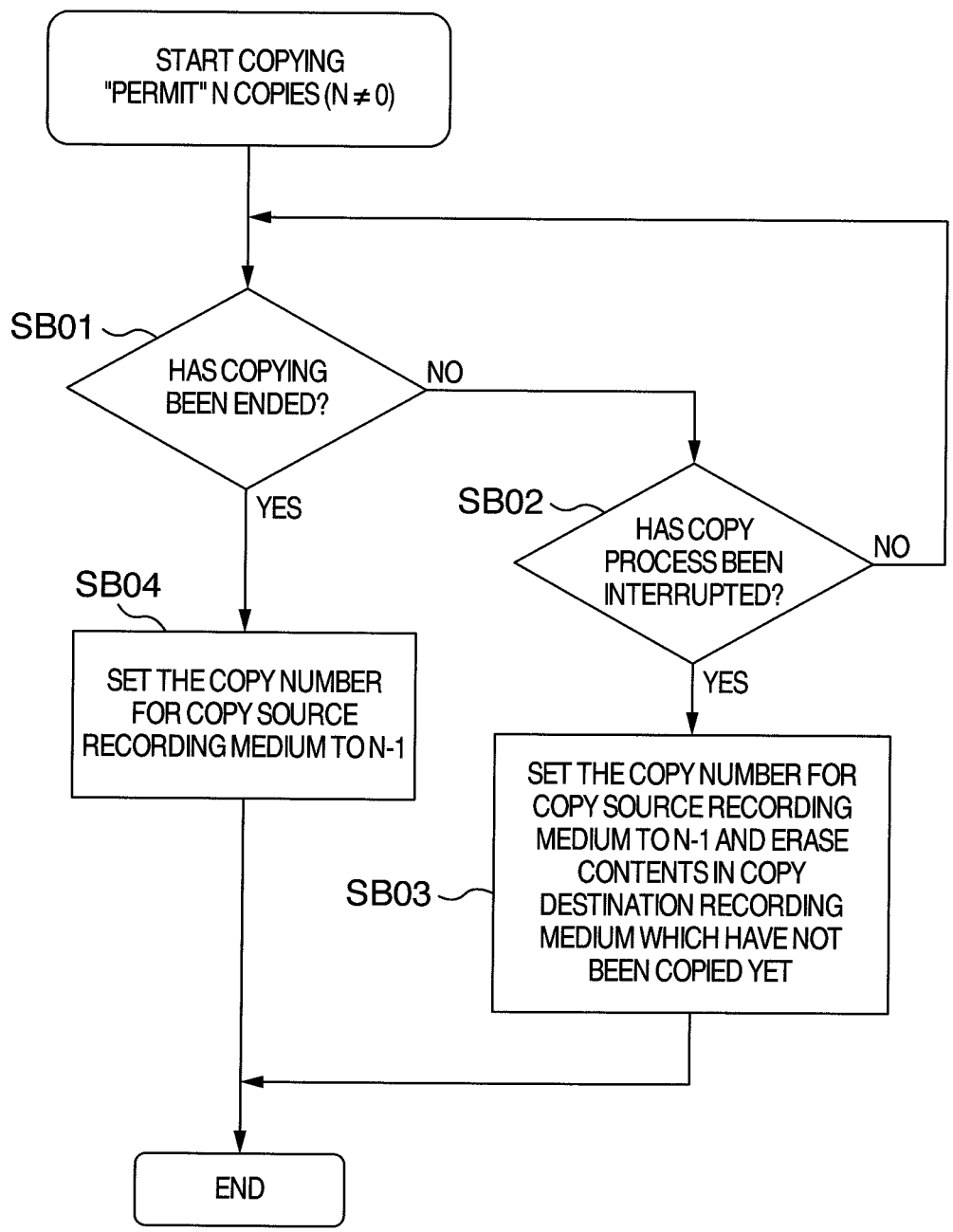
FIG. 14 is a flowchart showing an example of a procedure for copying program contents.

FIG. 14 is a flowchart showing an example of a procedure for copying program contents by the receiving apparatus 3.

When copying program contents for which the copy information and the copy number in the management information indicate "01" ("No More Copies") and "N" (N≠0), respectively, it is monitored whether the copy process has ended (SB01).

If the copy process has ended, "N−1" (N≠0) is input as the copy number in the management information on the copy source recording medium so that N−1 copies of the program contents can be permitted; "01" ("No More Copies") is input as the copy information in the management information on the copy destination recording medium so that recopying is inhibited; and "0" is input as the copy number in the management information so that copying of the program contents can be inhibited but moving thereof can be permitted (SB04).

If the copy process has not ended, it is monitored whether the copy process has been interrupted (SB02).

If the copy process has not been interrupted, it is monitored whether the copy process has ended (SB01).

If the copy process has been interrupted, "N−1" (N≠0) is input as the copy number in the management information in the copy source recording medium so that N−1 copies of the program contents can be permitted; and if the copy destination recording medium is recordable more than once, the program contents which have not been copied yet is erased (SB03). However, in the case of a recording medium recordable only once, the erasing process is not executed because erasing is impossible.

By doing this, the advantage of ensuring copy generation management of program contents of a copy destination can be obtained. Even in the case where interruption of the copy process occurs for some reason, unnecessary program contents do not remain at the copy destination. Therefore, the advantage of eliminating the trouble of erasing the program contents later and enhancing the usability can be obtained. The above erasing may be performed by physically erasing the data on the recording medium or by erasing the management information so that the data on the recording medium cannot be reproduced although it exists (indirectly erasing). In the above description, the contents of the copy destination are erased when interruption of the copy process occurs. However, if the usability is enhanced more by not erasing the contents, the contents may not be erased.

<Move Process Related to Copy Control Information>

Figure 15:
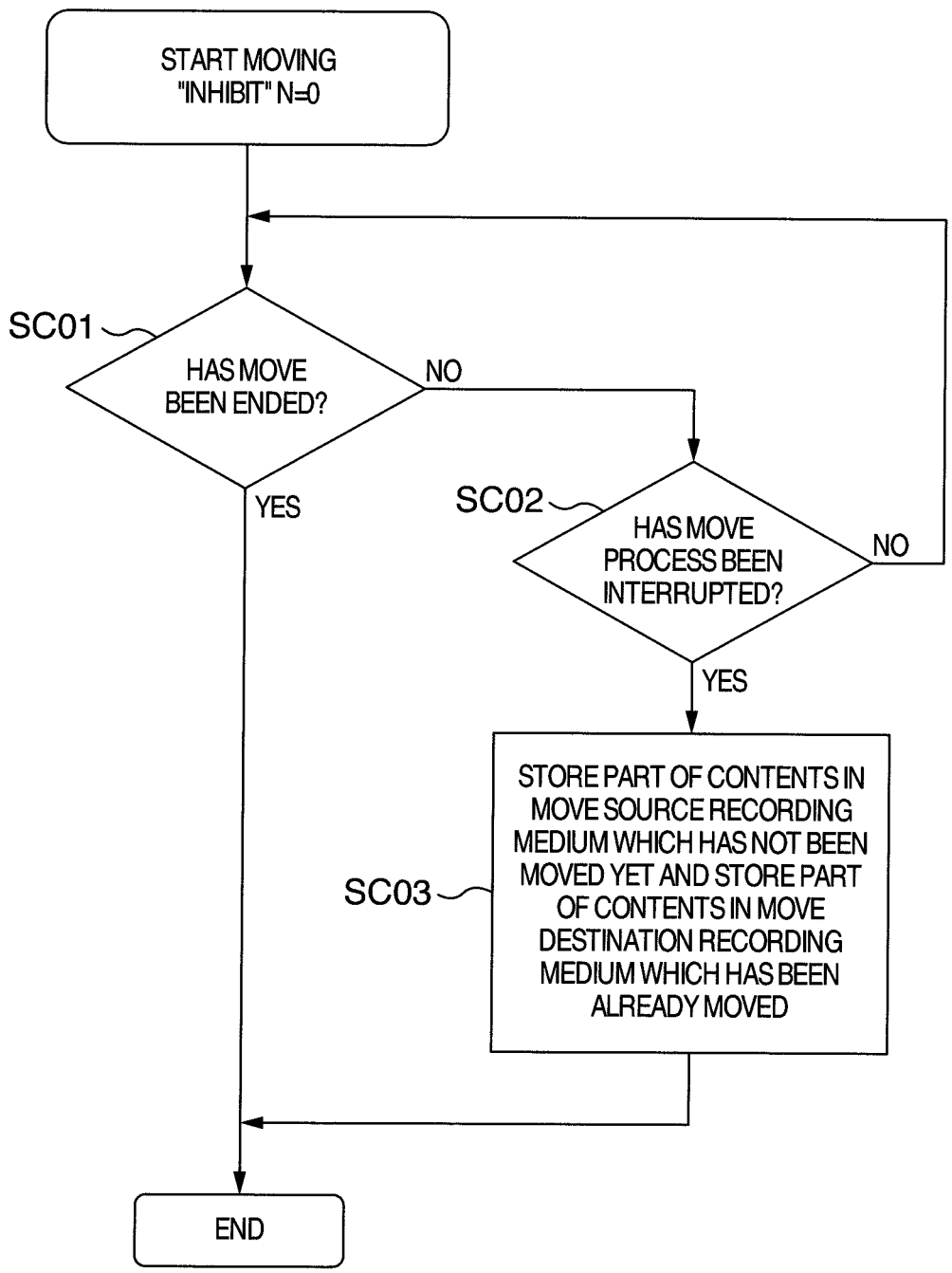
FIG. 15 is a flowchart showing an example of a procedure for moving program contents.

FIG. 15 is a flowchart showing a procedure for moving program contents by the receiving apparatus according to the embodiment.

When moving program contents for which the copy information and the copy number in the management information indicate "01" ("No More Copies") and "0", respectively, it is monitored whether the move process has ended (SC01).

If the move process has ended, the program contents and the management information related to the program contents on the move source recording medium are erased; "01" ("No More Copies") is input as the copy information in the management information on a move destination recording medium so that recopy is inhibited; and "0" is input as the copy number in the management information so that copying of the program contents can be inhibited but moving thereof can be permitted.

If the move process has not ended, it is monitored whether the move process has been interrupted (SC02).

If the move process has not been interrupted, it is monitored whether the move process has ended (SC01).

If the move process has been interrupted, a part of program contents which has not been moved to the move destination recording medium yet and the management information related to the program contents are stored and reproducing a part of the program contents which has been already moved to the move destination recording medium is disabled on the move source recording medium. The part of the program contents which has been already moved are stored in the move destination recording medium; "01" ("No More Copies") is input as the copy information in the management information so that recopying is inhibited; and "0" is input as the copy number in the management information so that copying of the program contents can be inhibited but moving thereof can be permitted (SC03).

By doing this, the advantage of ensuring copy generation management of program contents of a move destination can be obtained. Even in the case where interruption of the move process occurs for some reason, the program contents are stored on each of the move source and move destination recording media, and it does not occur that the program contents cannot be viewed due to the interruption. Thus, the advantage of enhancing the usability can be obtained. The above erasing may be performed by physically erasing the data on the recording medium or by erasing the management information so that the data on the recording medium cannot be reproduced although it exists (indirectly erasing).

In the above description, the copy destination or move destination recording medium can be managed as "No More Copies". If it cannot be managed, the copy process or the move process is inhibited.

In the above description, the case of program contents sent out from a broadcasting station has been described. However, this embodiment is applicable to program contents sent out from, for example, a program contents provider other than broadcasting stations.

The removable recording medium means a recording medium in an independent form which can be removed from the receiving apparatus and which can be reproduced on other apparatuses having a reproduction function.

Moving program contents means disabling reproduction of program contents recorded as "No More Copies" on a recording medium after copying the program contents to another recording medium. Here, disabling reproduction means erasing the program contents themselves, the cipher key or the management information, etc. It is desirable that program contents do not exist in a reproducible state at both of a move source and a move destination, for one or more minute at the same time during the move process.

In the above description, as for program contents specified as "Copy One Generation", if the multiple copies permission/inhibition information indicates "permit", then whether multiple copies is possible or not is judged depending on whether the recording medium is internal or removal. However, whether multiple copies is possible or not may be judged based on whether the recording medium is capable of managing multiple copies or not. Here, the recording medium capable of managing multiple copies refers to, for example, a recording medium capable of managing information of the copy information 507, the copy number 508 and the key information 506 (which may also include the file number 503, the date and time 504 and the data area top address and recording size 505) in the management information indicating the subject of program contents which has been described with reference to FIG. 12 so that they can not wrongly falsified.

Figure 16:
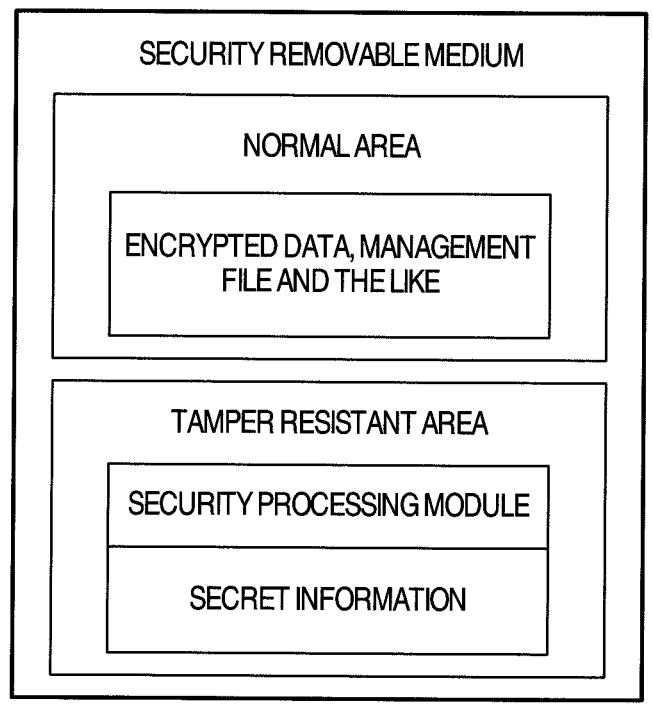
FIG. 16 is a diagram showing an example of a recording medium capable of managing multiple copies.

FIG. 16 shows a configuration example of a recording medium (security removable medium) capable of such management of multiple copies (also referred to as the copy number control or the number-controlled copy). The configuration is such that both of a normal area which can be accessed by the user and a tamper resistant area which cannot be accessed by the user are provided on one recording medium. Secret information stored on the tamper resistant area can be accessed if authentication is confirmed by an authentication process with an apparatus capable of handling this recording medium so that the secret information can be managed. By storing the above information such as the copy information 507, the copy number 508 and the key information 506 on this tamper resistant area to manage them, wrong falsification can be prevented.

On the other hand, the recording medium not capable of managing multiple copies refers to a recording medium which is not capable of managing information such as the copy information 507, the copy number 508 and the key information 506 (which may also include the file number 503, the date and time 504 and the data area top address and recording size 505) in the management information indicating the subject of program contents so that they are not wrongly falsified.

Figure 17:
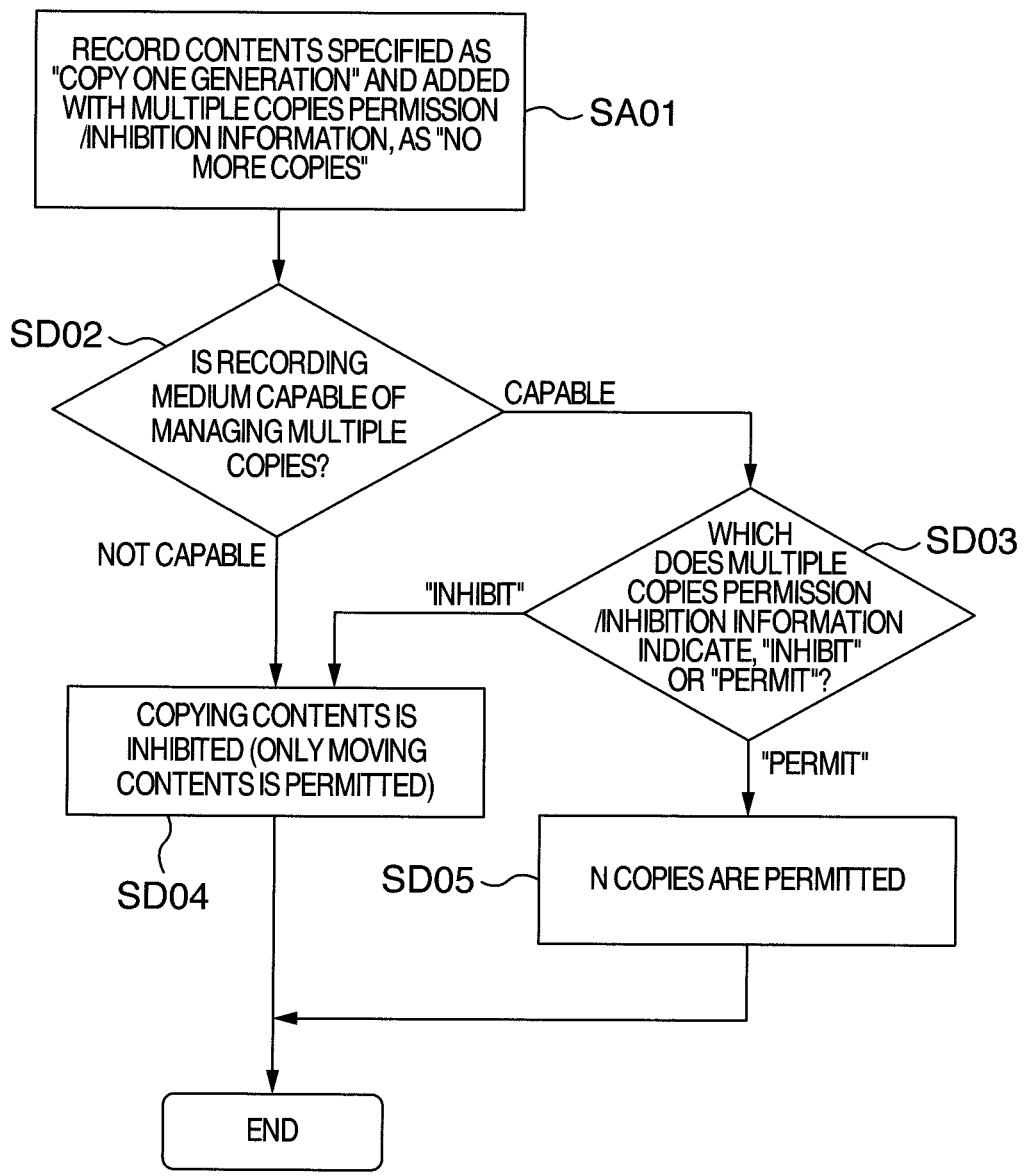
FIG. 17 is a flowchart showing an example of a procedure for creating the copy information and the copy number in the management information in the case of recording program contents specified as "Copy One Generation"

FIG. 17 is a flowchart showing an example of a procedure for creating the copy information and the copy number in the management information in the case of recording program contents specified as "Copy One Generation" in the receiving apparatus, in consideration of the recording medium capable of managing multiple copies and the recording medium not capable of managing multiple copies. The difference from FIG. 13 is SD02. The flowchart may be combined with FIG. 13. For example, SD02 may be executed when the recording medium is "removable" at SA02.

For example, the control section 114 judges whether the recording medium on which the program contents are recorded is capable of managing multiple copies or not, to notify it to the contents management information creating section 119 (SD02).

In the case of the recording medium not capable of managing multiple copies, for example, "0" is input as the copy number in the management information so that copying of the program contents can be inhibited but moving thereof can be permitted (SD04).

In the case of the recording medium capable of managing multiple copies, the contents management information creating section 119 judges whether multiple copies permission/inhibition information indicates "permit" or "inhibit" (SD03). In the case of "inhibit", for example, "0" is input as the copy number in the management information so that copying of the program contents can be inhibited but moving thereof can be permitted (SD04). In the case of "permit", "N" is input as the copy number in the management information so that N copies of the program contents can be permitted (SD05).

By doing this, it becomes possible to make multiple copies of recorded program contents specified as "Copy One Generation", irrespective of time, and the advantage of enhancing the usability can be obtained. Furthermore, by judging permission/inhibition of multiple copies depending on whether a recording medium is capable of managing multiple copies or not, it is possible to avoid permission for multiple copies on a recording medium not capable of multiple copies. Thus, the advantage of ensuring protection of program contents much more can be obtained.

<Copy Control Process Via LAN>

Description will be made on a concrete example of a process in the case of dubbing to a recording medium digitally connected via LAN, with the managed copy number being kept, using the copy control information about contents described with reference to FIG. 20. FIG. 21 shows a system configuration example in which a recording apparatus is digitally connected via LAN.

In a user's house 2101, each of contents transmitting apparatus 2102 and a contents receiving apparatus 2103 is connected to a network hub 2104 via a cable of wired LAN, and the network hub 2014 is connected to a router 2105. The router 2105 is connected to the Internet 2106 via a modem or a photoelectric converter.

The world standard IP (Internet Protocol) is used as the network protocol for the LAN. TCP (Transmission Control Protocol) and UDP (User Datagram Protocol) are used as higher transport protocols, and much higher application protocols, for example, RTP (Real-time Transport Protocol), HTTP (Hyper Text Transfer Protocol), FTP (File Transfer Protocol) and the like are used for transmitting contents. There are two versions of the IP, IPv4 (Internet Protocol Version 4) and IPv6 (Internet Protocol Version 6). Any of them is possible.

Each of the contents transmitting apparatus 2102, the contents receiving apparatus 2103 and the router 2105 has an IP address identifying itself on the LAN. Furthermore, an 48-bit MAC (Media Access Control) address is given to the interface section of the network communication processing section of each apparatus. Setting of the IP address for each apparatus can be performed, for example, by getting the router 2105 operate as a DHCP (Dynamic Host Configuration Protocol) server to assign the IP address of each apparatus.

In FIG. 21, the apparatuses are connected via wired LAN in the user's house 2101. However, wireless LAN or the like using a wireless access point may be used. Furthermore, the network hub 2104 and the router 2105 may be integrated.

As the contents transmitting apparatus 2102 and the contents receiving apparatus 2103 described with reference to FIG. 21, for example, the receiving apparatus 3 described with reference to FIGS. 1 and 10 can be used.

Figure 22:
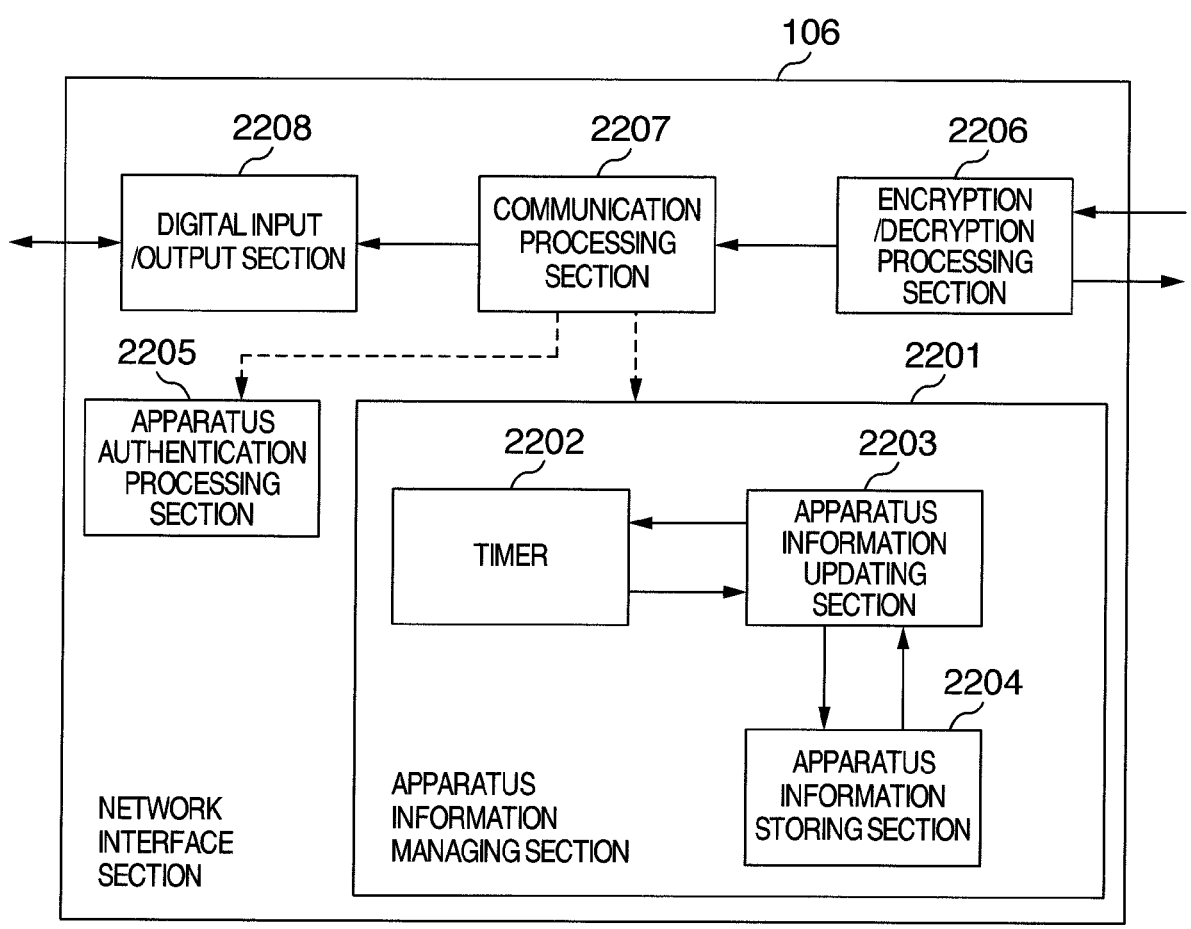
FIG. 22 is a diagram showing a configuration example of a network interface section 106 compatible with LAN.

FIG. 22 shows a configuration example of the network interface section 106 compatible with LAN in the receiving apparatus 3 in FIG. 10.

The network interface section 106 comprises an apparatus information managing section 2201 including a timer section 2202, an apparatus information updating section 2203 and an apparatus information storing section 2204; an apparatus authentication processing section 2205; an encryption/decryption processing section 2206; a communication processing section 2207 and a digital input/output section 2208. Each component is connected to the control section 114 via a bus section so that its operation can be controlled thereby.

For example, the apparatus authentication processing section 2205 performs authentication with another apparatus on whether each of them is an formally authorized apparatus, in conformity with a particular authentication protocol, via the communication processing section 2207 and the digital input/output section 2208, in order to transfer contents covered by copyright protection via the LAN and share keys used for encryption/decryption of the contents. As the particular authentication protocol, for example, DTCP-IP protocol is used.

The apparatus information managing section 2201 manages information related to an apparatus for which the apparatus authentication processing section 2205 has succeeded in authentication. The timer section 2202 measures time in the case of the apparatus authentication processing section 2205 confirming whether or not an authentication target apparatus exists in the house, or in the case of managing the expiration date of registration information stored in the apparatus information storing section 2204 to be described later. The apparatus information updating section 2203 manages the expiration data of the registration information held in the apparatus information storing section 2204 to be described later to perform registration/update/deletion as needed. The apparatus information storing section 2204 holds information related to the authentication target apparatus if the apparatus authentication processing section 2205 has succeeded in apparatus authentication.

The encryption/decryption processing section 2206:

decrypts contents encryption-processed by a transmitting apparatus, which have been received via the digital input/output section 2208 via the LAN, using the key shared by the apparatus authentication processing section 2205 to output the contents to the selector 102 after analyzing the received packet; or encrypts a received broadcasted transport packet output from the time stamp comparing/outputting section 109 or the separation/extraction section 103, using the key shared by the apparatus authentication processing section 2205 to generate a transmitted packet in conformity with a network transmission standard. Thereby, it is possible to transmit any of broadcast contents themselves received by the tuner decoding section 101 and contents recorded on the internal recording medium 113 or the removable recording medium 118.

The communication processing section 2207 transmits/receives contents and control commands to and from other LAN-connected apparatuses, via the digital input/output section 2208. Copy control information such as the permitted copy number is added to received contents at the time of receiving or transmitted contents at the time of transmitting, in addition to copy control information such as "Copy Free", "Copy One Generation", "Copy Never" and "No More Copies" indicating how to handle the contents.

The digital input/output section 2208 inputs/outputs contents and control commands via the LAN.

Apparatus information stored in the apparatus information storing section 2204 is configured, for example, in a table form. The apparatus information is composed of a registration ID indicating the registration number of the table, an apparatus ID indicating an identifier for uniquely identifying each apparatus as apparatus information, and the network address information indicating the IP address, the MAC address and the like of each apparatus on the network. The apparatus ID is generated, for example, by a particular certification body, is a unique ID used by IEEE1394 or a device ID used by DTCP, which is apparatus-specific information stored in a nonvolatile memory in advance when manufacturing each apparatus, and has an apparatus-specific unique value.

Figure 23:
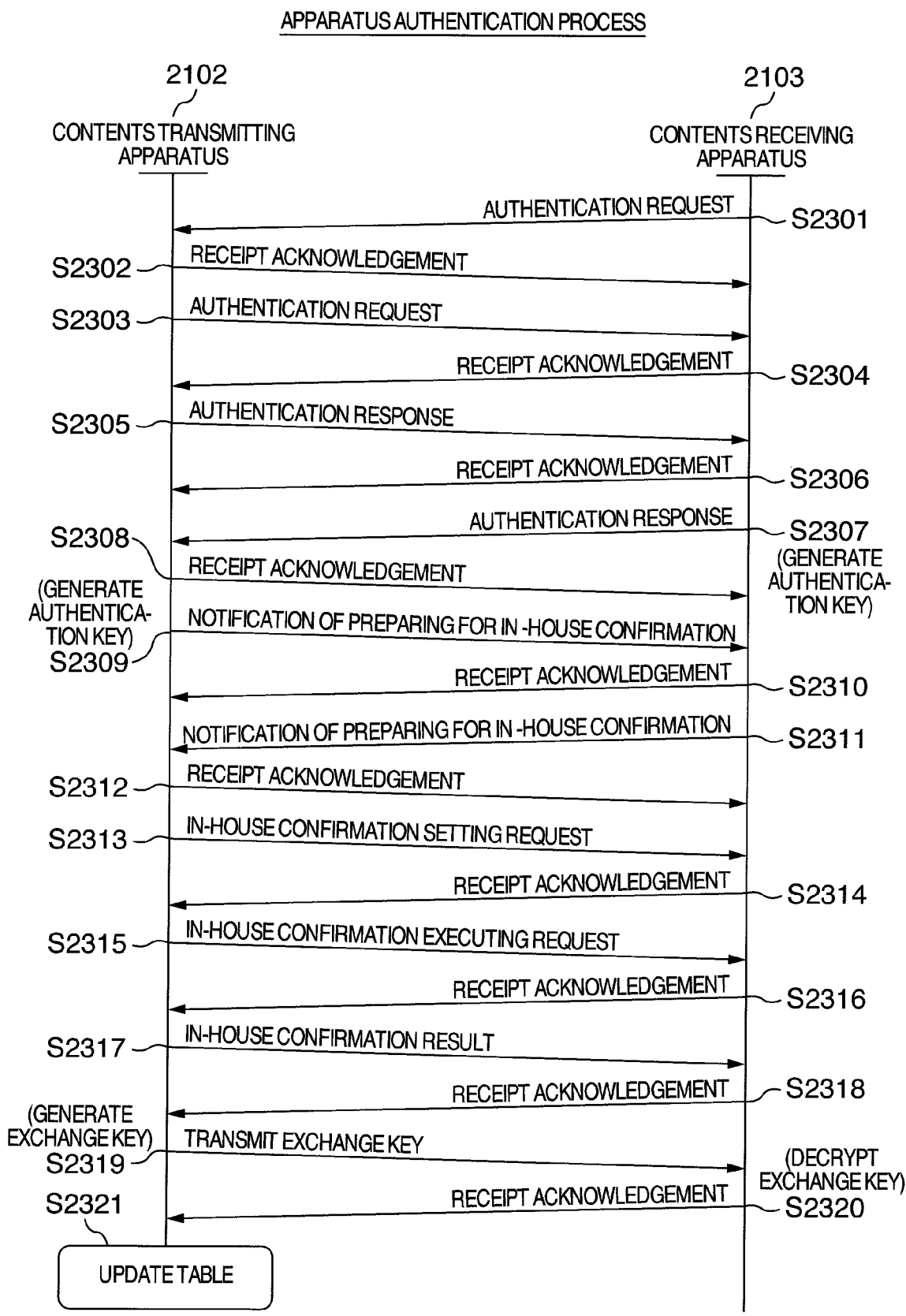
FIG. 23 is a diagram showing an example of an apparatus authentication procedure.

FIG. 23 shows an example of an apparatus authentication procedure executed between the contents transmitting apparatus 2102 and the contents receiving apparatus 2103 in the system configuration shown in FIG. 21. Here, TCP is used as a protocol for transmission/receiving of information for an apparatus authentication process. When authentication requests to counterpart apparatuses and various information such as authentication responses thereto are transmitted, receipt acknowledgements thereto are returned from the counterpart apparatuses. Thereby, a communication path capable of detecting a transmission error is ensured. In FIG. 23, data for establishing and discarding connection by the TCP can be transmitted/received in accordance with the rules of the TCP, but description thereof will be omitted.

First, the contents receiving apparatus 2103 side creates an authentication request. The apparatus authentication processing section of the contents receiving apparatus 2103 transmits the authentication request to the contents transmitting apparatus 2102 via the communication processing section and the digital input/output section, the request being attached with apparatus-specific information including an apparatus ID and a certificate for the information (S2301).

When the apparatus authentication processing section of the contents transmitting apparatus 2102 receives the authentication request via the digital input/output section and the communication processing section and transmits a receipt acknowledgement thereto to the contents receiving apparatus 2103 (S2302), the apparatus authentication processing section of the contents transmitting apparatus 2102 creates an authentication request and then, similarly to the contents receiving apparatus 2103, transmits the authentication request to the contents receiving apparatus 2103, the request being attached with apparatus-specific information including the apparatus ID of the contents transmitting apparatus 2102 (S2303).

The apparatus authentication processing section of the contents receiving apparatus 2103 receives the authentication request and transmits a receipt acknowledgement thereto to the contents transmitting apparatus 2102 (S2304).

Next, the apparatus authentication processing section of the contents transmitting apparatus 2102 verifies each piece of information attached to the received authentication request to transmit an authentication response attached with necessary parameters for generation of key information, to the contents receiving apparatus 2103 (S2305).

The apparatus authentication processing section of the contents receiving apparatus 2103 receives the authentication response, creates an authentication response after transmitting a receipt acknowledgement thereto to the contents transmitting apparatus 2102 (S2306), transmits the authentication response attached with the necessary parameters for generation of key information to the contents transmitting apparatus 2102 (S2307), similarly to the contents transmitting apparatus 2102, and generates an authentication key in common with the contents transmitting apparatus 2102 using the necessary parameters.

The apparatus authentication processing section of the contents transmitting apparatus 2102 receives the authentication response, transmits a receipt acknowledgement thereto to the contents receiving apparatus 2103 (S2308), and generates an authentication key in common with the contents receiving apparatus 2103 using the necessary parameters, similarly to the contents receiving apparatus 2103.

Through the above procedure, the apparatus authentication processing section of the contents transmitting apparatus 2102 and the apparatus authentication processing section of the contents receiving apparatus 2103 generate the authentication key common to them and share them.

Next, the contents transmitting apparatus 2102 transmits a notification of preparing for in-house confirmation to confirm that the contents receiving apparatus 2103 exists in the house, to the contents receiving apparatus 2103 (S2309).

When receiving the notification of preparing for in-house confirmation and transmitting a receipt acknowledgement thereto to the contents transmitting apparatus 2102 (S2310), the apparatus authentication processing section of the contents receiving apparatus 2103 creates a notification of preparing for in-house confirmation on its side to transmit it to the contents transmitting apparatus 2102 (S2311).

When receiving the notification of preparing for in-house confirmation and transmitting a receipt acknowledgement thereto to the contents receiving apparatus 2103 (S2312), the apparatus authentication processing section of the contents transmitting apparatus 2102 transmits an in-house confirmation setting request attached with information necessary for in-house confirmation to the contents receiving apparatus 2103 (S2313).

The apparatus authentication processing section of the contents receiving apparatus 2103 receives the in-house confirmation setting request, and prepares for in-house confirmation to transmit a receipt acknowledgement thereto to the contents transmitting apparatus 2102 (S2314).

When receiving the receipt acknowledgement, the apparatus authentication processing section of the contents transmitting apparatus 2102 activates the timer in the apparatus information managing section, and then transmits an in-house confirmation executing request for confirming that the contents receiving apparatus 2103 exists in the house, to the contents receiving apparatus 2103 (S2315).

The apparatus authentication processing section of the contents receiving apparatus 2103 receives the in-house confirmation executing request and transmits a receipt acknowledgement thereto to the contents transmitting apparatus 2102 (S2316).

When receiving the receipt acknowledgement, the apparatus authentication processing section of the contents transmitting apparatus 2102 stops the timer and confirms that the value measured after issuing the in-house confirmation executing request until receiving the receipt acknowledgement has not exceeded a predetermined value. It judges that, if the measured value is less than or equal to the predetermined value, the contents receiving apparatus 2103 exists in the house within the range of personal use, to transmit to the contents receiving apparatus 2103 an in-house confirmation result (S2317).

On the other hand, if the measured value is more than the predetermined value, it judges that there is a possibility that the contents receiving apparatus 2103 exists outside the house, stops the subsequent process and ends the apparatus authentication process.

When the apparatus authentication processing section of the contents receiving apparatus 2103 which has received the in-house confirmation result transmits a receipt acknowledgement to the contents transmitting apparatus 2102 (S2318), the apparatus authentication processing section of the contents transmitting apparatus 2102 generates an exchange key to be used for encryption of contents, and encrypts the exchange key using the authentication key, to transmit the exchange key to the contents receiving apparatus 2103 together with an ID for identifying the exchange key (S2319).

The apparatus authentication processing section of the contents receiving apparatus 2103 decrypts the exchange key transmitted from the contents transmitting apparatus using the authentication key and transmits a receipt acknowledgement (S2320).

When receiving the receipt acknowledgement, the apparatus authentication processing section of the contents transmitting apparatus 2102 registers information related to the contents receiving apparatus 2103 in a table storing apparatus information in the apparatus authentication managing section (S2321).

Through the above process, the apparatus authentication processing section of the contents transmitting apparatus 2102 and the apparatus authentication processing section of the contents receiving apparatus 2103 share the exchange key common to them. The exchange key is used to generate common keys for encryption/decryption of contents to be network-transmitted. The above authentication key, the exchange key, the common key can be generated by using a well-known key generation/key exchange algorithm. The processing at S2309 and the processing at S2313 may be executed together, and the processing at S2317 and the processing at S2319 May be executed together.

The apparatus authentication procedure executed between the contents transmitting apparatus 2102 and the contents receiving apparatus 2103 in the house has been described above. By performing the above procedure, it is possible for the apparatuses to confirm that they are formally authorized apparatuses with each other and share keys used for encryption/decryption of contents.

FIG. 52 shows an example of an apparatus authentication procedure executed when delivering contents added with the copy control information in FIG. 20 or contents added with the copy control information in FIG. 30 between the contents receiving apparatus 2103 and the contents transmitting apparatus 2102. The contents added with the copy control information will be also referred to as "contents added with the permitted copy number information" below.

First, the contents receiving apparatus 2103 transmits a capability notification indicating that it can receive the copy control information about the contents, to the contents transmitting apparatus 2102 (S5201), and in response thereto, the contents transmitting apparatus 2102 also transmits a receipt acknowledgement indicating that it can transmit the copy control information about the contents, to the contents receiving apparatus 2103 (S5202).

Next, the contents receiving apparatus 2103 transmits an authentication request including the information for acquiring a dedicated key (a value different from the value of the shared exchange key in FIG. 23) necessary for receiving contents added with the permitted copy number information, to the contents transmitting apparatus 2102 (S5203).

Receiving the authentication request, the contents transmitting apparatus 2102 confirms that the contents receiving apparatus 2103 can receive the copy control information about the contents (S5204) and returns a receipt acknowledgement (S5205).

The apparatus authentication processing section of the contents transmitting apparatus 2102 creates an authentication request for the dedicated key, and, similarly to the contents receiving apparatus 2103, transmits the authentication request for the dedicated key to the contents receiving apparatus 2103, the request being attached with apparatus-specific information including the apparatus ID of the contents transmitting apparatus 2102 and a certificate therefor (S5206).

The apparatus authentication processing section of the contents receiving apparatus 2103 receives the authentication request for the dedicated key and transmits a receipt acknowledgement thereto to the contents transmitting apparatus 2102 (S5207).

Next, the apparatus authentication processing section of the contents transmitting apparatus 2102 verifies each piece of information attached to the received authentication request for the dedicated key to transmit an authentication response for the dedicated key attached with necessary parameters for generation of key information, to the contents receiving apparatus 2103 (S5208).

The apparatus authentication processing section of the contents receiving apparatus 2103 receives the authentication response for the dedicated key, creates an authentication response for the dedicated key after transmitting a receipt acknowledgement thereto to the contents transmitting apparatus 2102 (S5209), transmits the authentication response for the dedicated key attached with necessary parameters for generation of key information to the contents transmitting apparatus 2102, similarly to the contents transmitting apparatus 2102 (S5210), and generates an authentication key in common with the contents transmitting apparatus 2102 using the necessary parameters.

The apparatus authentication processing section of the contents transmitting apparatus 2102 receives the authentication response for the dedicated key, transmits a receipt acknowledgement thereto to the contents receiving apparatus 2103 (S5211), and generates an authentication key in common with the contents receiving apparatus 2103 using the necessary parameters, similarly to the contents receiving apparatus 2103.

In the above description, the information for acquiring the dedicated key may be included in all or a part of transmitted data similarly to S5203.

Through the above procedure, the apparatus authentication processing section of the contents transmitting apparatus 2102 and the apparatus authentication processing section of the contents receiving apparatus 2103 generate the authentication key common to them and share them.

After that, the contents transmitting apparatus 2102 judges whether or not information related to the contents receiving apparatus 2103 is registered in the apparatus information table in itself. If the information is not registered in the table, in-house confirmation is executed (S5212). That is, steps S2309 to S2318 of the apparatus authentication process in FIG. 23 is executed, and the apparatus information table update processing S2321 is executed.

At the end, the contents transmitting apparatus 2102 encrypts the generated dedicated key with the authentication key, and transmits it to the contents receiving apparatus 2103 together with an ID for identifying the dedicated key (S5213). The contents receiving apparatus 2103 decrypts the dedicated key with the authentication key, and transmits a receipt acknowledgement to the contents transmitting apparatus 2102 (S5214).

By performing the above procedure, it is possible for both apparatuses to confirm whether they formally authorize each other and whether they can transmit/receive copy control information of contents, and further to share a dedicated key for safely encrypting/decrypting contents added with the permitted copy number information differently from other contents.

Here, the dedicated key may be discarded after completion of transfer of the contents added with the permitted copy number information, and the above apparatus authentication process may be performed for each set of contents. The dedicated key may be discarded after a lapse of a predetermined time period after the apparatus itself stops transferring contents. Furthermore, an instruction to discard the dedicated key may be sent from a contents transmitting apparatus to a contents receiving apparatus (or vice versa).

In FIG. 52, an example of the apparatus authentication procedure executed at the time of delivering contents added with the permitted copy number information in FIGS. 20 and 30 has been described. It would be better to use the procedure described with reference to FIG. 23, as an apparatus authentication procedure executed at the time of delivering contents added with any information of "retention_move_mode", "retention_state", "DTCP_CCI (DTCP_Copy Control Information)", EPN, "Image_Constraint_Token" and APS (Analogue Protection System) in FIGS. 20 and 30. It would be better to use the procedure described with reference to FIG. 52, as an apparatus authentication procedure executed at the time of delivering contents added with any information of "License Acquisition Start", "License Acquisition Limit", "Playback Not Before" and "Playback Not After" in FIG. 30.

Figure 24:
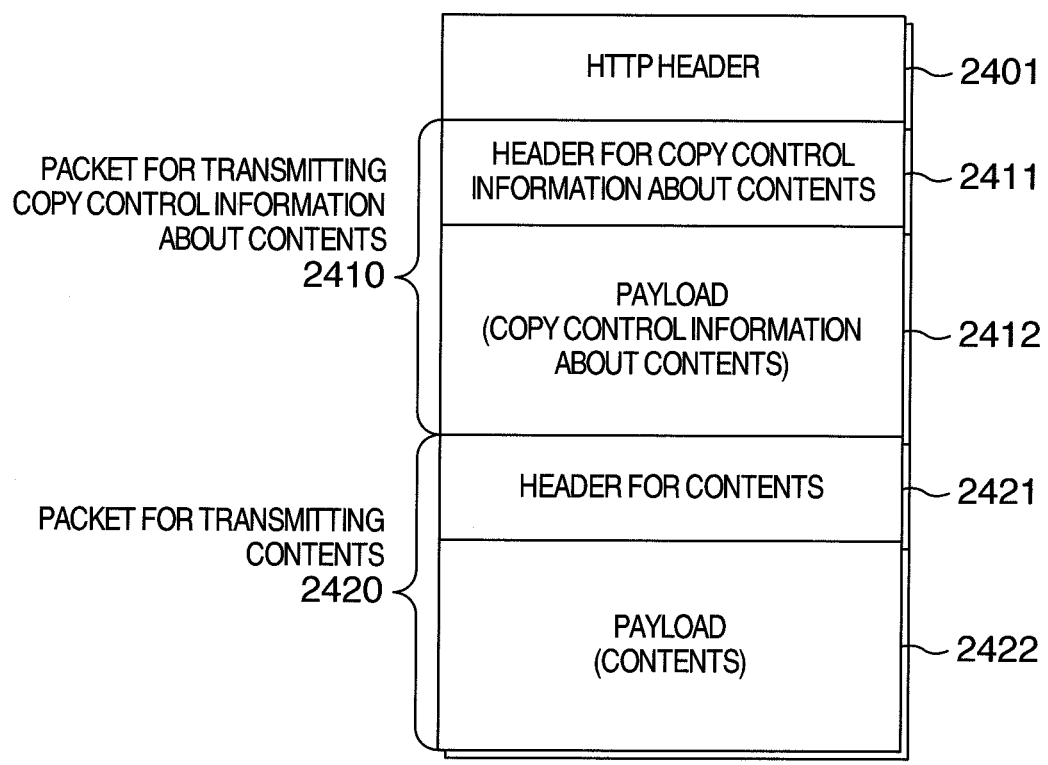
FIG. 24 is a diagram showing an example of a data structure in the case of transmitting contents using the HTTP protocol.

FIG. 24 shows an example of a data structure in the case of transmitting contents using the HTTP protocol, by the packets for transmitted contents and a packet different therefrom for the copy control information about the contents described with reference to FIG. 20. Here, TCP is used as the transport layer protocol, but a TCP header is omitted.

The data is composed of an HTTP header 2401, a packet for transmitting copy control information about contents 2410 and a packet for transmitting contents 2420.

The packet for transmitting copy control information about contents 2410 is composed of a header for copy control information about contents 2411 and a payload (copy control information about contents) 2412. The packet for transmitting contents 2420 is composed of a header for contents 2421 and a payload (contents) 2422.

As for the header for copy control information about contents 2411 and the header for contents 2421, for example, 1-bit identification information is set at a fixed position of each header so that it can be easily detected whether the header is for copy control information or for contents. That is, by checking this identification information, it can be easily identified whether the packet is a packet for transmitting copy control information about contents 2410 or a packet for transmitting contents 2420.

The payload (copy control information about contents) 2412 stores encryption-processed copy control information about contents on the basis of information such as an exchange keys exchanged in the apparatus authentication process. The copy control information about contents is not limited to the configuration example shown in FIG. 20, and may include multiple formats of information together.

The packet for transmitting copy control information about contents 2410 indicates copy control information about the subsequent contents, and it is necessary to insert it into transmitted data at least each time the copy control information about the contents changes.

The encryption-processed payload (contents) 2422 includes data obtained by performing encryption of the contents on the basis of information such as the exchange keys exchanged in the apparatus authentication process.

By encrypting copy control information about contents and the contents in the format shown in FIG. 24 on the same TCP and HTTP session with a key generated on the basis of a common exchange key and transmitting them, it is possible to prevent falsification of the copy control information about the contents and to uniquely combine the copy control information about the contents with the contents. In the case of transmitting contents not by using the HTTP protocol but by using, for example, the RTP protocol, it is possible to transmit the contents with a configuration similar to that in FIG. 24 by replacing the HTTP header 2401 with an RTP header. Alternatively, by storing both of the packet for transmitting copy control information about contents 2410 and the packet for transmitting contents 2420 in each RTP packet, the copy control information about the contents can be certainly transmitted.

Figure 25:
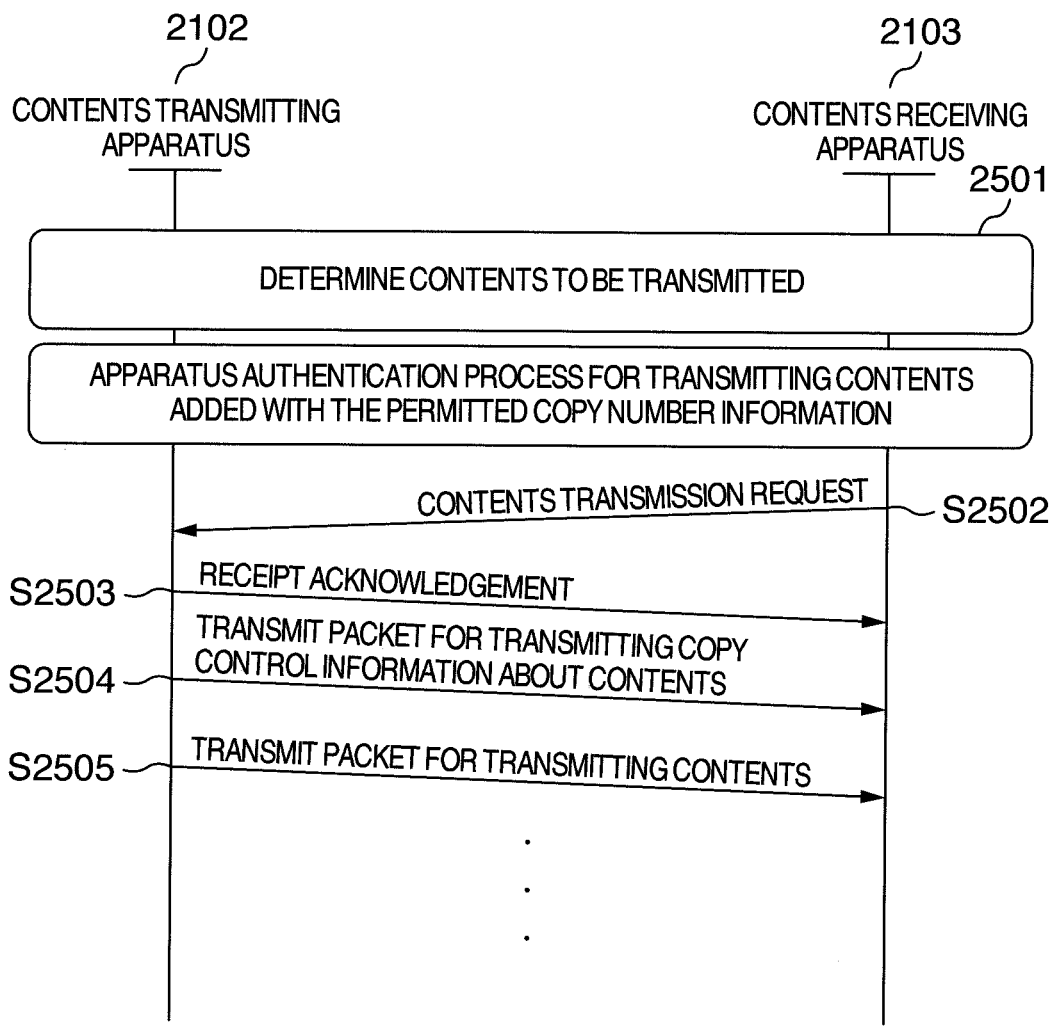
FIG. 25 is a diagram showing an example of a procedure for transmitting contents with the permitted copy number included in the copy control information.

FIG. 25 shows an example of a procedure in the case of transmitting contents by using the copy control information about contents including the permitted copy number.

First, contents to be transmitted are determined between the contents transmitting apparatus 2102 and the contents receiving apparatus 2103 (S2501). In the procedure for determining the contents, the contents receiving apparatus 2103 discovers the contents transmitting apparatus 2102, the contents transmitting apparatus 2102 presents contents, the contents receiving apparatus 2103 selects contents and the like. Alternatively, in the procedure for determining the contents, the contents transmitting apparatus 2102 discovers the contents receiving apparatus 2103, the contents transmitting apparatus 2102 presents contents, the contents transmitting apparatus 2102 selects contents and the like. The procedures can be realized by using a technique such as DLNA (Digital Living Network Alliance).

Next, the contents transmitting apparatus 2102 and the contents receiving apparatus 2103 execute the apparatus authentication process to be executed at the time of delivering contents added with the permitted copy number information in FIG. 52. When completing the apparatus authentication process, the control section of the contents receiving apparatus 2103 issues a contents transmission request to the contents transmitting apparatus 2102 via the communication processing section, using an HTTP GET request or the like (S2502).

If transmission of the requested contents is possible, the control section of the contents transmitting apparatus 2102 transmits a receipt acknowledgement indicating that the transmission is possible, to the contents receiving apparatus 2103 using an HTTP response header or the like (S2503).

Next, the encryption/decryption processing section of the contents transmitting apparatus 2102 transmits a packet for transmitting copy control information about the contents in the format shown in FIG. 24 composed of a header of the packet for transmitting the copy control information about the contents and an encryption-processed payload including the copy control information about the contents (S2504).

Then, a packet for transmitting the contents composed of a header of the packet for transmitting the contents and an encryption-processed payload including the contents is transmitted in the format shown in FIG. 24 (S2505).

The contents receiving apparatus 2103 may also inquire the contents transmitting apparatus 2102 before or after S2502 about whether the process based on the copy control information about the contents is possible or not, to execute the processing at S2503 only when it is possible. All apparatuses connected to the LAN are not necessarily capable of performing the process based on copy control information about contents. Therefore, by making the above inquiry, it is possible to detect that an apparatus cannot perform the process based on copy control information as early as possible. It is desirable to inquiry it before S2502 if possible. When DTCP_CCI in copy control information about contents indicates "Copy Free", the encryption processing at S2504 and S2505 may not be performed.

Here, if contents to be transmitted are broadcast contents themselves received by the tuner decoding section 101, the copy control information about the contents is set by immediately using information included in PSI or SI information (specifically, copy control information such as content availability descriptor and digital copy control descriptor) as described above, or by referring to the information and converting the format thereof. If the contents to be transmitted are recorded on the internal recording medium 113 or the removable recording medium 118, the copy control information about the contents is set by immediately using management information created by the contents management information creating section 119 or by referring to the information and converting the format thereof.

By transmitting contents by the procedure shown in FIG. 25, it is possible to transmit the contents including copy control information about the contents.

According to the above, it is possible to transmit copy control information including the permitted copy number when transmitting contents via wired or wireless LAN.

Next, description will be made on the processing at S2501 in FIG. 25 for determining contents to be transmitted between the contents transmitting apparatus 2102 and the contents receiving apparatus 2103, in the case where the user manipulates to dub contents.

Figure 26:
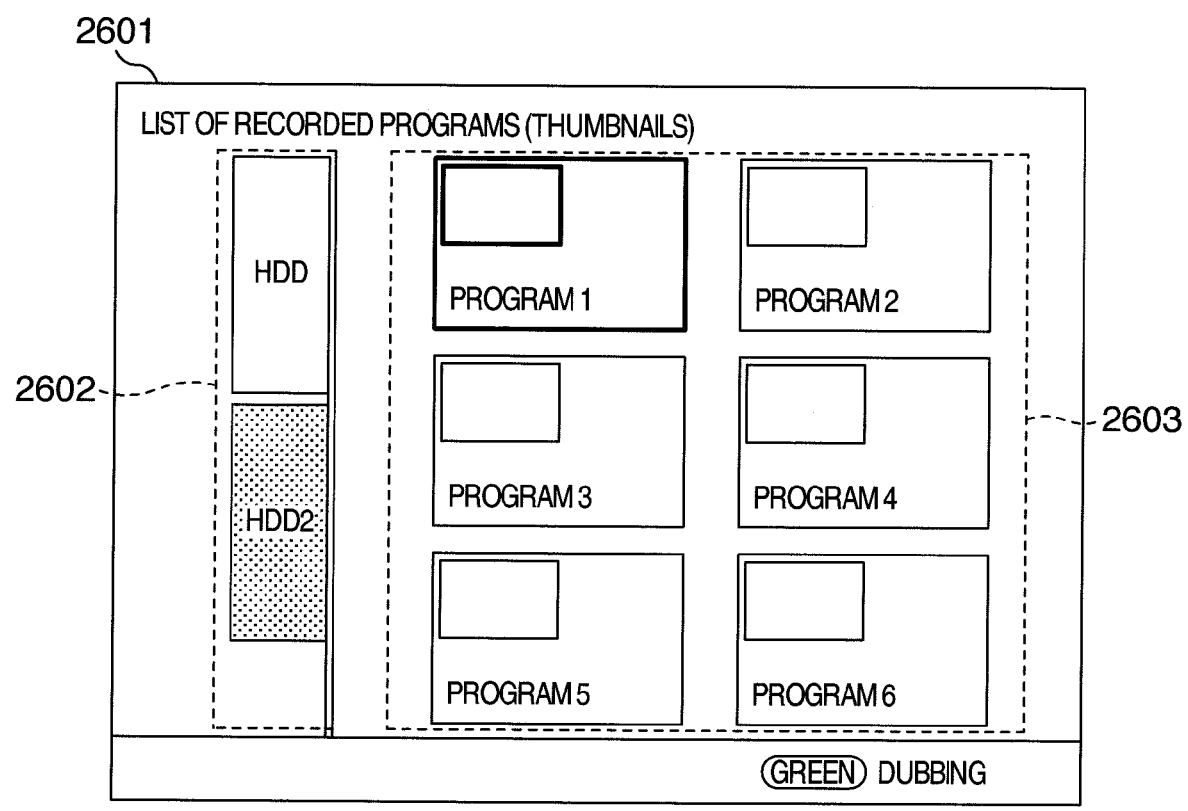
FIG. 26 is a diagram showing an example of a list of contents.

When the user presses a button on the remote controller of the contents receiving apparatus 2103 or presses a selection button displayed on the screen of the contents receiving apparatus 2103 using the remote controller, in order to confirm contents which are currently recorded on the recording media of the contents transmitting apparatus 2102, for example, in order to make the contents receiving apparatus 2103 display "a list of recorded programs" of the contents transmitting apparatus 2102, a list of recorded programs 2601 as shown in FIG. 26 appears on the screen of the contents receiving apparatus 2103, the list of recorded programs 2601 including a list of recording media of the contents transmitting apparatus 2102 and a list of program contents recorded on the recording media of the contents transmitting apparatus 2102.

Reference numeral 2602 denotes a list of recording media for selecting a list of recorded program contents to be displayed, the list of recording media displaying the recording media HDD and HDD2. Reference numeral 2603 denotes a list of program contents which displays some program contents, Programs 1, 2, 3, 4, 5, and 6 recorded in the recording medium selected from the list 2602. In this state, by the user manipulating the remote controller or the like to select contents desired to be dubbed from the area 2603 to activate a dubbing menu (for example, pressing a "dubbing" button or pressing a menu button for activating a menu to select "dubbing" from the menu), the dubbing menu is activated.

Here, the description will be made mainly in terms of the remote controller but not limited thereto. It is assumed that, in the case of displaying a screen in response to the user's manipulation, the control section 114 analyzes the manipulated input received by the user interface section 115 to cause the output section 116 to output the screen.

Figure 27:
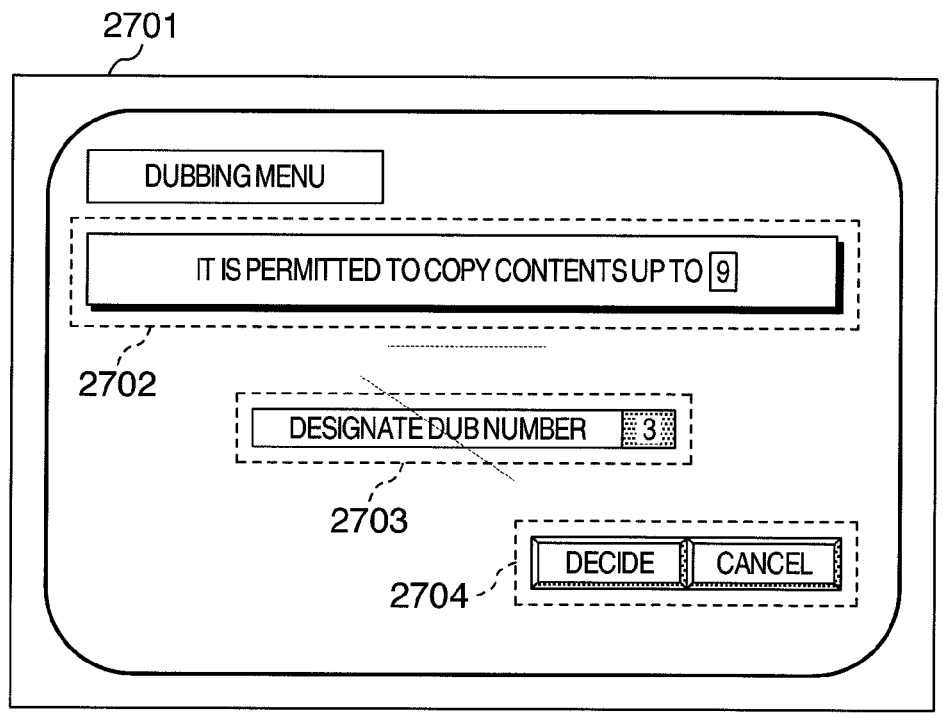
FIG. 27 is a diagram showing an example of a dubbing menu.

FIG. 27 shows an example of the dubbing menu. Reference numeral 2701 denotes a display screen. This example shows an example where the permitted copy number information about contents desired to be dubbed is analyzed (nine in the case of FIG. 27), the contents being selected by the manipulation described in FIG. 26. Here, the permitted copy number information is one or more.

On the menu, there are displayed a message example 2702 indicating the permitted copy number of the contents and the dub number setting menu 2703 for the user setting the copy number. If the contents are specified as "Copy Free", it may also be displayed that copy operations can be performed unlimitedly, for example, by displaying "∞", "Unlimited", "Free", "Without Restriction" or the like on the number display portion.

The dub number setting menu 2703 is a menu on which the user can select how many copies of the contents are to be made, for example, by manipulating the remote controller or the like. This example shows a case where the user manipulates the setting to make three copies of the contents. The input for the setting can be easily manipulated by using the numeric keypad on the remote controller. By the user selecting a "Decide" button on final decision buttons 2704 on the menu after setting the copy number of the contents using the remote controller or the like, copying is started. It may also be configured to automatically set an initial value to the maximum permitted copy number ("9" in the case of FIG. 27) to change the value without manipulating the remote controller or the like.

In this way, the user can easily set how many copies to be made for multiple recording media, while confirming the permitted copy number of contents, and the advantage of protecting contents can be obtained while enhancing the user's convenience.

If the sum of copy number the user has set for the multiple recording media (hereinafter referred to as the user-set copy number) is equal to the permitted copy number of the contents plus one, the screen may also display a notice to the effect that the original contents will be deleted, so that it can be confirmed with the user whether to "execute" or "cancel" the setting. It is also possible to permit copying up to the permitted copy number, and to display a message to the effect that copying is not permitted when the copy number exceeds the permitted copy number, because, in the case where the copy number is equal to the permitted copy number plus one, dubbing becomes possible up to the permitted copy number plus one if move is included in the count.

Thereby, the necessity of causing the user to manipulate separately for the permitted copy number and for move is eliminated. Such a notice as "Making of X copies and moving will be executed" may be displayed in addition to the message of "The original contents will be deleted if copying is performed up to the maximum permitted copy number plus one".

It is also possible to display an error message to the effect that copying is impossible if the user-set copy number is more than or equal to the permitted copy number of the contents plus two and prompt the user to re-input. This is because the execution is impossible even if the count includes the permitted copy number and move. Alternatively, it is also possible to disable input of a numerical value more than or equal to the permitted copy number plus two.

Figure 28:
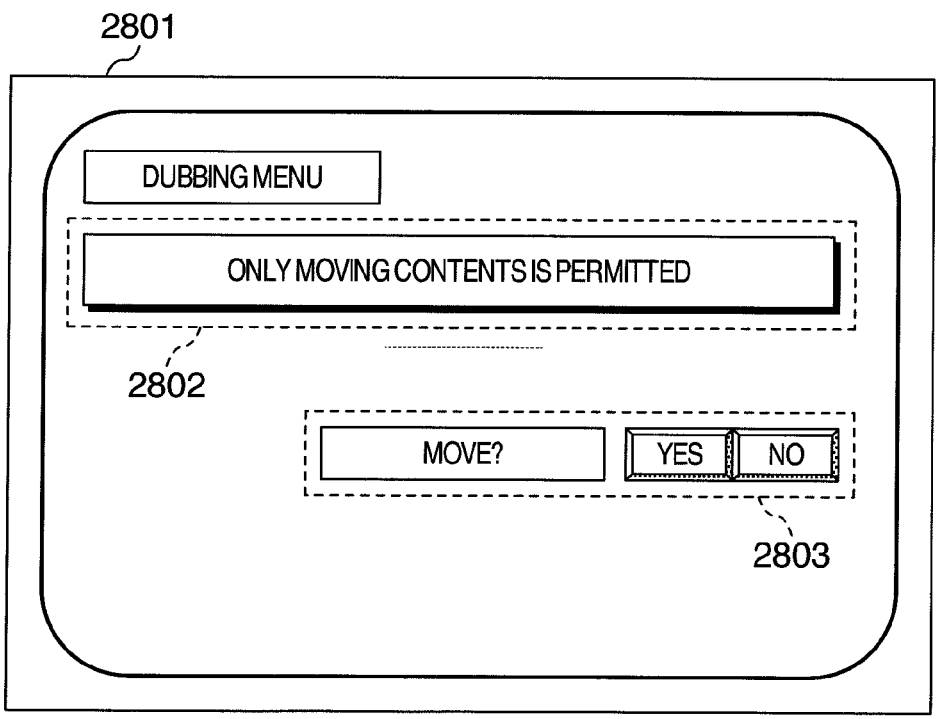
FIG. 28 is a diagram showing another example of the dubbing menu.

FIG. 28 shows another example of the dubbing menu. This example is a case of dubbing contents whose permitted copy number is set to "0" or contents recorded as "No More Copies" to which program contents specified as "Copy One Generation" are changed. Reference numeral 2801 denotes a display screen. This example is a case where only moving is permitted for the contents desired to be dubbed which the user manipulates to select as described in FIG. 26.

On the menu, there are displayed a message example 2802 indicating that only moving is permitted for the contents and a menu 2803 for the user to designate whether or not to move. This input is performed by using the remote controller or the like. If the user moves the contents, the user selects a "YES" button on the menu to start moving. If not, the user selects a "NO" button.

In this way, when dubbing contents whose permitted copy number is set to "0" or contents recorded as "No More Copies" to which program contents specified as "Copy One Generation" are changed, the user can easily set only by manipulating the "YES" button. Thus, the advantage of protecting contents can be obtained while enhancing the user's convenience.

Description will be made on a process in the case where the contents transmitting apparatus 2102 transmits, by using copy control information about contents, such contents that the permitted copy number is included in the copy control information, and the contents receiving apparatus 2103 receives the contents, by the procedure in FIG. 25.

The contents receiving apparatus 2103 receives the contents from the contents transmitting apparatus 2102, and the encryption/decryption processing section detects the header of a packet for transmitting copy control information about the contents and decrypts the encrypted copy control information about the contents to hand over the copy control information to the contents management information creating section 119 via the control section 114. After that, management information is created by the contents management information creating section 119 as described above. Furthermore, the encryption/decryption processing section detects the header of a packet for transmitting the contents, and decrypts the encrypted contents to output the contents to the selector 102 after converting the contents to a format which can be processed by the receiving, recording and reproducing section 10, such as MPEG-TS or MPEG-PS. Although the subsequent recording process is as described above, a digital stream recording process related to the copy control information about the contents is as follows.

An example of the recording process related to the copy control information (especially, DTCP_CCI information, Copy_count_Mode information and Count information) about the contents will be explained by using the process flow of FIG. 44.

First, if DTCP_CCI information indicates "Copy One Generation" (S4401: YES) and Copy_count_Mode information indicates "valid" (S4402: YES), then the permitted copy number designated in Count information is set and the contents are recorded (S4404). Specifically, management information is created by the contents management information creating section 119, and DTCP_CCI information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S4402: NO), the contents are recorded as "No More Copies" (S4405).

If DTCP_CCI information does not indicate "Copy One Generation" (S4401: NO) but indicates "Copy Free" (S4403: YES), then the contents are recorded as "Copy Free without Limit" (S4406). At this time, the writing section 112 performs or does not perform encryption processing of the contents depending on whether EPN information indicates "EPN Asserted Copy Free" or not.

If DTCP_CCI information does not indicate "Copy Free" (S4403: NO), then the contents are not recorded (S4407).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience.

Figure 44:
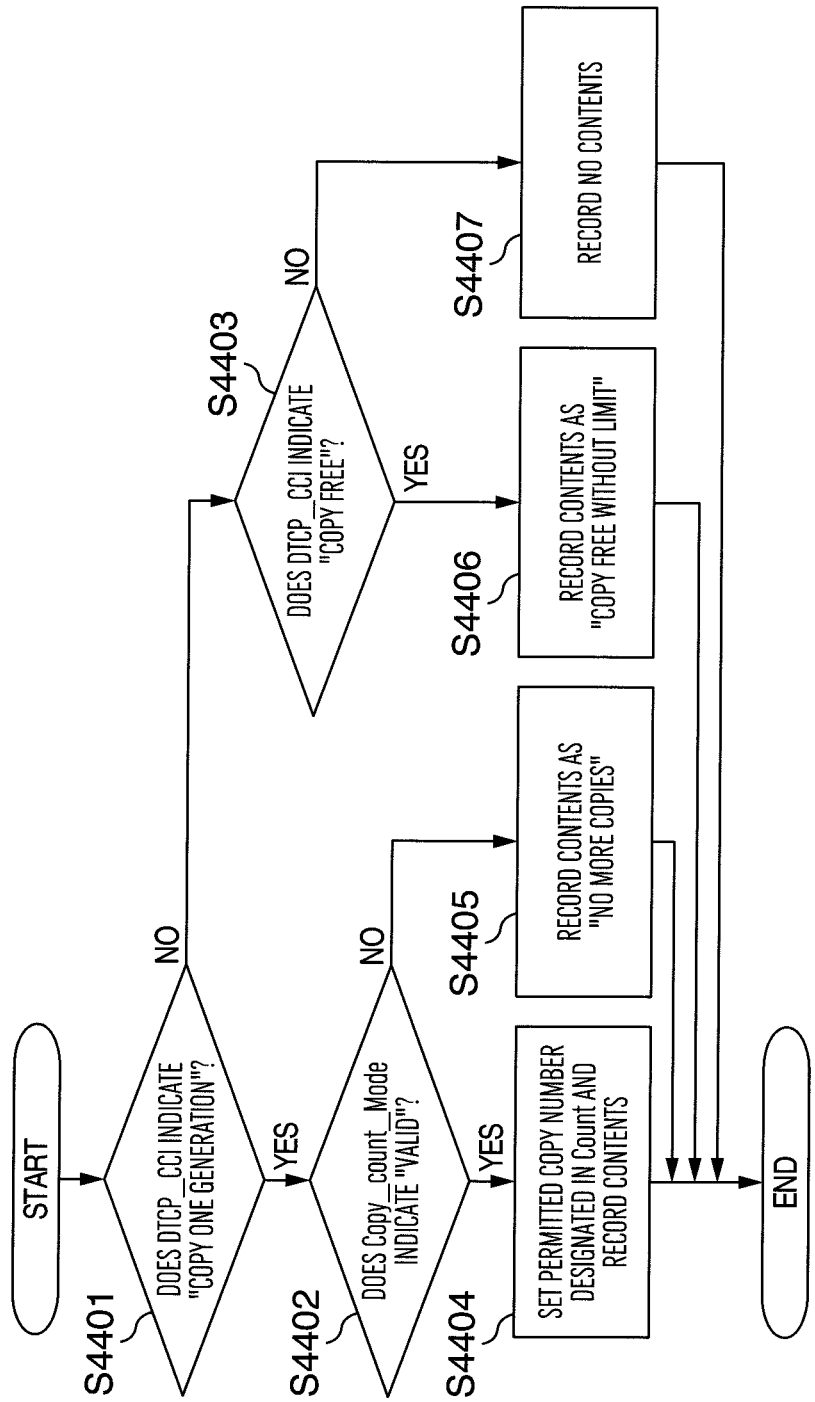
FIG. 44 is a diagram illustrating an example of the recording process related to the copy control information.
Figure 46:
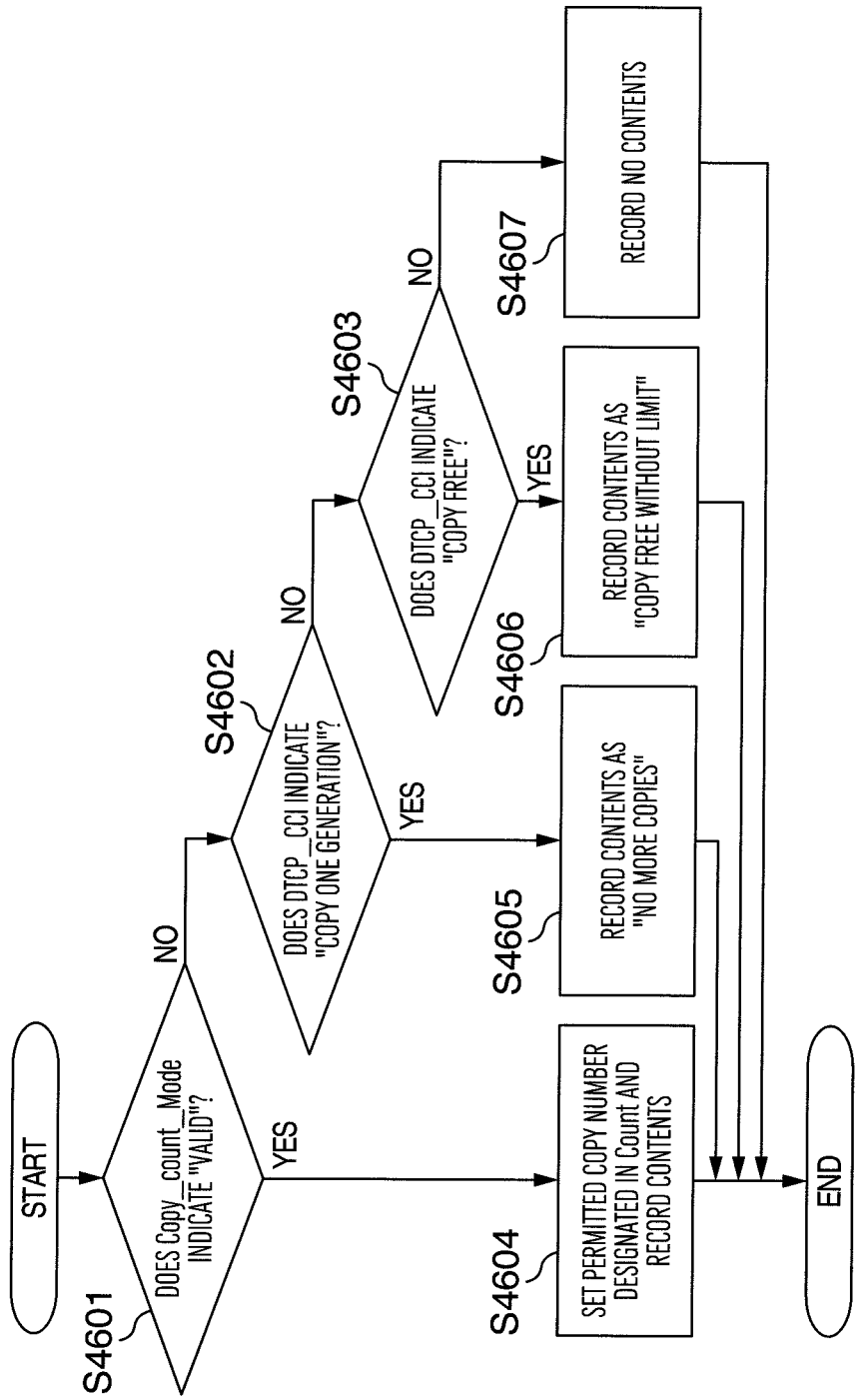
FIG. 46 is a diagram illustrating an example of the recording process related to the copy control information.

Although in FIG. 44, the procedure for performing the process with reference to DTCP_CCI information of DTCP_CCI information, Copy_count_Mode information and Count information has been described, it is also possible to perform the process with reference to Copy_count_Mode information. As for the procedure therefor, another example of the recording process related to copy control information will be explained by using the process flow of FIG. 46. The process should be performed with reference to, for example, the information prescribed in DTCP-IP standard if the information is prescribed therein.

First, if Copy_count_Mode information indicates "valid" (S4601: YES), then the permitted copy number designated in Count information is set and the contents are recorded (S4604). Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S4601: NO), and DTCP_CCI information indicates "Copy One Generation" (S4602: YES), then the contents are recorded as "No More Copies" (S4605).

If DTCP_CCI information does not indicate "Copy One Generation" (S4602: NO) but indicates "Copy Free" (S4603: YES), then the contents are recorded as "Copy Free without Limit" (S4606). At this time, the writing section 112 performs or does not perform encryption processing of the contents depending on whether EPN information indicates "EPN Asserted Copy Free" or not.

If DTCP_CCI information does not indicate "Copy Free" (S4603: NO), then the contents are not recorded (S4607).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience.

Another example of the recording process related to the copy control information (especially, DTCP_CCI information, Copy_count_Mode information and Count information) about the contents will be explained by using the process flow of FIG. 48.

First, if DTCP_CCI information indicates "Copy One Generation" (S4801: YES), and Copy_count_Mode information indicates "valid" (S4802: YES), then the permitted copy number designated in Count information is set and the contents are recorded (S4805). That is, if DTCP_CCI information indicates "Copy One Generation", the contents are recorded in a state where it is permitted to copy the contents up to the number designated in Count information.

Specifically, management information is created by the contents management information creating section 119, and DTCP_CCI information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S4802: NO), the contents are recorded as "No More Copies" (S4806).

If DTCP_CCI information does not indicate "Copy One Generation" (S4801: NO) but indicates "Copy Free" (S4803: YES), and Copy_count_Mode information indicates "valid" (S4804: YES), then the permitted copy number designated in Count information is set and the contents are recorded (S4807).

That is, if DTCP_CCI information indicates "Copy Free", the contents are recorded in a state where it is permitted to copy the contents up to the number designated in Count information. If Copy_count_Mode information indicates "invalid" (S4804: NO), then the contents are recorded as "Copy Free without Limit" (S4808). At this time, the writing section 112 performs or does not perform encryption processing of the contents depending on whether EPN information indicates "EPN Asserted Copy Free" or not.

If DTCP_CCI information does not indicate "Copy Free" (S4803: NO), then the contents are not recorded (S4809).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept, and the advantage of protecting contents can be obtained while enhancing the user's convenience.

Figure 48:
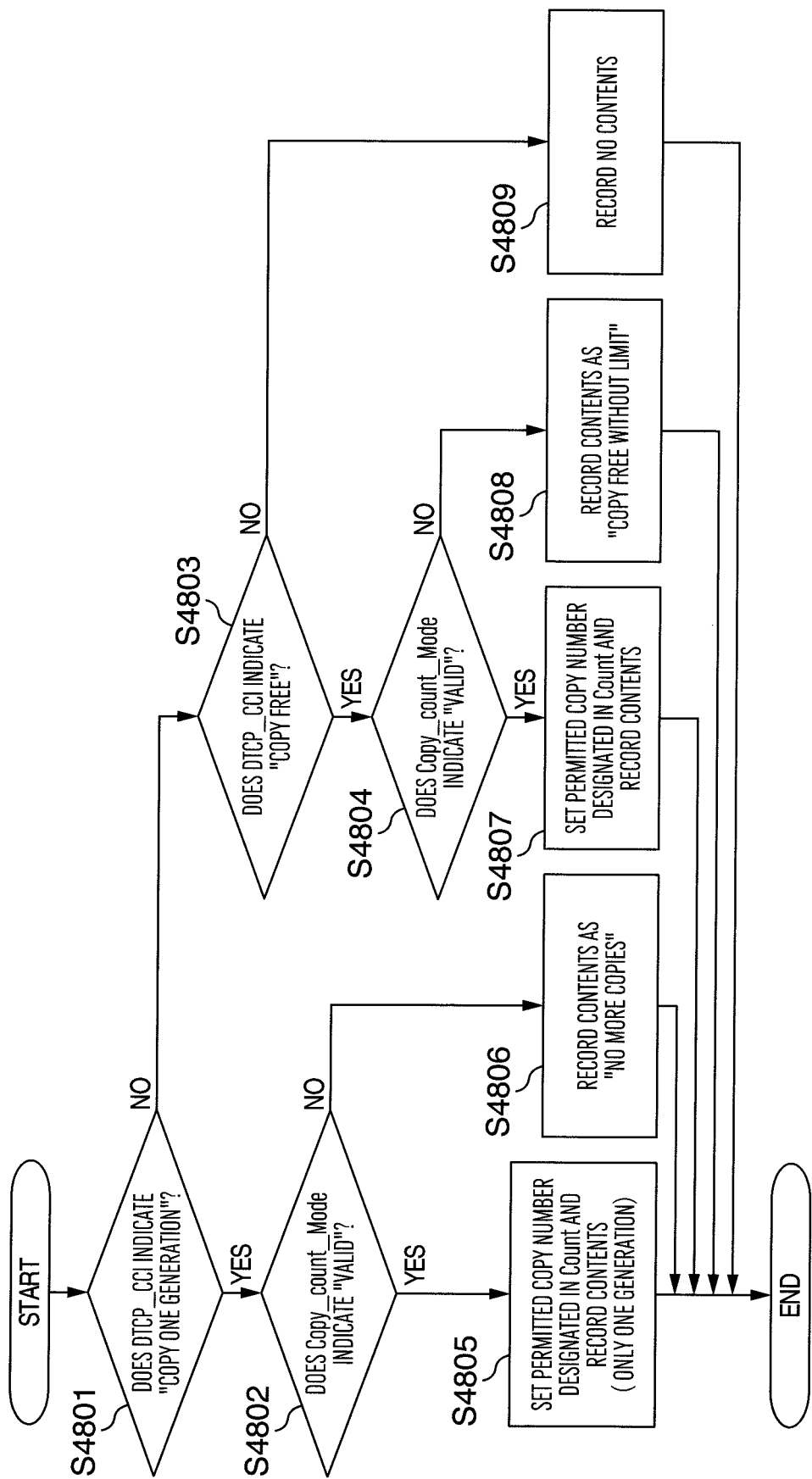
FIG. 48 is a diagram illustrating an example of the recording process related to the copy control information.
Figure 50:
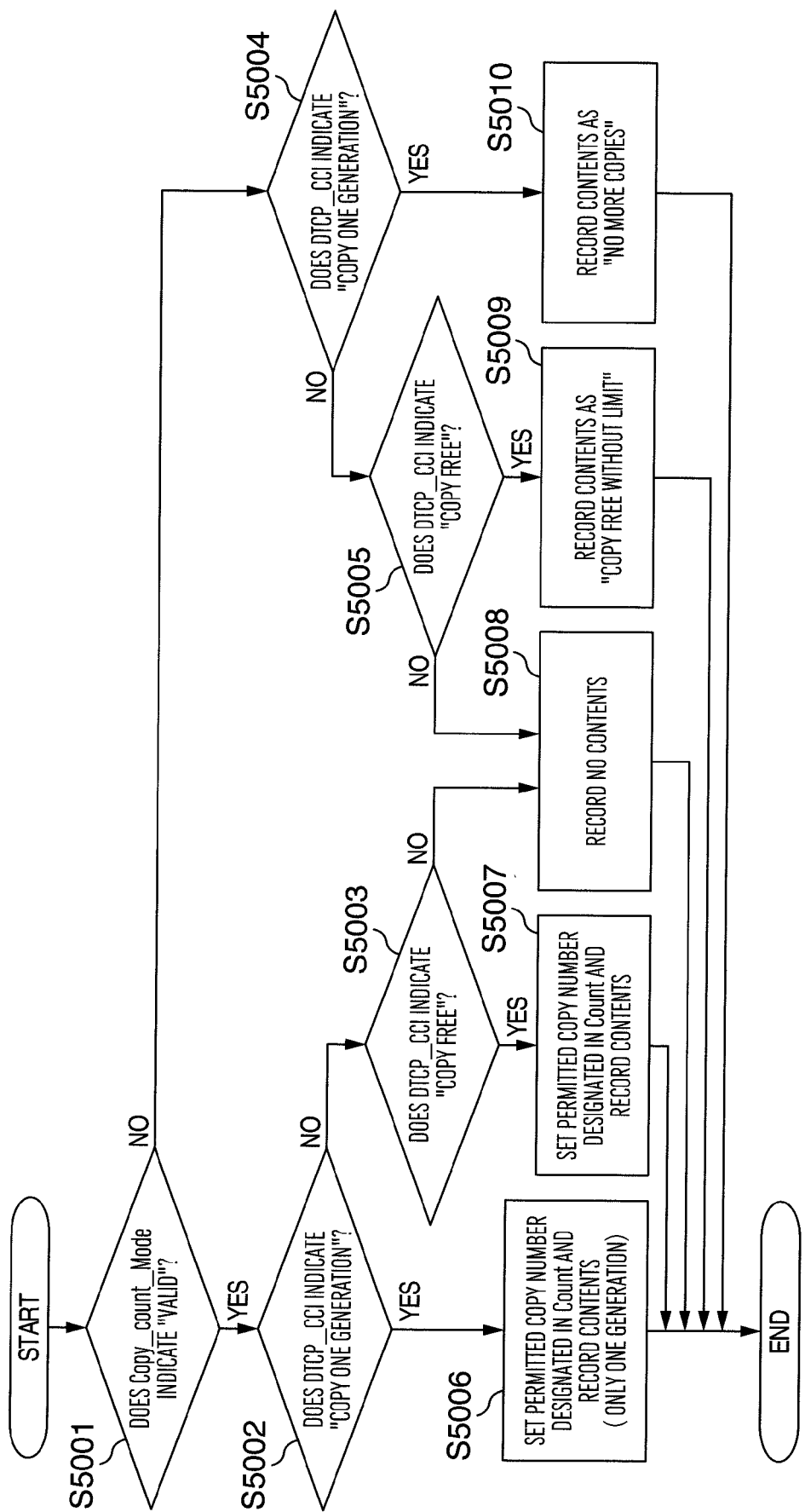
FIG. 50 is a diagram illustrating an example of the recording process related to the copy control information.

Although, in FIG. 48, the procedure for performing the process with reference to DTCP_CCI information of DTCP_CCI information, Copy_count_Mode information and Count information has been described, it is also possible to perform the process with reference to Copy_count_Mode information. As for the procedure therefor, another example of the recording process related to copy control information will be explained by using the process flow of FIG. 50. The process should be performed with reference to, for example, the information prescribed in DTCP-IP standard if the information is prescribed therein.

First, if Copy_count_Mode information indicates "valid" (S5001: YES), and DTCP_CCI information indicates "Copy One Generation" (S5002: YES), then the permitted copy number designated in Count information is set and the contents are recorded (S5006). That is, if DTCP_CCI information indicates "Copy One Generation", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If DTCP_CCI information does not indicate "Copy One Generation" (S5002: NO) but indicates "Copy Free" (S5003: YES), then the permitted copy number designated in Count information is set and the contents are recorded (S5007).

That is, if DTCP_CCI information indicates "Copy Free", the contents are recorded in a state where it is permitted to copy the contents up to the number designated in Count information. If DTCP_CCI information does not indicate "Copy Free" (S5003: NO), then the contents are not recorded (S5008).

If Copy_count_Mode information indicates "invalid" (S5001: NO), and DTCP_CCI information indicates "Copy One Generation" (S5004: YES), then the contents are recorded as "No More Copies" (S5010).

If DTCP_CCI information does not indicate "Copy One Generation" (S5004: NO) but indicates "Copy Free" (S5005: YES), then the contents are recorded as "Copy Free without Limit" (S5009). At this time, the writing section 112 performs or does not perform encryption processing of the contents depending on whether EPN information indicates "EPN Asserted Copy Free" or not.

If DTCP_CCI information does not indicate "Copy Free" (S5005: NO), then the contents are not recorded (S5008).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience.

Although the recording process related to copy control information has been described in the case of the copy control information about contents in the format described in FIG. 20, the case of the copy control information about contents in the format of FIG. 30 will be described below.

FIG. 30 is a diagram showing another example of the copy control information about contents. FIG. 30 shows a format in the case where Copy_count_Mode information is deleted from the copy control information about contents in FIG. 20.

In FIG. 30, "Retention_Move_Mode", "Retention_State", "DTCP_CCI (DTCP_Copy Control Information)", EPN, Count, "Image_Constraint_Token" and APS (Analogue Protection System) are the same as those described in FIG. 20, and therefore, description thereof is omitted. Description will be made on "License Acquisition Start", "License Acquisition Limit", "Playback Not Before" and "Playback Not After".

These pieces of information are used, for example, at the time of recording on a recording medium digitally connected via wired/wireless LAN or the like:

encrypted download contents which have been input to the network interface section 106 from a server outside the house or the like via a line (an IEEE1394 cable, a LAN cable, wireless LAN or the like) and stored on the internal recording medium 113;

metadata (in which information about contents is described) and a media file (the body of the contents) which have been obtained by receiving, through the tuner decoding section 101, a digital broadcast signal transmitted from the transmitting apparatus 1 via a broadcast transmission network using a satellite, a terrestrial wave or a cable and stored on the internal recording medium 113 or the like.

The forms of marketing the download contents include, for example, single item rental, advance single item rental, packaged rental, single item sale, advance single item sale, packaged sale and the like.

The single item rental is a form of marketing in which the contents can be reproduced during a viewable period after downloading single item contents to a receiving terminal and acquiring a download/reproduction license necessary for viewing the contents from a server outside the house.

The advance single item rental is a form of marketing in which contents of a single item rental product are sold prior to the viewable period for the contents and only download delivery of metadata and a media file is performed in advance. The release (premiere) date and time is set after the sale of the contents ends. By acquiring a download/reproduction license necessary for viewing the contents from a server outside the house, the contents can be viewed after the release date and time.

The packaged rental is a form of marketing in which multiple sets of contents are sold collectively (as a package). The same viewable period is set for all the sets of contents included in the package. The single item sale is a form of marketing in which contents are sold by download to a receiving terminal so that reproduction is possible without limit of a viewable period. There are two kinds of single item sales: sale accompanied by a license for exporting the contents to media (referring to copying of contents to a copyright-protected external device or an copyright-protected external apparatus connected via a network, especially a contents copy function based on use conditions); and sale not accompanied by the license.

For example, the export license is acquired from a server outside the house at the time of executing export. The advance single item sale is a form of marketing in which contents of a single item sale product are sold prior to the viewable period for the contents, and only download delivery of metadata and a media file is performed in advance. The release (premiere) data and time is set after the sale of the contents ends. By acquiring a download/reproduction license necessary for viewing the contents from a server outside the house, the contents can be viewed after the release date and time. The packaged sale is a form of marketing in which multiple single sale products are sold collectively (as a package).

"License Acquisition Start" indicates a date and time when acquisition of a license becomes possible, for example, a date and time when acquisition of a download/reproduction license for the advance single item rental or the advance single item sale becomes possible.

"License Acquisition Limit" indicates a date and time when acquisition of a license becomes impossible, for example, a date and time when acquisition of a download/reproduction license or an export license becomes impossible.

"Playback Not Before" indicates that reproduction is impossible before the date and time (time period) indicated thereby. For example, it is set in the case of contents in a rental form which cannot be viewed immediately after acquisition of the download/reproduction license for the contents.

"Playback Not After" indicates that reproduction is impossible after the date and time (time period) indicated thereby. For example, in the case of contents in a rental form, date and time (time period) from the time of enabling viewing until the time of disabling viewing, that is, a rental period is set after acquisition of a download/reproduction license.

In this way, by using the information of "License Acquisition Start", "License Acquisition Limit", "Playback Not Before" and "Playback Not After" on the contents transmitting and receiving sides, it is possible to, when outputting downloaded contents (metadata and a media file) and recording the contents on a recording medium digitally connected via wired/wireless LAN or the like on the contents transmitting side, manage information about the license acquisition period and the viewing period. Thus, the advantage of protecting contents can be obtained while enhancing the user's convenience.

Further, in the case where the information of "License Acquisition Limit" or "Playback Not After" indicates expiration, that is, in the case where it is known in advance that license acquisition or viewing period has been expired, the contents transmitting side may not output contents to the receiving side, or the contents receiving side may control, although contents are output from the transmitting side to the receiving side, not to record the contents.

Furthermore, the following is also possible. When downloaded contents (metadata and a media file) is transmitted/received between the contents transmitting and receiving sides while the information of "License Acquisition Limit" or "Playback Not After" does not indicate expiration to be recorded on a recording medium on the receiving side, the license acquisition period and the viewing period are managed on the basis of the information "License Acquisition Limit" or "Playback Not After" received by the receiving side. If expiration of any one or both of them occurs, the downloaded contents (the metadata and the media file) which have been recorded on the recording medium may be deleted on the receiving side. By doing this, the user's convenience can be further enhanced, and the advantage of protecting contents can be obtained.

Next, an example of a recording process related to the copy control information about contents (especially, DTCP_CCI information and Count information) shown in FIG. 30 will be explained by using the process flow of FIG. 45.

First, if DTCP_CCI information indicates "Copy One Generation" (S4501: YES), and Count information indicates a value other than "0" (S4502: YES), then the permitted copy number information designated in Count information is set and the contents are recorded (S4504).

Specifically, management information is created by the contents management information creating section 119, and DTCP_CCI information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S4502: NO), the contents are recorded as "No More Copies" (S4505).

If DTCP_CCI information does not indicate "Copy One Generation" (S4501: NO) but indicates "Copy Free" (S4503: YES), then the contents are recorded as "Copy Free without Limit" (S4506). At this time, the writing section 112 performs or does not perform encryption processing of the contents depending on whether EPN information indicates "EPN Asserted Copy Free" or not.

If DTCP_CCI information does not indicate "Copy Free" (S4503: NO), then the contents are not recorded (S4507).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience.

Figure 45:
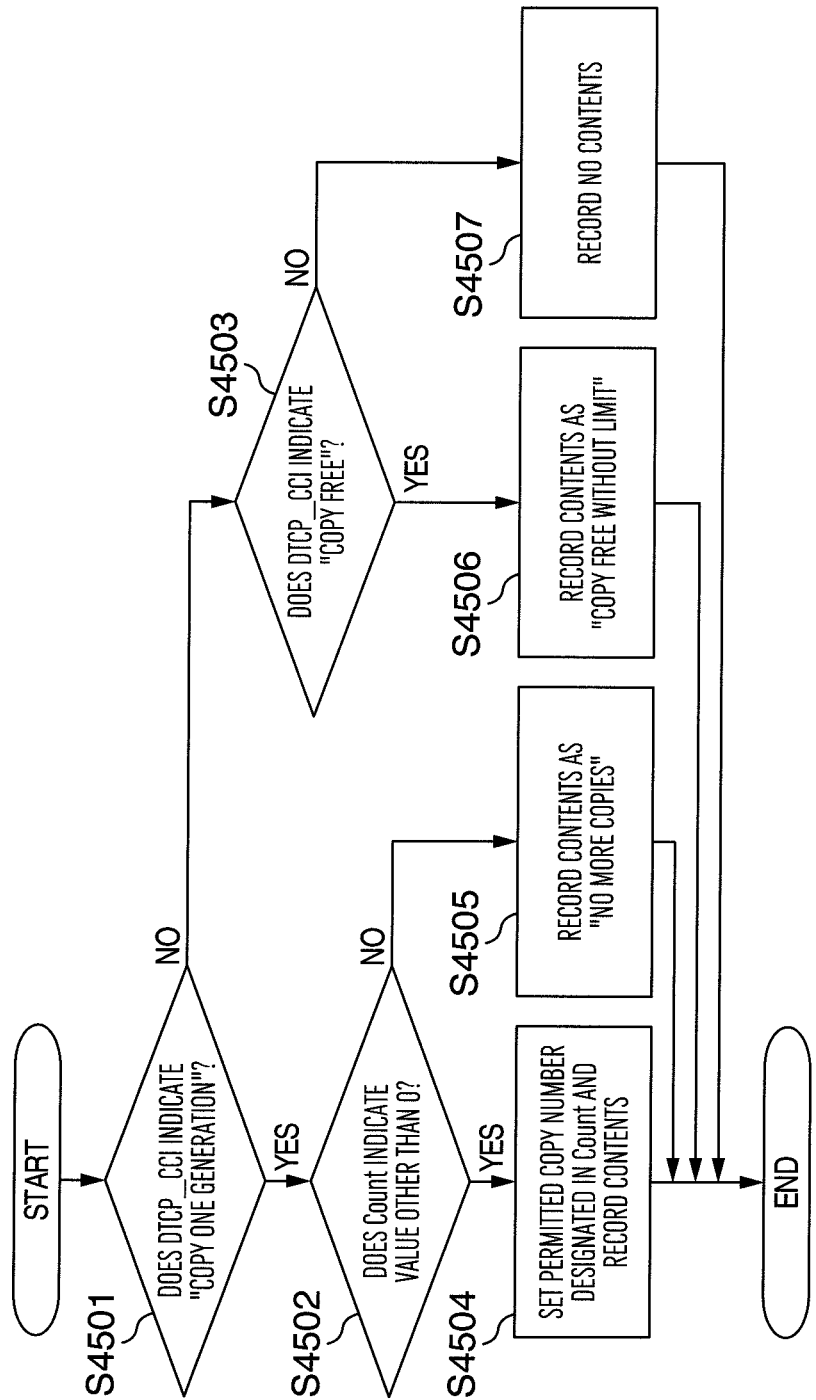
FIG. 45 is a diagram illustrating an example of the recording process related to the copy control information.
Figure 47:
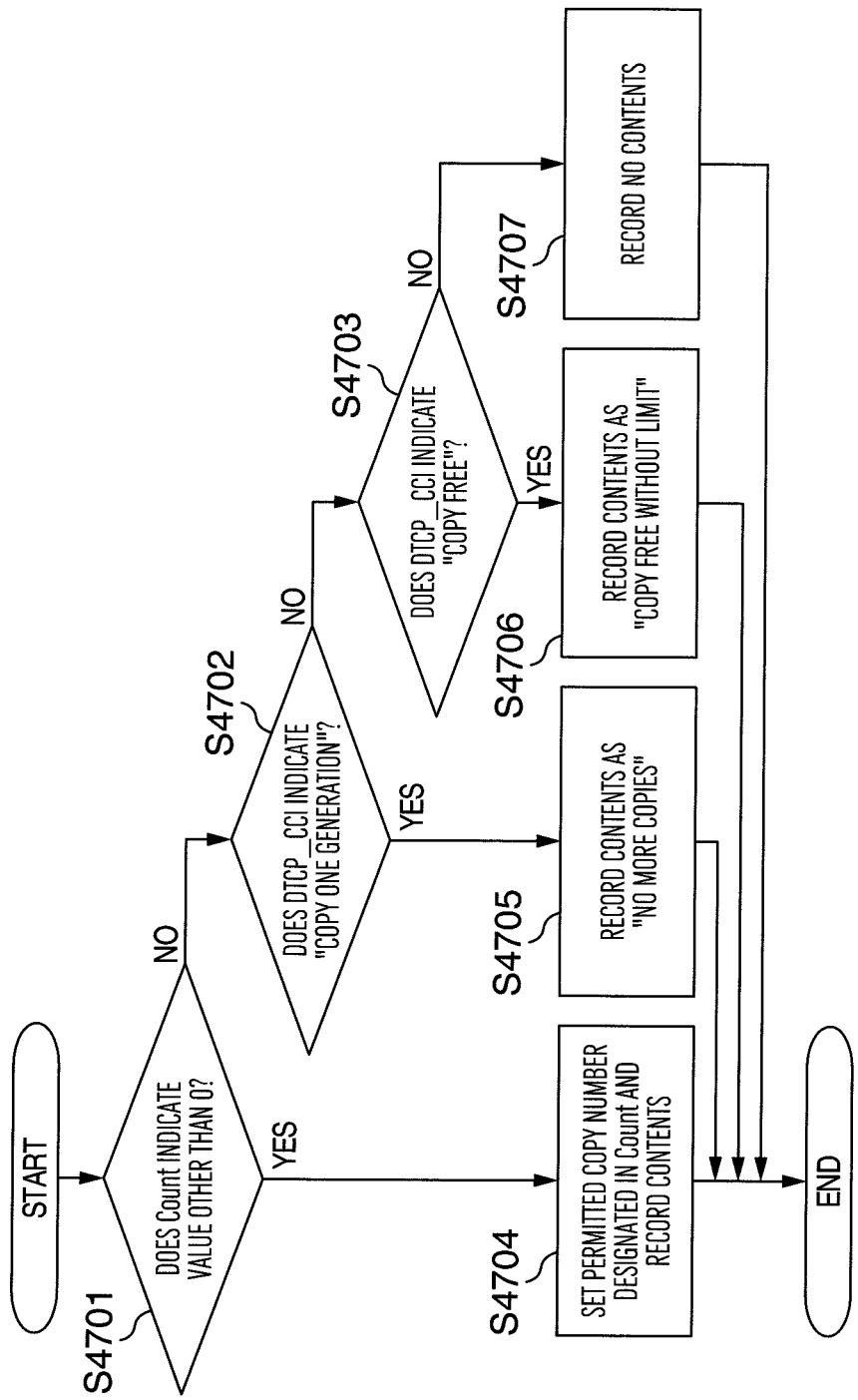
FIG. 47 is a diagram illustrating an example of the recording process related to the copy control information.

Although, in FIG. 45, the procedure for performing the process with reference to DTCP_CCI information of DTCP_CCI information and Count information has been described, it is also possible to perform the process with reference to Count information. As for the procedure therefor, another example of the recording process related to copy control information will be explained by using the process flow of FIG. 47. The process should be performed with reference to, for example, the information prescribed in DTCP-IP standard if the information is prescribed therein.

First, if Count information indicates a value other than "0" (S4701: YES), then the permitted copy number designated in Count information is set and the contents are recorded (S4704). Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S4701: NO), and DTCP_CCI information indicates "Copy One Generation" (S4702: YES), then the contents are recorded as "No More Copies" (S4705).

If DTCP_CCI information does not indicate "Copy One Generation" (S4702: NO) but indicates "Copy Free" (S4703: YES), then the contents are recorded as "Copy Free without Limit" (S4706). At this time, the writing section 112 performs or does not perform encryption processing of the contents depending on whether EPN information indicates "EPN Asserted Copy Free" or not.

If DTCP_CCI information does not indicate "Copy Free" (S4703: NO), then the contents are not recorded (S4707).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience.

Next, another example of the recording process related to the copy control information about contents (especially, DTCP_CCI information and Count information) shown in FIG. 30 will be explained by using the process flow of FIG. 49.

First, if DTCP_CCI information indicates "Copy One Generation" (S4901: YES), and Count information indicates a value other than "0" (S4902: YES), then the permitted copy number designated in Count information is set and the contents are recorded (S4905). That is, if DTCP_CCI information indicates "Copy One Generation", the contents are recorded in a state where it is permitted to copy the contents up to the number designated in Count information. Specifically, management information is created by the contents management information creating section 119, and DTCP_CCI information and Count information are stored as the copy generation control information and the copy number control information, respectively.

Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S4902: NO), the contents are recorded as "No More Copies" (S4906).

If DTCP_CCI information does not indicate "Copy One Generation" (S4901: NO) but indicates "Copy Free" (S4903: YES), and Count information indicates a value other than "0" (S4904: YES), then the permitted copy number designated in Count information is set and the contents are recorded (S4907).

That is, if DTCP_CCI information indicates "Copy Free", the contents are recorded in a state where it is permitted to copy the contents up to the number designated in Count information. If Count information indicates "0" (S4904: NO), then the contents are recorded as "Copy Free without Limit" (S4908). At this time, the writing section 112 performs or does not perform encryption processing of the contents depending on whether EPN information indicates "EPN Asserted Copy Free" or not.

If DTCP_CCI information does not indicate "Copy Free" (S4903: NO), then the contents are not recorded (S4909).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept, and the advantage of protecting contents can be obtained while enhancing the user's convenience.

Figure 49:
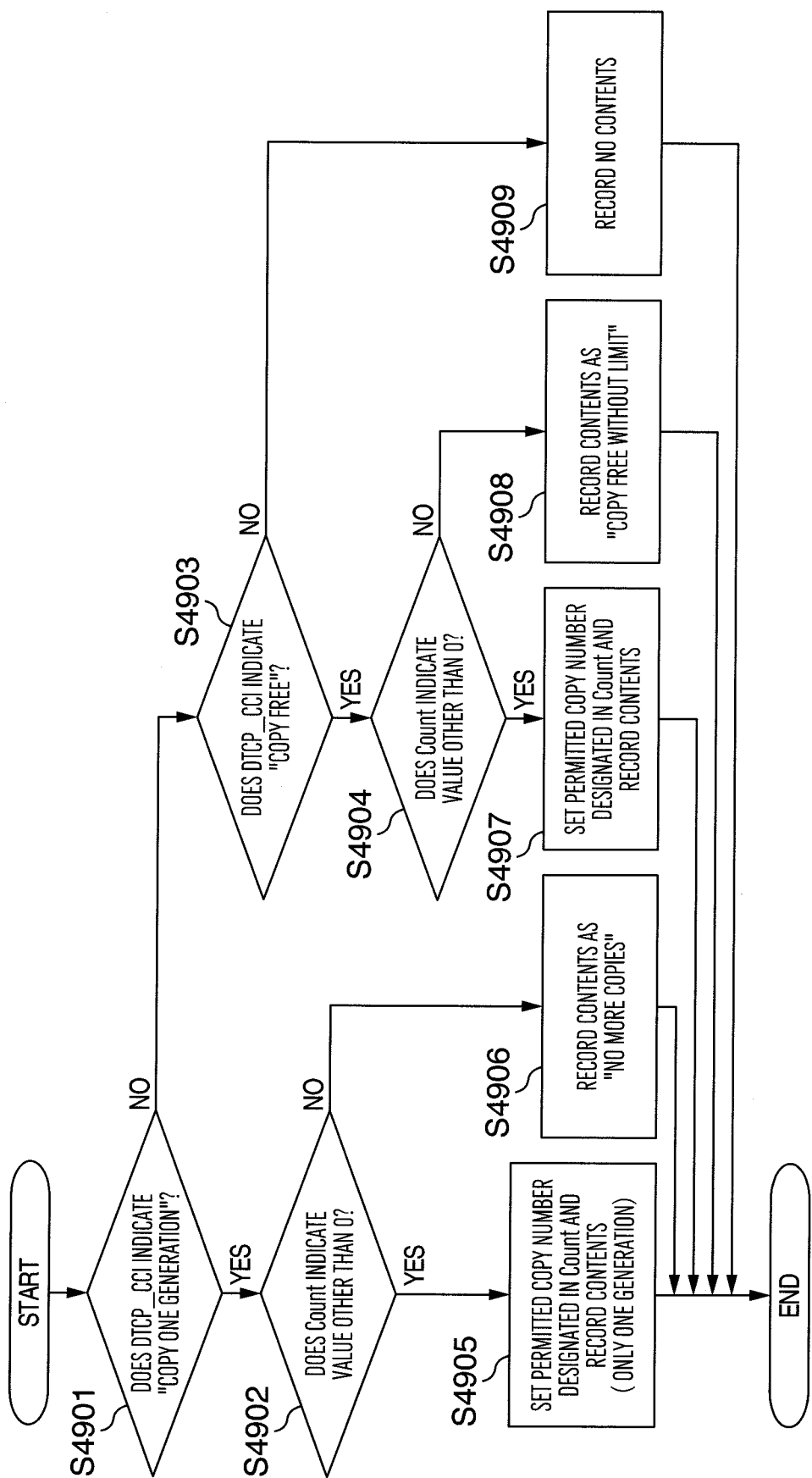
FIG. 49 is a diagram illustrating an example of the recording process related to the copy control information.
Figure 51:
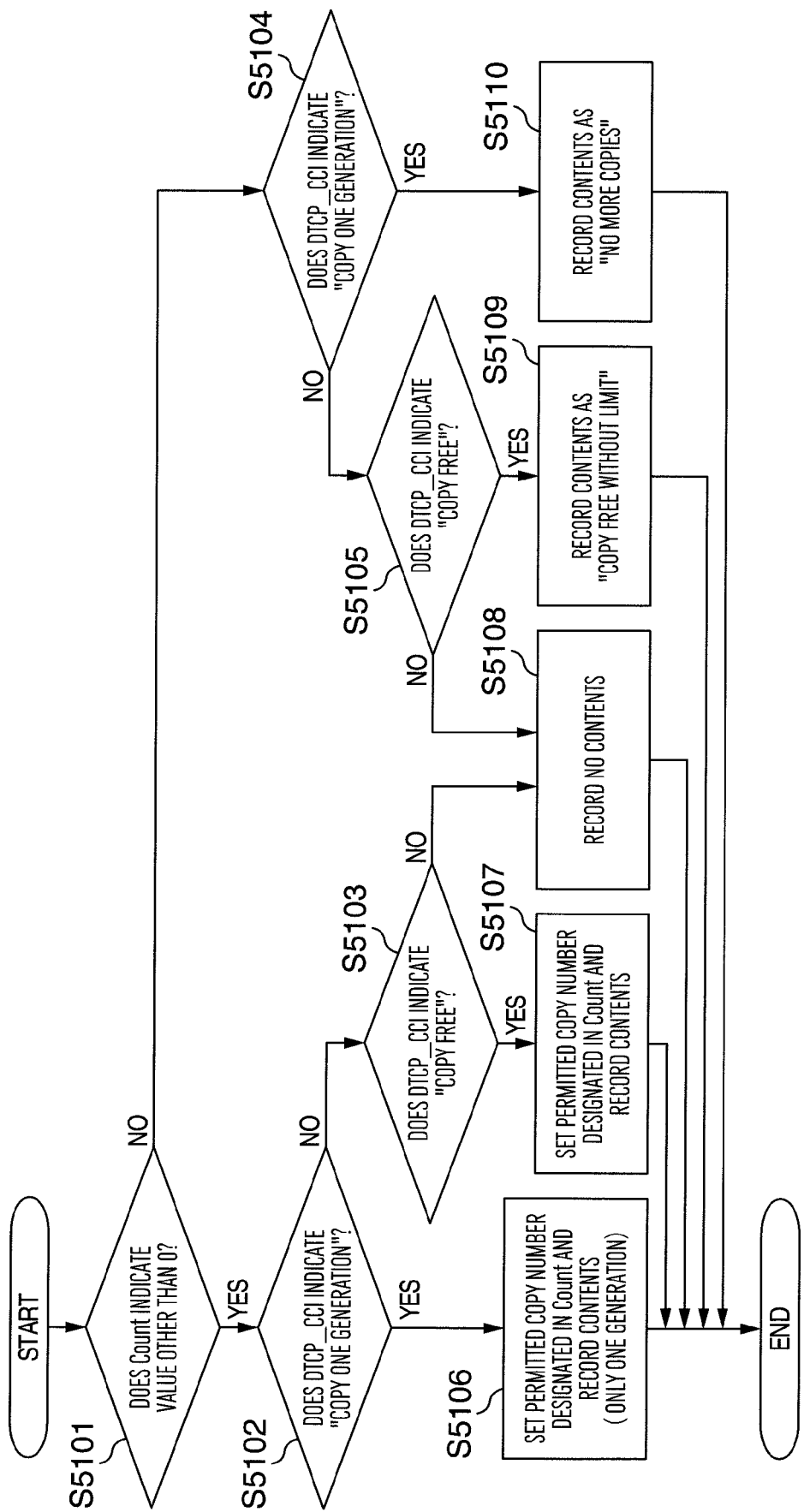
FIG. 51 is a diagram illustrating an example of the recording process related to the copy control information.

Although, in FIG. 49, the procedure for performing the process with reference to DTCP_CCI information of DTCP_CCI information and Count information has been described, it is also possible to perform the process with reference to Count information. As for the procedure therefor, another example of the recording process related to copy control information will be explained by using the process flow of FIG. 51. The process should be performed with reference to, for example, the information prescribed in DTCP-IP standard if the information is prescribed therein.

First, if Count information indicates a value other than "0" (S5101: YES) and DTCP_CCI information indicates "Copy One Generation" (S5102: YES), then the permitted copy number designated in Count information is set and the contents are recorded (S5106). That is, if DTCP_CCI information indicates "Copy One Generation", the contents are recorded in a state where it is permitted to copy the contents up to the number designated in Count information. Specifically, management information is created by the contents management information creating section 119, and Copy One Generation information and Count information are stored as the copy generation control information and the copy number control information, respectively.

Then, the writing section 112 records the management information created by the contents management information creating section 119, and the encrypted data obtained by performing encryption processing of the contents on the basis of key information in the management information, on the internal recording medium 113 or the removable recording medium 118.

If DTCP_CCI information does not indicate "Copy One Generation" (S5102: NO) but indicates "Copy Free" (S5103: YES), then the permitted copy number designated in Count information is set and the contents are recorded (S5107).

That is, if DTCP_CCI information does indicate "Copy Free", then the contents are recorded in a state where it is permitted to copy the contents up to the number designated in Count information. If DTCP_CCI information does not indicate "Copy Free" (S5103: NO), then the contents are not recorded (S5108).

If Count information indicates "0" (S5101: NO), and DTCP_CCI information indicates "Copy One Generation" (S5104: YES), then the contents are recorded as "No More Copies" (S5110).

If DTCP_CCI information does not indicate "Copy One Generation" (S5104: NO) but indicates "Copy Free" (S5105: YES), then the contents are recorded as "Copy Free without Limit" (S5109). At this time, the writing section 112 performs or does not perform encryption processing of the contents depending on whether EPN information indicates "EPN Asserted Copy Free" or not.

If DTCP_CCI information does not indicate "Copy Free" (S5105: NO), then the contents are not recorded (S5108).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience.

An example of the recording process in the receiving apparatus has been explained by using FIGS. 44 to 51. In the transmitting apparatus in this case, it is required to set copy control information about contents so that the receiving apparatus can perform the above recording process. That is, the transmitting apparatus side has to perform contents copyright management correctly and has to generate correct copy control information based on a request from the receiving apparatus side to provide it to the receiving apparatus side.

Next, still another example of the recording process in the receiving apparatus described in FIGS. 44 to 51 will be described. First, description will be made on a recording process related to copy control information in the case where copy control information about contents is in the format described in FIG. 20.

An example of a recording process in the receiving apparatus related to the copy control information about contents (especially, DTCP_CCI information, Copy_count_Mode information and Count information) and the copy control information including content availability descriptor and digital copy control descriptor will be explained by using the process flow of FIG. 29.

First, if DTCP_CCI information indicates "Copy One Generation" (S2901: YES), Copy_count_Mode information indicates "valid" (S2902: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, the contents are recordable as "Copy Free with Limit of the Number" (S2904: YES), then the permitted copy number designated in Count information is set and the contents are recorded (S2907). Specifically, management information is created by the contents management information creating section 119, and DTCP_CCI information or digital_recording_control_data information of digital copy control descriptor and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S2902: NO), or if digital copy control descriptor and content availability descriptor in the copy control information in the received MPEG2-TS digital stream do not indicate "Copy Free with Limit of the Number" (S2904: NO), then the contents are recorded as "No More Copies" (S2908) when "digital_recording_control_data" of digital copy control descriptor indicates "Copy One Generation" (S2906: "Copy One Generation").

If DTCP_CCI information does not indicate "Copy One Generation" (S2901: NO) but indicates "Copy Free" (S2903: YES), then the contents are recorded as "Copy Free without Limit" (S2909) when "digital_recording_control_data" of digital copy control descriptor indicates "Copy Free without Restriction" (S2906: "Copy Free without Restriction"). At this time, the writing section 112 performs or does not perform encryption processing of the contents depending on whether EPN information indicates "EPN Asserted Copy Free" or not. If "digital_recording_control_data" of digital copy control descriptor indicates "Copy One Generation" (S2906: "Copy One Generation"), then the contents are recorded as "No More Copies" (S2908).

If DTCP_CCI information does not indicate "Copy Free" (S2903: NO), or if "digital_recording_control_data" of digital copy control descriptor indicates "Copy Never" (S2906: "Copy Never"), then the contents are not recorded (S2910).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Figure 32:
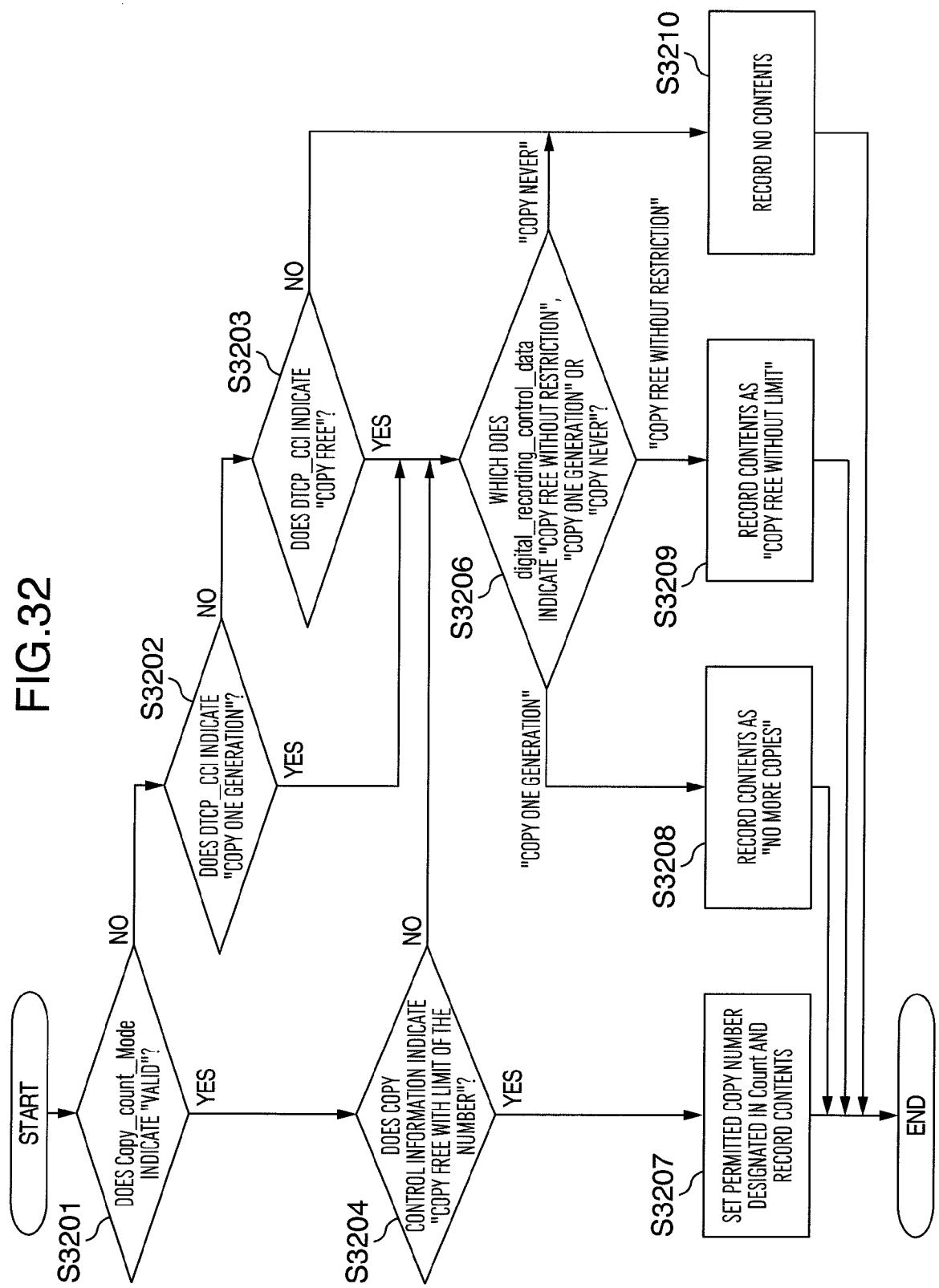
FIG. 32 is a diagram illustrating an example of the recording process related to the copy control information.

Although, in FIG. 29, the procedure for performing the process with reference to DTCP_CCI information of DTCP_CCI information, Copy_count_Mode information and Count information has been described, it is also possible to perform the process with reference to Copy_count_Mode information. As for the procedure therefor, another example of the recording process related to copy control information will be explained by using the process flow of FIG. 32. The process should be performed with reference to, for example, the information prescribed in DTCP-IP standard if the information is prescribed therein.

First, if Copy_count_Mode information indicates "valid" (S3201: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3204: YES), then the permitted copy number designated in Count information is set and the contents are recorded (S3207). Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S3201: NO), and DTCP_CCI information indicates "Copy One Generation" (S3202: YES), or if digital copy control descriptor and content availability descriptor in the copy control information in the received MPEG2-TS digital stream do not indicate "Copy Free with Limit of the Number" (S3204: NO), then the contents are recorded as "Copy Free without Limit" (S3209) when "digital_recording_control_data" of digital copy control descriptor indicates "Copy Free without Restriction" (S3206: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3206: "Copy One Generation"), then the contents are recorded as "No More Copies" (S3208).

If DTCP_CCI information does not indicate "Copy Free" (S3203: NO), or if "digital_recording_control_data" of digital copy control descriptor indicates "Copy Never" (S3206: "Copy Never"), then the contents are not recorded (S3210).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Another example of the recording process in the receiving apparatus related to the copy control information about contents (especially, DTCP_CCI information, Copy_count_Mode information and Count information) and the copy control information including content availability descriptor and digital copy control descriptor will be explained by using the process flow of FIG. 34.

First, if DTCP_CCI information indicates "Copy One Generation" (S3401: YES), Copy_count_Mode information indicates "valid" (S3402: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3405: YES), then the permitted copy number designated in Count information is set and the contents are recorded (S3408). That is, if DTCP_CCI information indicates "Copy One Generation" and the copy control information indicates "Copy Free with Limit of the Number", the contents are recorded in a state where it is permitted to copy the contents up to the number designated in Count information.

Specifically, management information is created by the contents management information creating section 119, and DTCP_CCI information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If DTCP_CCI information does not indicate "Copy One Generation" (S3401: NO) but indicates "Copy Free" (S3403: YES), Copy_count_Mode information indicates "valid" (S3404: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3405: YES), then the permitted copy number designated in Count information is set and the contents are recorded (S3408). That is, if DTCP_CCI information indicates "Copy Free", the contents are recorded in a state where it is permitted to copy the contents up to the number designated in Count information.

If Copy_count_Mode information indicates "invalid" (S3402: NO), if digital copy control descriptor and content availability descriptor in the copy control information in the received MPEG2-TS digital stream do not indicate "Copy Free with Limit of the Number" (S3405: NO), or if Copy_count_Mode information indicates "invalid" (S3404: NO), then the contents are recorded as "Copy Free without Limit" (S3410) when "digital_recording_control_data" of digital copy control descriptor indicates "Copy Free without Restriction" (S3407: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3407: "Copy One Generation"), then the contents are recorded as "No More Copies" (S3409).

If DTCP_CCI information does not indicate "Copy Free" (S3403: NO), or if "digital_recording_control_data" of digital copy control descriptor indicates "Copy Never" (S3407: "Copy Never"), then the contents are not recorded (S3411).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Figure 34:
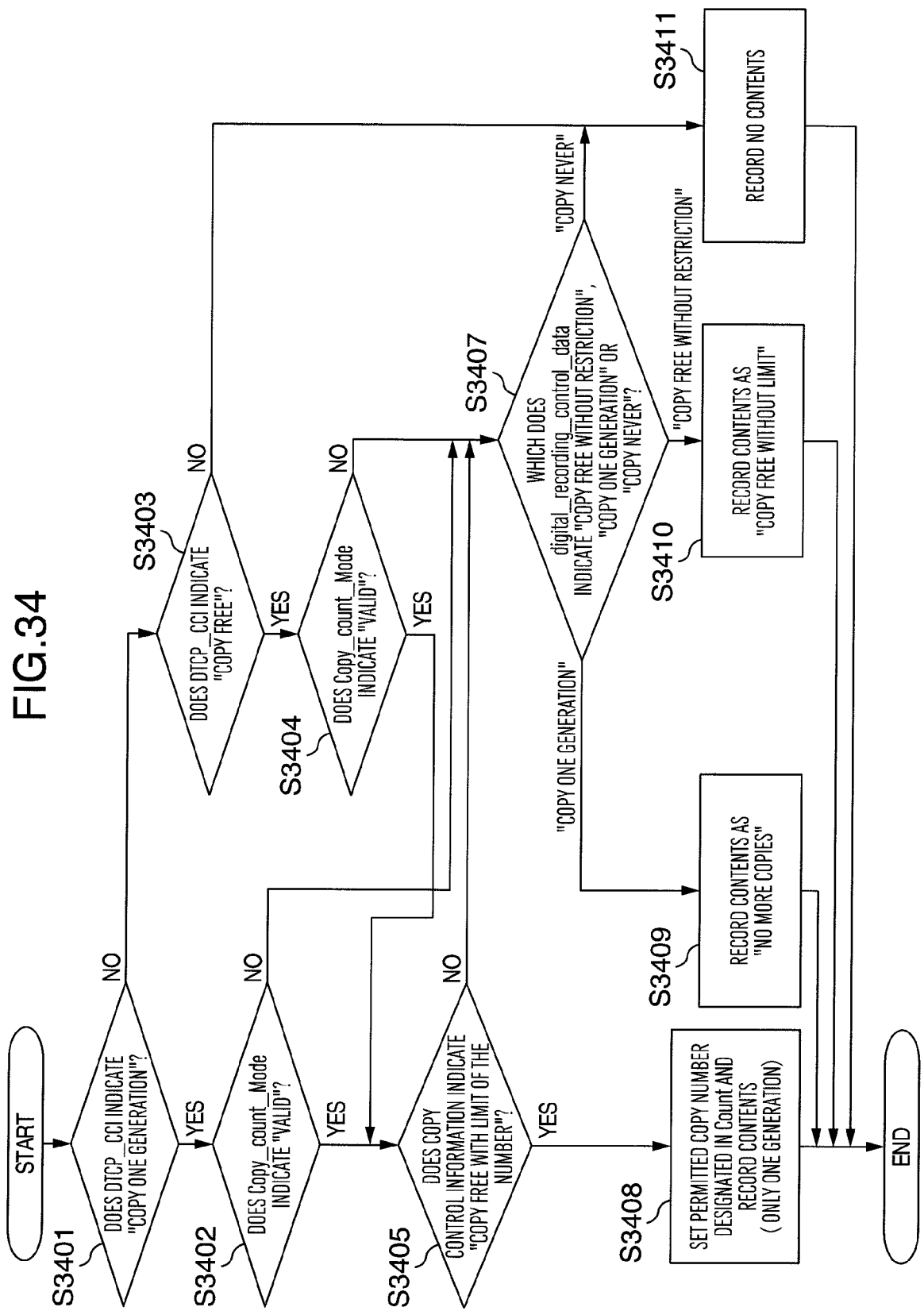
FIG. 34 is a diagram illustrating an example of the recording process related to the copy control information.
Figure 36:
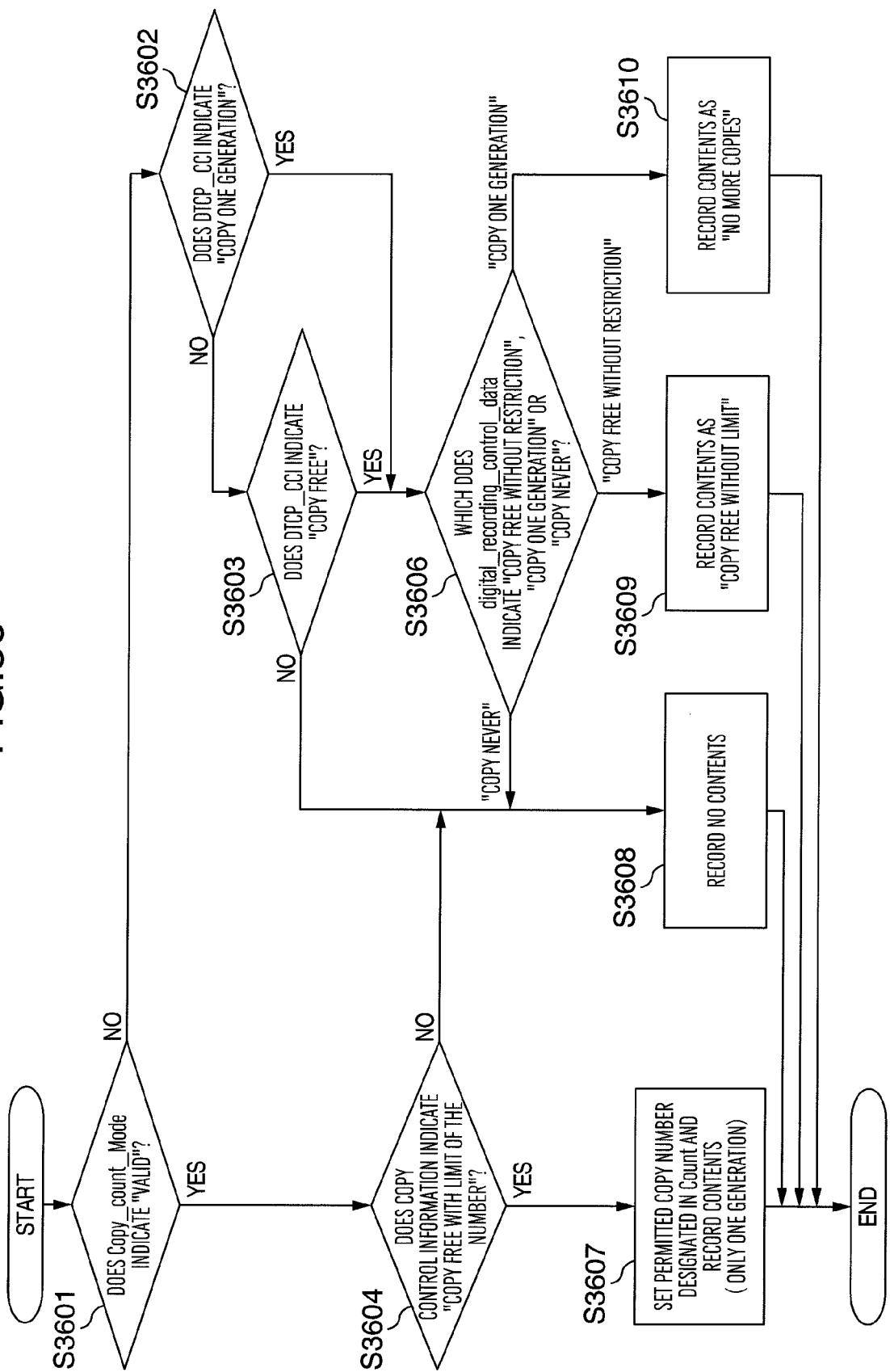
FIG. 36 is a diagram illustrating an example of the recording process related to the copy control information.

Although, in FIG. 34, the procedure for performing the process with reference to DTCP_CCI information of DTCP_CCI information, Copy_count_Mode information and Count information has been described, it is also possible to perform the process with reference to Copy_count_Mode information. As for the procedure therefor, another example of the recording process related to copy control information will be explained by using the process flow of FIG. 36. The process should be performed with reference to, for example, the information prescribed in DTCP-IP standard if the information is prescribed therein.

First, if Copy_count_Mode information indicates "valid" (S3601: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3604: YES), then the permitted copy number designated in Count information is set and the contents are recorded (S3607). That is, if the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S3601: NO), and DTCP_CCI information indicates "Copy One Generation" (S3602: YES), or if DTCP_CCI information does not indicate "Copy One Generation" (S3602: NO) but indicates "Copy Free" (S3603: YES), then the contents are recorded as "Copy Free without Limit" (S3609) when "digital_recording_control_data" of digital copy control descriptor indicates "Copy Free without Restriction" (S3606: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3606: "Copy One Generation"), then the contents are recorded as "No More Copies" (S3610).

If DTCP_CCI information does not indicate "Copy Free" (S3603: NO), if digital copy control descriptor and content availability descriptor in the copy control information in the received MPEG2-TS digital stream do not indicate "Copy Free with Limit of the Number" (S3604: NO), or if "digital_recording_control_data" of digital copy control descriptor indicates "Copy Never" (S3606: "Copy Never"), then the contents are not recorded (S3608).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Figure 37:
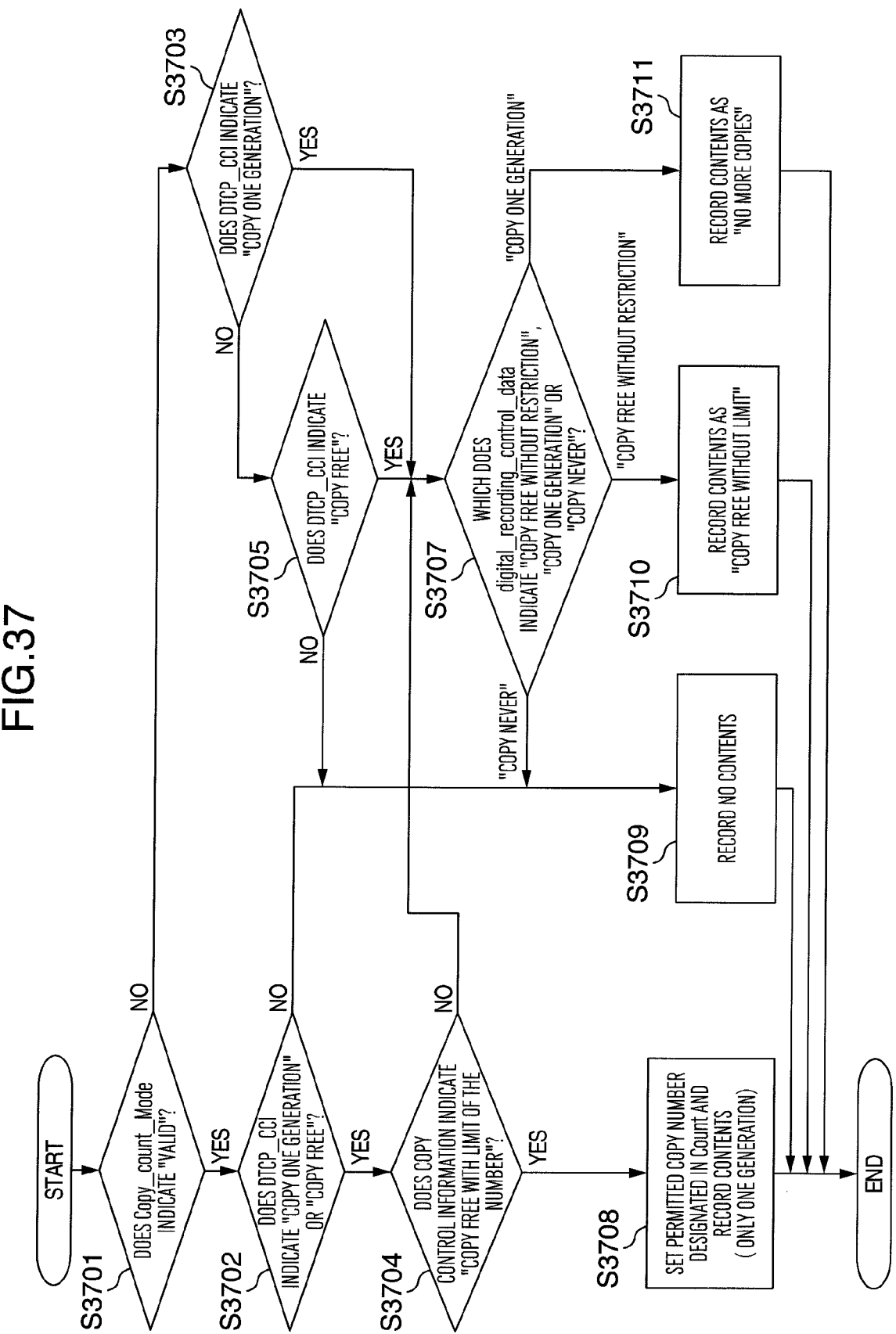
FIG. 37 is a diagram illustrating an example of the recording process related to the copy control information.

Another example of the recording process in the receiving apparatus related to the copy control information about contents (especially, DTCP_CCI information, Copy_count_Mode information and Count information) and the copy control information including content availability descriptor and digital copy control descriptor will be explained by using the process flow of FIG. 37.

First, if Copy_count_Mode information indicates "valid" (S3701: YES), DTCP_CCI information indicates "Copy One Generation" or "Copy Free" (S3702: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3704: YES), then the permitted copy number designated in Count information is set and the contents are recorded (S3708). That is, if DTCP_CCI information indicates "Copy One Generation" or "Copy Free" and the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S3701: NO), and DTCP_CCI information indicates "Copy One Generation" (S3703: YES), if digital copy control descriptor and content availability descriptor in the copy control information in the received MPEG2-TS digital stream do not indicate "Copy Free with Limit of the Number" (S3704: NO), or if DTCP_CCI information does not indicate "Copy One Generation" (S3703: NO) but indicates "Copy Free" (S3705: YES), then the contents are recorded as "Copy Free without Limit" (S3710) when "digital_recording_control_data" of digital copy control descriptor indicates "Copy Free without Restriction" (S3707: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3707: "Copy One Generation"), then the contents are recorded as "No More Copies" (S3711).

If DTCP_CCI information does not indicate "Copy One Generation" or "Copy Free" (S3702: NO), if DTCP_CCI information does not indicate "Copy Free" (S3705: NO), or if "digital_recording_control_data" of digital copy control descriptor indicates "Copy Never" (S3707: "Copy Never"), then the contents are not recorded (S3709).

By using DTCP_CCI information, Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Figure 40:
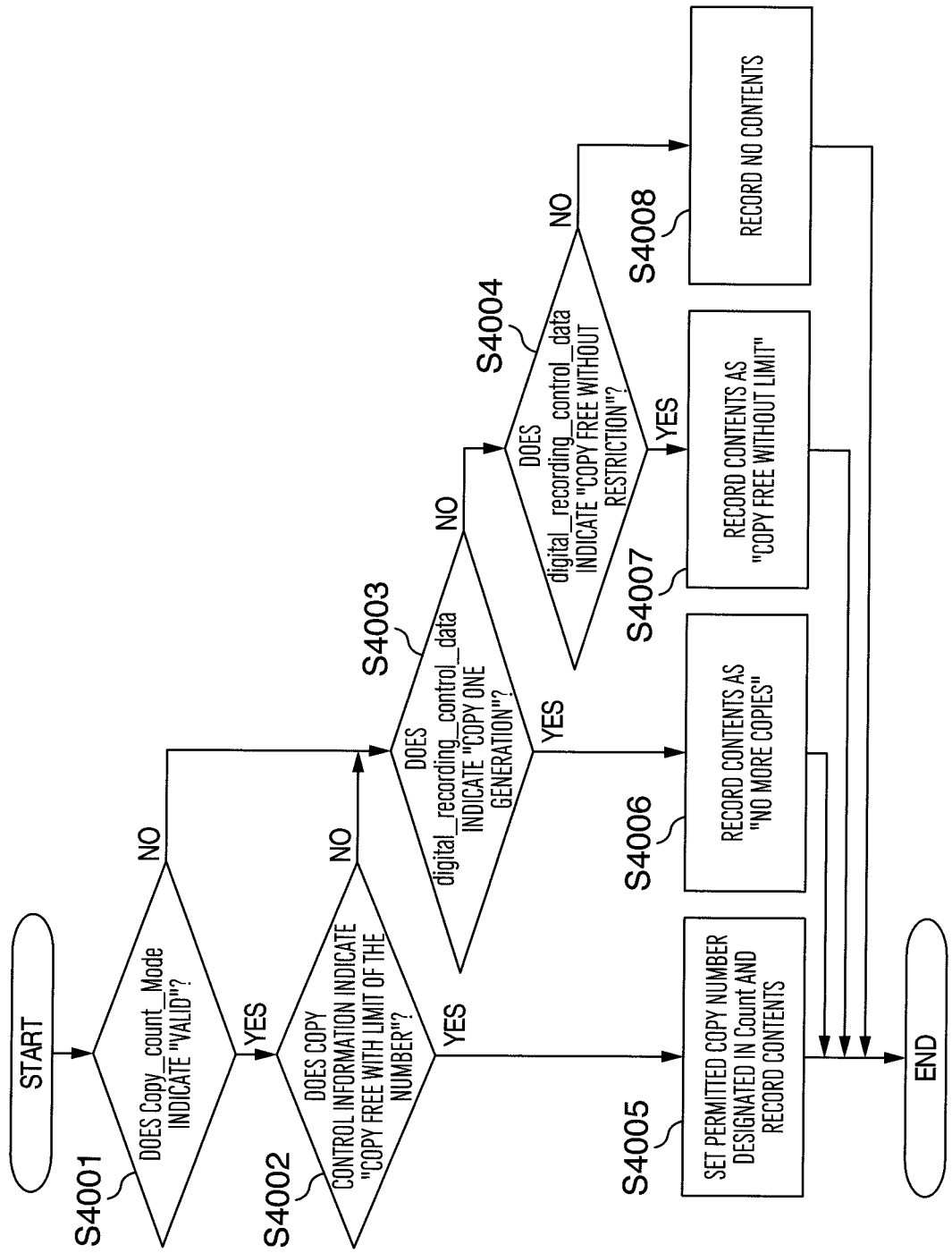
FIG. 40 is a diagram illustrating an example of the recording process related to the copy control information.

Another example of the recording process in the receiving apparatus related to the copy control information about contents (especially, Copy_count_Mode information and Count information) and the copy control information including content availability descriptor and digital copy control descriptor will be explained by using the process flow of FIG. 40.

First, if Copy_count_Mode information indicates "valid" (S4001: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S4002: YES), then the permitted copy number designated in Count information is set and the contents are recorded (S4005). That is, if the copy control information indicates "Copy Free with Limit of the Number", the contents are recorded in a state where it is permitted to copy the contents up to the number designated in Count information is permitted for the contents.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Copy_count_Mode information indicates "invalid" (S4001: NO), or if digital copy control descriptor and content availability descriptor in the copy control information in the received MPEG2-TS digital stream do not indicate "Copy Free with Limit of the Number" (S4002: NO), then the contents are recorded as "No More Copies" (S4006) when "digital_recording_control_data" of digital copy control descriptor indicates "Copy One Generation" (S4003: YES).

If "digital_recording_control_data" of digital copy control descriptor does not indicate "Copy One Generation" (S4003: NO) but indicates "Copy Free without Restriction" (S4004: YES), then the contents are recorded as "Copy Free without Limit" (S4007). At this time, the writing section 112 performs or does not perform encryption processing of the contents depending on whether EPN information indicates "EPN Asserted Copy Free" or not.

If "digital_recording_control_data" of digital copy control descriptor does not indicate "Copy Free without Restriction", that is, "Copy Never" (S4004: NO), then the contents are not recorded (S4008).

By using Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if Copy_count_Mode information and Count information are falsified.

Figure 41:
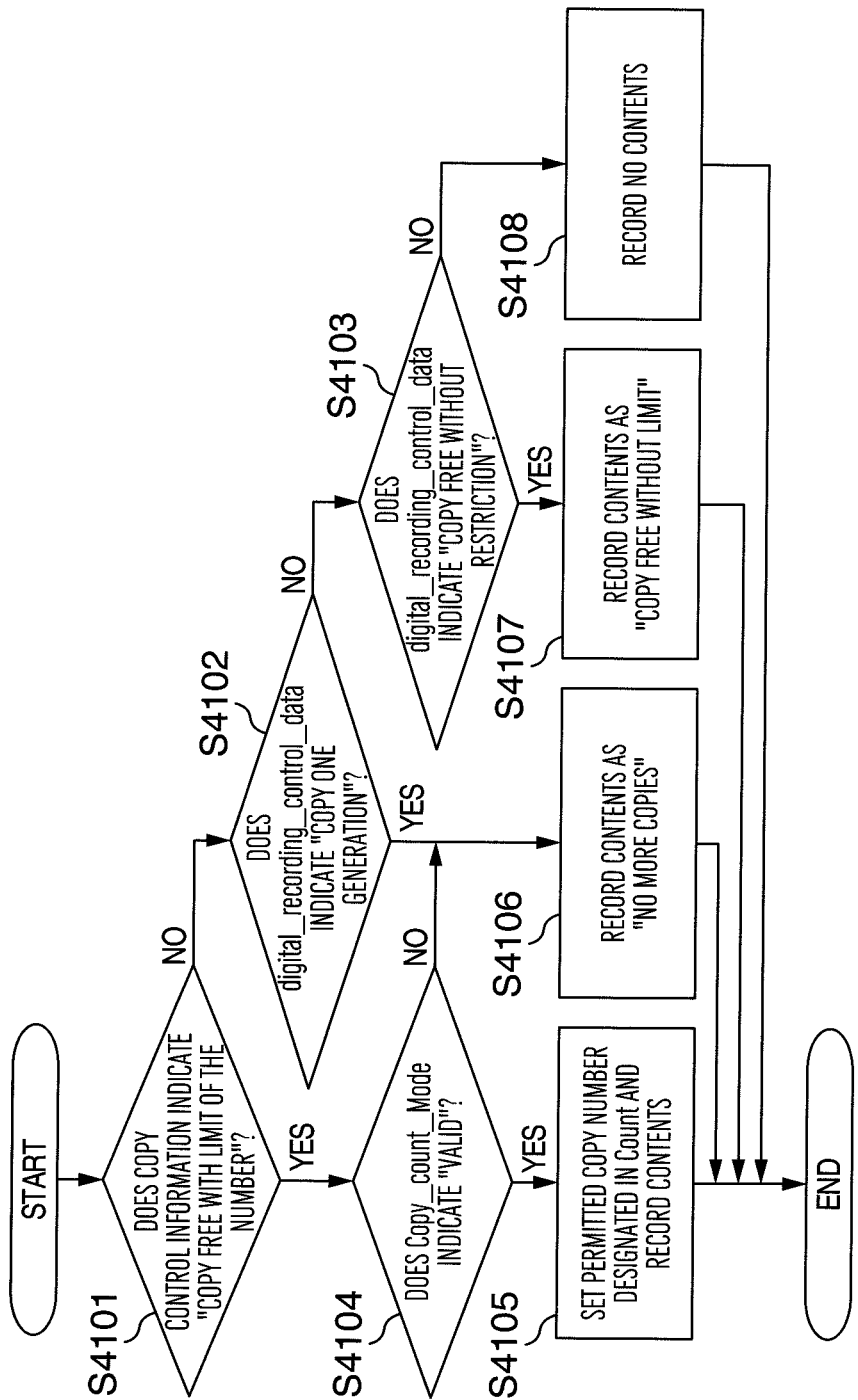
FIG. 41 is a diagram illustrating an example of the recording process related to the copy control information.

Another example of the recording process in the receiving apparatus related to the copy control information about contents (especially, Copy_count_Mode information and Count information) and the copy control information including content availability descriptor and digital copy control descriptor will be explained by using the process flow of FIG. 41.

If "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S4101: YES), and Copy_count_Mode information indicates "valid" (S4104: YES), then the permitted copy number designated in Count information is set and the contents are recorded (S4105). That is, if the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If digital copy control descriptor and content availability descriptor in the copy control information in the received MPEG2-TS digital stream do not indicate "Copy Free with Limit of the Number" (S4101: NO), and "digital_recording_control_data" of digital copy control descriptor indicates "Copy One Generation" (S4102: YES), or if Copy_count_Mode information indicates "invalid" (S4104: NO), then the contents are recorded as "No More Copies" (S4106).

If "digital_recording_control_data" of digital copy control descriptor does not indicate "Copy One Generation" (S4102: NO) but indicates "Copy Free without Restriction" (S4103: YES), then the contents are recorded as "Copy Free without Limit" (S4107). At this time, the writing section 112 performs or does not perform encryption processing of the contents depending on whether EPN information indicates "EPN Asserted Copy Free" or not.

If "digital_recording_control_data" of digital copy control descriptor does not indicate "Copy Free without Restriction", that is, "Copy Never" (S4103: NO), then the contents are not recorded (S4108).

By using Copy_count_Mode information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if Copy_count_Mode information and Count information are falsified.

Next, the description will explain the case where the copy control information about contents is in the format shown in FIG. 30. An example of a recording process related to the copy control information about contents (especially, DTCP_CCI information and Count information) shown in FIG. 30 will be explained by using the process flow of FIG. 31.

First, if DTCP_CCI information indicates "Copy One Generation" (S3101: YES), Count information indicates a value other than "0" (S3102: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3104: YES), then the permitted copy number designated in Count information is set and the contents are recorded (S3107).

Specifically, management information is created by the contents management information creating section 119, and DTCP_CCI information or digital_recording_control_data information of digital copy control descriptor and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S3102: NO), if digital copy control descriptor and content availability descriptor in the copy control information in the received MPEG2-TS digital stream do not indicate "Copy Free with Limit of the Number" (S3104: NO), or if DTCP_CCI information does not indicate "Copy One Generation" (S3101: NO) but indicates "Copy Free" (S3103: YES), then the contents are recorded as "Copy Free without Limit" (S3109) when "digital_recording_control_data" of digital copy control descriptor indicates "Copy Free without Restriction" (S3106: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3106: "Copy One Generation"), then the contents are recorded as "No More Copies" (S3108).

If DTCP_CCI information does not indicate "Copy Free" (S3103: NO), or if "digital_recording_control_data" of digital copy control descriptor indicates "Copy Never" (S3106: "Copy Never"), then the contents are not recorded (S3110).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Figure 33:
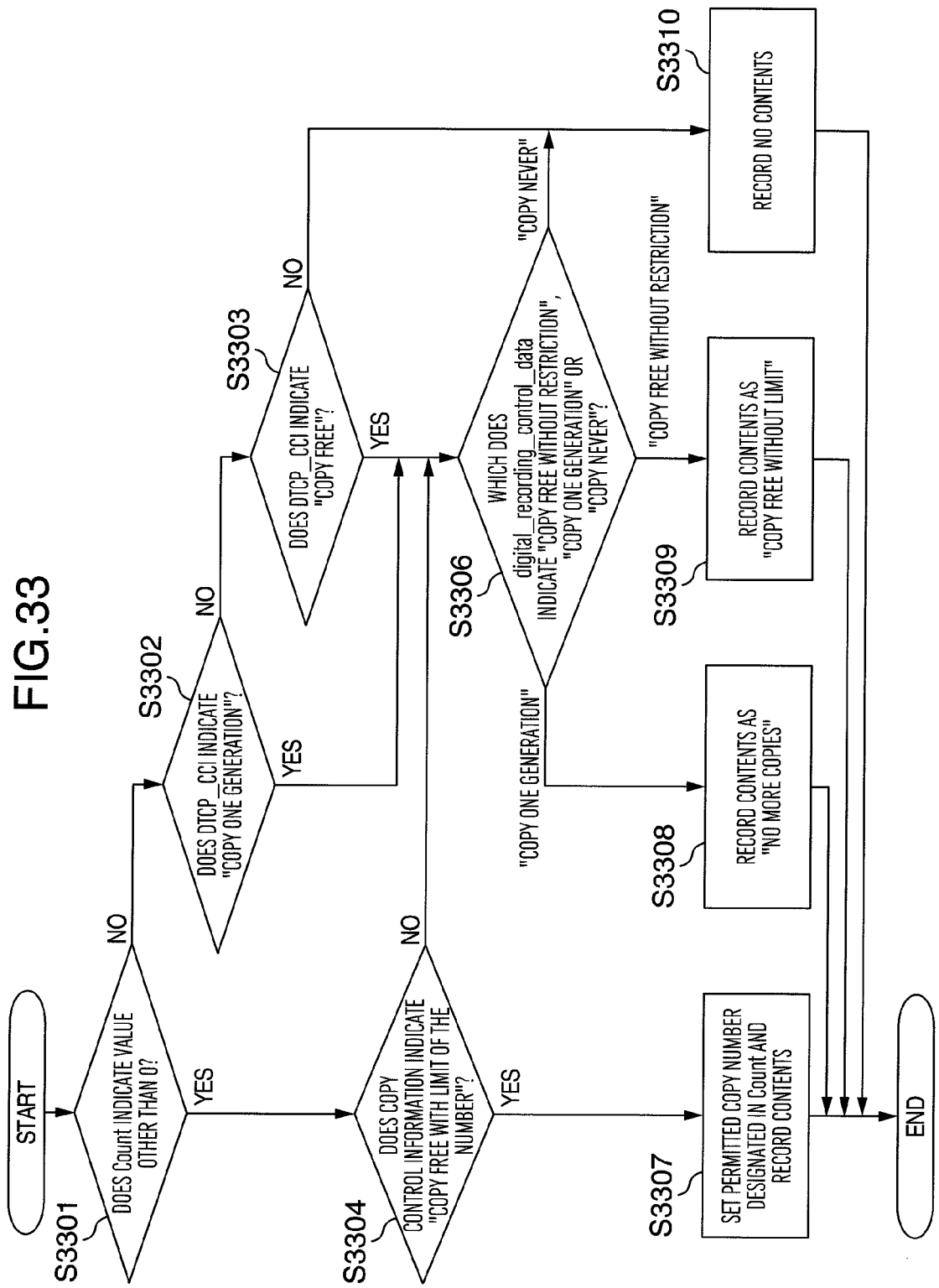
FIG. 33 is a diagram illustrating an example of the recording process related to the copy control information.

Although, in FIG. 31, the procedure for performing the process with reference to DTCP_CCI information of DTCP_CCI information and Count information has been described, it is also possible to perform the process with reference to Count information. As for the procedure therefor, another example of the recording process related to the copy control information will be explained by using the process flow of FIG. 33. The process should be performed with reference to, for example, the information prescribed in DTCP-IP standard if the information is prescribed therein.

First, if Count information indicates a value other than "0" (S3301: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3304: YES), then the permitted copy number designated in Count information is set and the contents are recorded (S3307).

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S3301: NO), and DTCP_CCI information indicates "Copy One Generation" (S3302: YES), if digital copy control descriptor and content availability descriptor in the copy control information in the received MPEG2-TS digital stream do not indicate "Copy Free with Limit of the Number" (S3304: NO), or if DTCP_CCI information does not indicate "Copy One Generation" (S3302: NO) but indicates "Copy Free" (S3303: YES), then the contents are recorded as "Copy Free without Limit" (S3309) when "digital_recording_control_data" of digital copy control descriptor indicates "Copy Free without Restriction" (S3306: "Copy Free without Restriction"). At this time, the writing section 112 performs or does not perform encryption processing of the contents depending on whether EPN information indicates "EPN Asserted Copy Free" or not. If "digital_recording_control_data" of digital copy control descriptor indicates "Copy One Generation" (S3306: "Copy One Generation"), then the contents are recorded as "No More Copies" (S3308).

If DTCP_CCI information does not indicate "Copy Free" (S3303: NO), or if "digital_recording_control_data" of digital copy control descriptor indicates "Copy Never" (S3306: "Copy Never"), then the contents are not recorded (S3310).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information, Copy_count_Mode information and Count information are falsified.

Next, another example of the recording process related to the copy control information about contents (especially, DTCP_CCI information and Count information) shown in FIG. 30 will be explained by using the process flow of FIG. 35.

First, if DTCP_CCI information indicates "Copy One Generation" (S3501: YES), Count information indicates a value other than "0" (S3502: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3505: YES), then the permitted copy number designated in Count information is set and the contents are recorded (S3508).

That is, if DTCP_CCI information indicates "Copy One Generation" and the copy control information indicates "Copy Free with Limit of the Number", the contents are recorded in a state where it is permitted to copy the contents up to the number designated in Count information.

Specifically, management information is created by the contents management information creating section 119, and DTCP_CCI information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S3502: NO), if digital copy control descriptor and content availability descriptor in the copy control information in the received MPEG2-TS digital stream do not indicate "Copy Free with Limit of the Number" (S3505: NO), or if DTCP_CCI information does not indicate "Copy One Generation" (S3501: NO) but indicates "Copy Free" (S3503: YES), and Count information indicates "0" (S3504: NO), then the contents are recorded as "Copy Free without Limit" (S3510) when "digital_recording_control_data" of digital copy control descriptor indicates "Copy Free without Restriction" (S3507: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3507: "Copy One Generation"), then the contents are recorded as "No More Copies" (S3509).

If DTCP_CCI information does not indicate "Copy Free" (S3503: NO), or if "digital_recording_control_data" of digital copy control descriptor indicates "Copy Never" (S3507: "Copy Never"), then the contents are not recorded (S3511).

If DTCP_CCI information does not indicate "Copy One Generation" (S3501: NO) but indicates "Copy Free" (S3503: YES), Count information indicates a value other than "0" (S3504: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3505: YES), then the permitted copy number designated in Count information is set and the contents are recorded (S3508). That is, if DTCP_CCI information indicates "Copy Free", the contents are recorded in a state where it is permitted to copy the contents up to the number designated in Count information.

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information and Count information are falsified.

Figure 35:
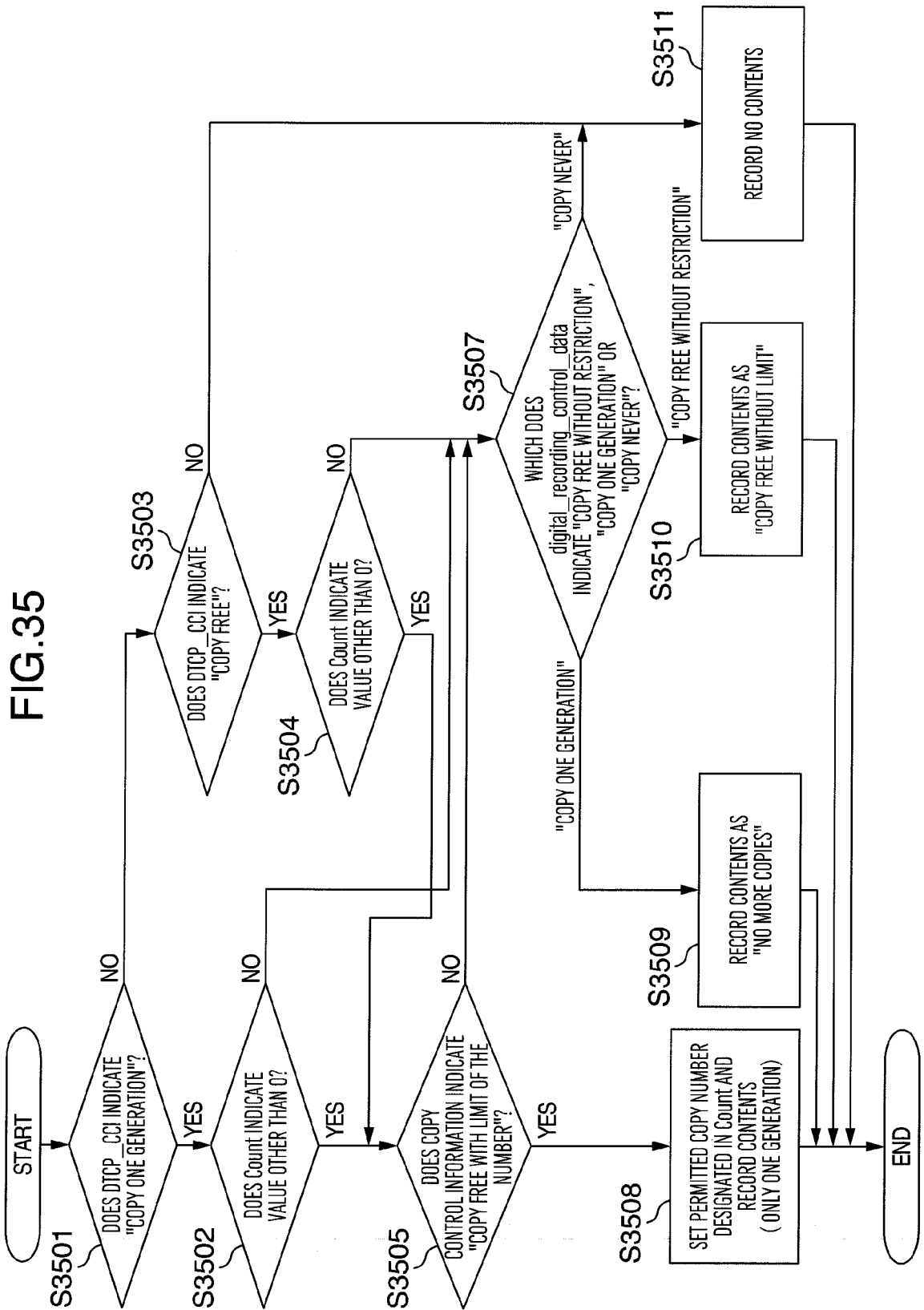
FIG. 35 is a diagram illustrating an example of the recording process related to the copy control information.
Figure 38:
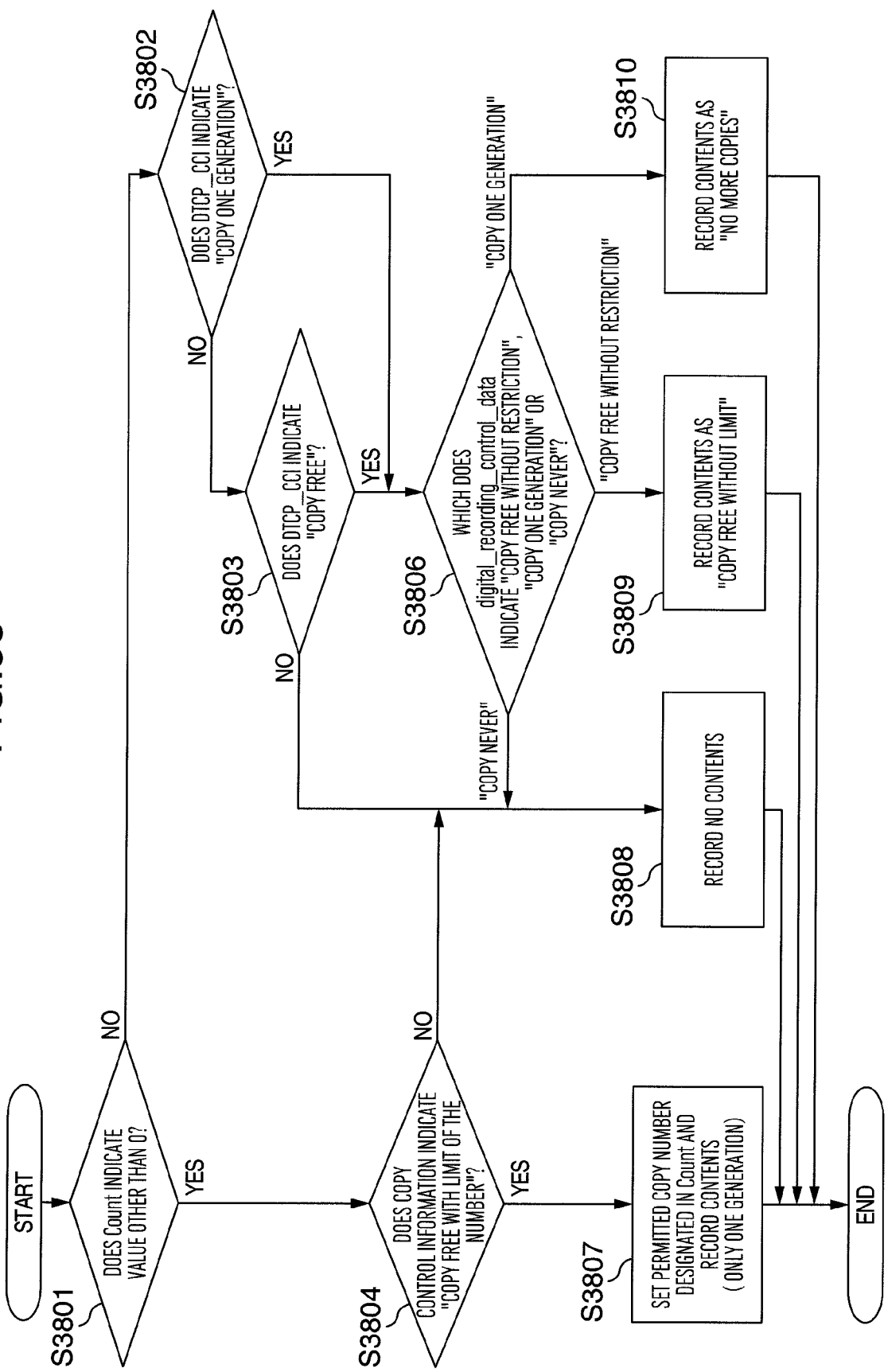
FIG. 38 is a diagram illustrating an example of the recording process related to the copy control information.

Although, in FIG. 35, the procedure for performing the process with reference to DTCP_CCI information of DTCP_CCI information and Count information has been described, it is also possible to perform the process with reference to Count information. As for the procedure therefor, another example of the recording process related to the copy control information will be explained by using the process flow of FIG. 38. The process should be performed with reference to, for example, the information prescribed in DTCP-IP standard if the information is prescribed therein.

First, if Count information indicates a value other than "0" (S3801: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3804: YES), then the permitted copy number designated in Count information is set and the contents are recorded (S3807). That is, if the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S3801: NO) and DTCP_CCI information indicates "Copy One Generation" (S3802: YES), or if DTCP_CCI information does not indicate "Copy One Generation" (S3802: NO) but indicates "Copy Free" (S3803: YES), then the contents are recorded as "Copy Free without Limit" (S3809) when "digital_recording_control_data" of digital copy control descriptor indicates "Copy Free without Restriction" (S3806: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3806: "Copy One Generation"), then the contents are recorded as "No More Copies" (S3810).

If DTCP_CCI information does not indicate "Copy Free" (S3803: NO), if digital copy control descriptor and content availability descriptor in the copy control information in the received MPEG2-TS digital stream do not indicate "Copy Free with Limit of the Number" (S3804: NO), or if "digital_recording_control_data" of digital copy control descriptor indicates "Copy Never" (S3806: "Copy Never"), then the contents are not recorded (S3808).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information and Count information are falsified.

Figure 39:
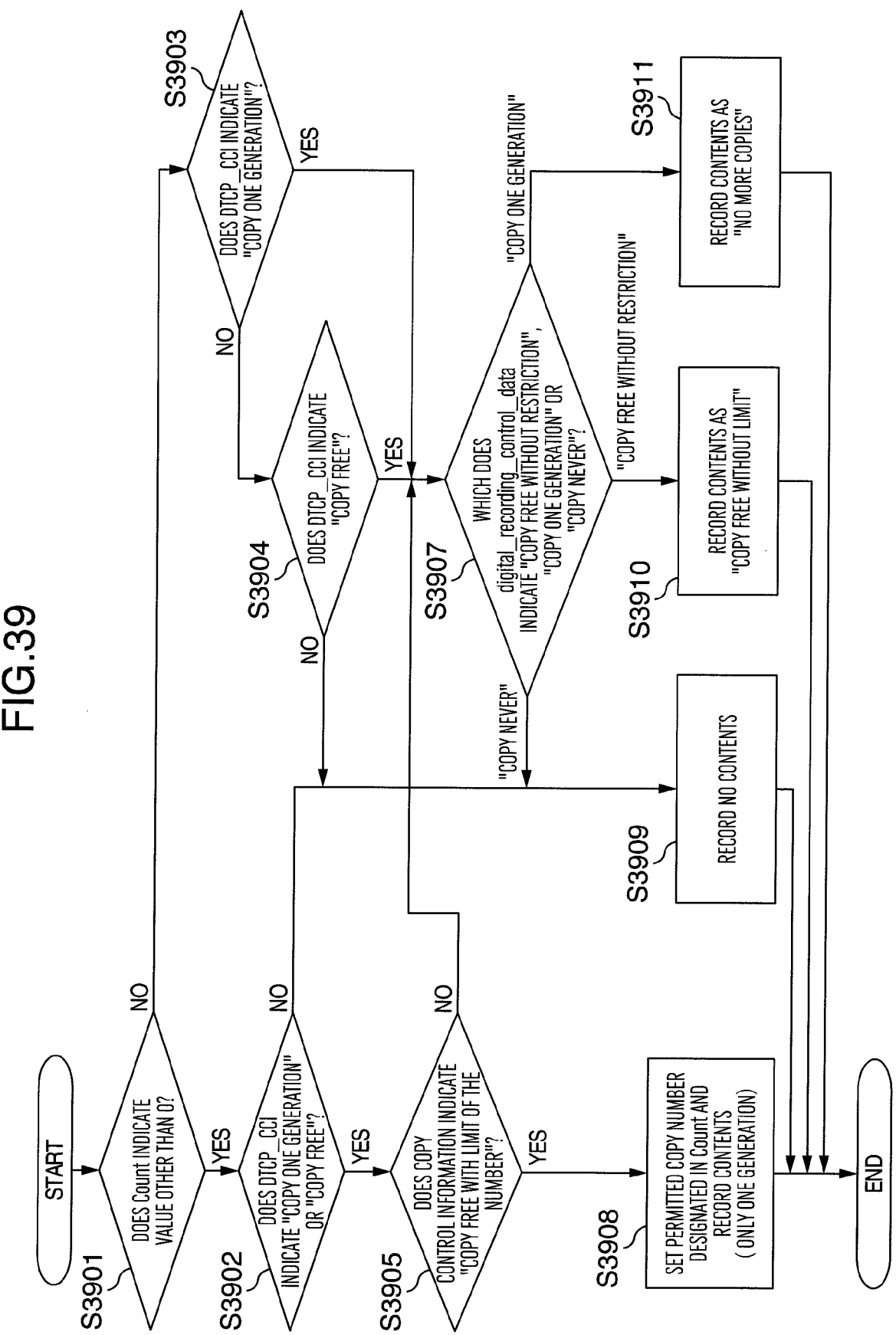
FIG. 39 is a diagram illustrating an example of the recording process related to the copy control information.

Another example of the recording process in the receiving apparatus related to the copy control information about contents (especially, DTCP_CCI information and Count information) and the copy control information including content availability descriptor and digital copy control descriptor will be explained by using the process flow of FIG. 39.

First, if Count information indicates a value other than "0" (S3901: YES), DTCP_CCI information indicates "Copy One Generation" or "Copy Free" (S3902: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S3905: YES), then the permitted copy number designated in Count information is set and the contents are recorded (S3908). That is, if DTCP_CCI information indicates "Copy One Generation" or "Copy Free" and the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S3901: NO), and DTCP_CCI information indicates "Copy One Generation" (S3903: YES), if digital copy control descriptor and content availability descriptor in the copy control information in the received MPEG2-TS digital stream do not indicate "Copy Free with Limit of the Number" (S3905: NO), or if DTCP_CCI information does not indicate "Copy One Generation" (S3903: NO) but indicates "Copy Free" (S3904: YES), then the contents are recorded as "Copy Free without Limit" (S3910) when "digital_recording_control_data" of digital copy control descriptor indicates "Copy Free without Restriction" (S3907: "Copy Free without Restriction"). At this time, the writing section 112 performs or does not perform encryption processing of the contents depending on whether EPN information indicates "EPN Asserted Copy Free" or not.

If "digital_recording_control_data" of digital copy control descriptor indicates "Copy One Generation" (S3907: "Copy One Generation"), then the contents are recorded as "No More Copies" (S3911).

If DTCP_CCI information does not indicate "Copy One Generation" or "Copy Free" (S3902: NO), if DTCP_CCI information does not indicate "Copy Free" (S3904: NO), or if "digital_recording_control_data" of digital copy control descriptor indicates "Copy Never" (S3907: "Copy Never"), then the contents are not recorded (S3909).

By using DTCP_CCI information and Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if DTCP_CCI information and Count information are falsified.

Figure 42:
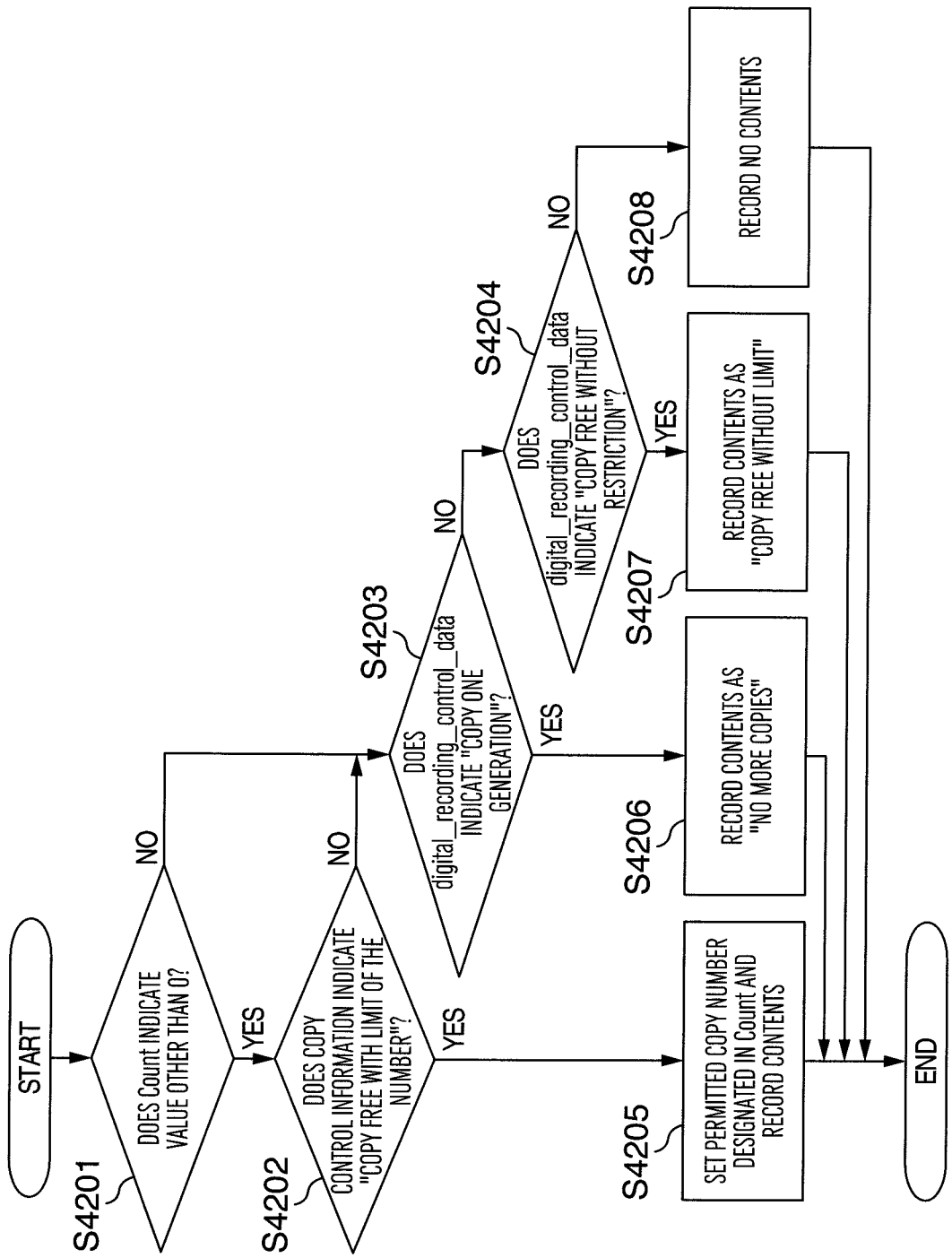
FIG. 42 is a diagram illustrating an example of the recording process related to the copy control information.

Another example of the recording process in the receiving apparatus related to the copy control information about contents (especially, Count information) and the copy control information including content availability descriptor and digital copy control descriptor will be explained by using the process flow of FIG. 42.

First, if Count information indicates a value other than "0" (S4201: YES), and "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S4202: YES), then the permitted copy number designated in Count information is set and the contents are recorded (S4205). That is, if the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If Count information indicates "0" (S4201: NO), or if digital copy control descriptor and content availability descriptor in the copy control information in the received MPEG2-TS digital stream do not indicate "Copy Free with Limit of the Number" (S4202: NO), then the contents are recorded as "No More Copies" (S4206) when "digital_recording_control_data" of digital copy control descriptor indicates "Copy One Generation" (S4203: YES).

If "digital_recording_control_data" of digital copy control descriptor does not indicate "Copy One Generation" (S4203: NO) but indicates "Copy Free without Restriction" (S4204: YES), then the contents are recorded as "Copy Free without Limit" (S4207). At this time, the writing section 112 performs or does not perform encryption processing of the contents depending on whether EPN information indicates "EPN Asserted Copy Free" or not.

If "digital_recording_control_data" of digital copy control descriptor does not indicate "Copy Free without Restriction", that is, "Copy Never" (S4204: NO), then the contents are not recorded (S4208).

By using Count information on the contents transmitting and receiving sides in this procedure, it is possible to perform suitable copy control, and, when recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if Count information is falsified.

Figure 43:
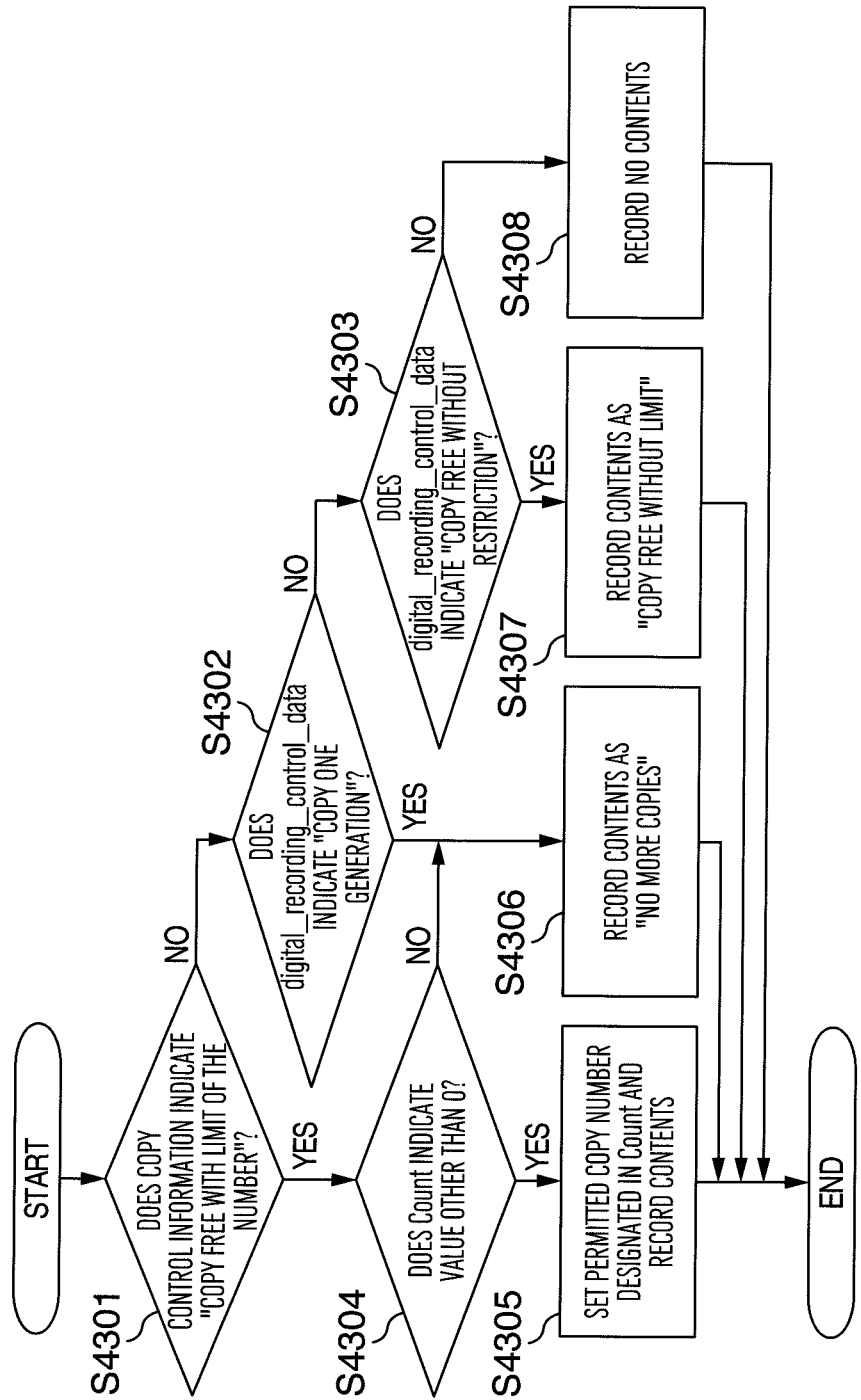
FIG. 43 is a diagram illustrating an example of the recording process related to the copy control information.

Another example of the recording process in the receiving apparatus related to the copy control information about contents (especially, Count information) and the copy control information including content availability descriptor and digital copy control descriptor will be explained by using the process flow of FIG. 43.

If "digital_recording_control_data" of digital copy control descriptor and "digital_recording_control_mode" of content availability descriptor in the copy control information in the received MPEG2-TS digital stream indicate "Copy One Generation" and "1", respectively, that is, "Copy Free with Limit of the Number" (S4301: YES), and Count information indicates a value other than "0" (S4304: YES), then the permitted copy number designated in Count information is set and the contents are recorded (S4305). That is, if the copy control information indicates "Copy Free with Limit of the Number", the contents are recorded in a state where it is permitted to copy the contents up to the number designated in Count information.

Specifically, management information is created by the contents management information creating section 119, and Copy One Generation information and Count information are stored as the copy generation control information and the copy number control information, respectively. Then, the writing section 112 records the management information created by the contents management information creating section 119, and the encrypted data obtained by performing encryption processing of the contents on the basis of key information in the management information, on the internal recording medium 113 or the removable recording medium 118.

If digital copy control descriptor and content availability descriptor in the copy control information in the received MPEG2-TS digital stream do not indicate "Copy Free with Limit of the Number" (S4301: NO), and "digital_recording_control_data" of digital copy control descriptor indicates "Copy One Generation" (S4302: YES), or if Count information indicates "0" (S4304: NO), then the contents are recorded as "No More Copies" (S4306).

If "digital_recording_control_data" of digital copy control descriptor does not indicate "Copy One Generation" (S4302: NO) but indicates "Copy Free without Restriction" (S4303: YES), then the contents are recorded as "Copy Free without Limit" (S4307). At this time, the writing section 112 performs or does not perform encryption processing of the contents depending on whether EPN information indicates "EPN Asserted Copy Free" or not.

If "digital_recording_control_data" of digital copy control descriptor does not indicate "Copy Free without Restriction", that is, "Copy Never" (S4303: NO), then the contents are not recorded (S4308).

By using Count information on the contents transmitting and receiving sides in this procedure, it is possible to perform suitable copy control, and, when, recording the contents in a recording apparatus digitally connected via wired/wireless LAN, to perform dubbing with the managed permitted copy number being kept. Thus, the advantage of protecting contents can be obtained while enhancing the user's convenience. Furthermore, by performing copy control using the copy control information including content availability descriptor and digital copy control descriptor, the advantage of enabling suitable copy control can be obtained even if Count information is falsified.

An example of the recording process in the receiving apparatus has been explained by using FIG. 29 and FIGS. 31 to 43. The transmitting apparatus in this case has to set copy control information about contents so that the receiving apparatus can perform the above recording process. That is, the transmitting apparatus side has to perform contents copyright management correctly, generate correct copy control information based on a request from the receiving apparatus side, and provide it to the receiving apparatus side. In the process flows in FIG. 29 and FIGS. 31 to 51, it is also possible to first refer to "retention_move_mode" of DTCP_descriptor in FIG. 20 or FIG. 30 and to perform the next process if the move mode is specified, and terminate the process if temporary store is specified. By doing this, whether the move mode is specified or not becomes clear, and the advantage of further protecting contents can be obtained.

Although the case where one transmitting apparatus corresponds to one receiving apparatus has been described above, the following process is performed in the case where multiple receiving apparatuses are connected to the transmitting apparatus 1.

That is, if an authentication process between transmitting and receiving apparatuses is completed before start of dubbing and the number of contents can be managed between them, then dubbing from 1 to n (two or more) is permitted. Addition of a receiving apparatus after start of dubbing is not permitted.

It has been described above that, if the digital copy control information indicates "Copy One Generation", then the contents are judged to be recordable as "Copy Free with Limit of the Number" when "digital_recording_control_mode" indicates "1", and judged not to be recordable as "Copy Free with Limit of the Number" when "digital_recording_control_mode" indicates "0". However, the meaning of "0" and "1" may be conversely set according to a broadcast standard.

That is, if the digital copy control information indicates "Copy One Generation", then the contents may be judged to be recordable as "Copy Free with Limit of the Number" when "digital_recording_control_mode" indicates "0", and judged not to be recordable as "Copy Free with Limit of the Number" when "digital_recording_control_mode" indicates "1". Similarly, the meanings of values indicated by other descriptors may be differently set depending on the situation.

It is desirable that the meaning of a value indicated by each descriptor such as the value of "digital_recording_control_mode" should be standardized to be uniquely determined.

The names of content availability descriptor and digital copy control descriptor ("digital_recording_control_mode", "digital_recording_control_data" and the like) are not limited to the names used in the embodiments. Other names may be adopted.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A contents transmitting apparatus configured to transmit to a contents receiving apparatus connected via a network, contents and copy control information which controls copying of contents, wherein the contents transmitting apparatus comprises:
    at least one of a hardware processor and circuitry to effect:
    an authentication section configured to perform authentication processing with the contents receiving apparatus, and to share an exchange key information or a dedicated key information with the contents receiving apparatus, wherein the exchange key information and the dedication key information are different, with the exchange key information useable for encryption processing of content with the copy control information not having copy number information added thereto to limit a number of copies, and the dedicated key information useable for encryption processing of contents with the copy control information having copy number information added thereto to limit a number of copies;
    an encryption processing section configured to encrypt contents with a key created on a basis of the exchange key information or the dedicated key information;
    a communication processing section configured to transmit to the contents receiving apparatus via the network, encrypted contents and copy control information which controls copying the contents; and
    a control section configured:
    to control, if contents are not contents added with the copy number information, performing encryption processing with a key created on a basis of the exchange key information, and transmitting encrypted contents to the contents receiving apparatus via the network; and,
    to control, if contents are contents added with the copy number information, performing encryption processing with a key created on a basis of the dedicated key information, and transmitting encrypted contents to the contents receiving apparatus via the network;
    wherein:
        encrypted contents and copy control information which controls copying the contents, are composed of packets; and
        the control section is configured to:
        generate packets of encrypted contents and packets of the copy control information, the packets of encrypted contents and the packets of the copy control information being different from each other; and
        transmit the packets of the copy control information before transmitting the packets of encrypted contents; and
    wherein when a status of copy control is changed during content transmission, the control section generates a packet of copy control information which indicates the status of copy control of the contents, and transmits the generated packets to the contents receiving apparatus.

2. A contents transmitting apparatus according to claim 1, wherein a first authentication procedure is used in connection with an exchange of contents with the copy control information not having copy number information added thereto to limit a number of copies, and a second authentication procedure is used in connection with an exchange of contents with the copy control information having copy number information added thereto to limit a number of copies, where the first authentication procedure and the second authentication procedure differ from each other.

3. A contents transmitting method implemented by a contents transmitting apparatus configured to transmit to a contents receiving apparatus connected via a network, contents and copy control information which controls copying of contents, wherein the contents transmitting method comprises:
    performing authentication processing with the contents receiving apparatus, and sharing an exchange key information or a dedicated key information with the contents receiving apparatus, wherein the exchange key information and the dedication key information are different with the exchange key information useable for encryption processing of content with the copy control information not having copy number information added thereto to limit a number of copies, and the dedicated key information useable for encryption processing of contents with the copy control information having copy number information added thereto to limit a number of copies;
    providing an encryption processing section configured to encrypt contents with a key created on a basis of the exchange key information or the dedicated key information;

providing a communication processing section configured to transmit to the contents receiving apparatus via the network, encrypted contents and copy control information which controls copying the contents; and effecting control including:

to control, if contents are not contents added with the copy number information, performing encryption processing with a key created on a basis of the exchange key information, and transmitting encrypted contents to the contents receiving apparatus via the network; and, to control, if contents are contents added with the copy number information, performing encryption processing with a key created on a basis of the dedicated key information, and transmitting encrypted contents to the contents receiving apparatus via the network;

wherein:

encrypted contents and copy control information which controls copying the contents, are composed of packets; and the effecting control further comprising:

generating packets of encrypted contents and packets of the copy control information, the packets of encrypted contents and the packets of the copy control information being different from each other; and transmitting the packets of the copy control information before transmitting the packets of encrypted contents; and wherein when a status of copy control is changed during content transmission, generating a packet of copy control information which indicates the status of copy control of the contents, and transmitting the generated packets to the contents receiving apparatus.

4. A contents receiving apparatus configured to receive from a contents transmitting apparatus connected via a network, contents and copy control information which controls copying of contents, wherein the contents receiving apparatus comprises:

at least one of a hardware processor and circuitry to effect:

an authentication section configured to perform authentication processing with the contents transmitting apparatus, and to share an exchange key information or a dedicated key information with the contents receiving apparatus, wherein the exchange key information and the dedication key information are different with the exchange key information useable for encryption processing of content with the copy control information not having copy number information added thereto to limit a number of copies, and the dedicated key information useable for encryption and decryption processing of contents with the copy control information having copy number information added thereto to limit a number of copies;

an decryption processing section configured to decrypt contents with a key created on a basis of the exchange key information or the dedicated key information;

a communication processing section configured to receive from the contents transmitting apparatus via the network, encrypted contents and copy control information which controls copying the contents; and a control section configured:

to control, if contents are not contents added with the copy number information, performing decryption processing with a key created on a basis of the exchange key information, on encrypted contents received from the contents transmitting apparatus via the network; and, to control, if contents are contents added with the copy number information, performing decryption processing with a key created on a basis of the dedicated key information, on encrypted contents received from the contents transmitting apparatus via the network;

wherein:

encrypted contents and copy control information which controls copying the contents, are composed of packets; and the control section is configured to:

recognize packets of encrypted contents and packets of the copy control information, the packets of encrypted contents and the packets of the copy control information being different from each other; and receive the packets of the copy control information before receiving the packets of encrypted contents; and wherein when a status of copy control is changed during content transmission, the control section receives a packet of copy control information which indicates the status of copy control of the contents from the contents transmitting apparatus.

5. A contents receiving method implemented by a contents receiving apparatus configured to receive from a contents transmitting apparatus connected via a network, contents and copy control information which controls copying of contents, wherein the contents receiving method comprises:

performing authentication processing with the contents transmitting apparatus, and sharing an exchange key information or a dedicated key information with the contents receiving apparatus, wherein the exchange key information and the dedication key information are different with the exchange key information useable for encryption processing of content with the copy control information not having copy number information added thereto to limit a number of copies, and the dedicated key information useable for encryption and decryption processing of contents with the copy control information having copy number information added thereto to limit a number of copies;

providing decryption processing section configured to decrypt contents with a key created on a basis of the exchange key information or the dedicated key information;

providing a communication processing section configured to receive from the contents transmitting apparatus via the network, encrypted contents and copy control information which controls copying the contents; and effecting control including:

to control, if contents are not contents added with the copy number information, performing decryption processing with a key created on a basis of the exchange key information, on encrypted contents received from the contents transmitting apparatus via the network; and, to control, if contents are contents added with the copy number information, performing decryption processing with a key created on a basis of the dedicated key information, on encrypted contents received from the contents transmitting apparatus via the network;

wherein:

encrypted contents and copy control information which controls copying the contents, are composed of packets; and the effecting control further comprising:

recognizing packets of encrypted contents and packets of the copy control information, the packets of encrypted contents and the packets of the copy control information being different from each other; and receiving the packets of the copy control information before receiving the packets of encrypted contents; and wherein when a status of copy control is changed during content transmission, the control section receiving a packet of copy control information which indicates the status of copy control of the contents, from the contents transmitting apparatus.

\* \* \* \* \*